(12) United States Patent
England et al.

(10) Patent No.: US 9,135,665 B2
(45) Date of Patent: Sep. 15, 2015

(54) RECOMMENDATION WIDGETS FOR A SOCIAL MARKETPLACE

(75) Inventors: Aron England, Austin, TX (US); Steven Tedjamulia, Austin, TX (US); Manish C. Mehta, Austin, TX (US); Ronald Vincent Rose, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 452 days.

(21) Appl. No.: 13/242,343

(22) Filed: Sep. 23, 2011

(65) Prior Publication Data

US 2012/0290433 A1 Nov. 15, 2012

Related U.S. Application Data

(60) Provisional application No. 61/485,767, filed on May 13, 2011.

(51) Int. Cl.
*G06Q 30/00* (2012.01)
*G06Q 50/00* (2012.01)
*G06Q 30/02* (2012.01)
*G06Q 30/06* (2012.01)

(52) U.S. Cl.
CPC ............ *G06Q 50/01* (2013.01); *G06Q 30/0282* (2013.01); *G06Q 30/0631* (2013.01)

(58) Field of Classification Search
USPC ................................. 705/26.1–27.2
See application file for complete search history.

(56) References Cited

U.S. PATENT DOCUMENTS

| | | | |
|---|---|---|---|
| 8,577,753 B1* | 11/2013 | Vincent et al. | 705/26.7 |
| 2008/0097871 A1* | 4/2008 | Williams et al. | 705/26 |
| 2009/0271289 A1* | 10/2009 | Klinger et al. | 705/26 |
| 2010/0305999 A1* | 12/2010 | Fujioka | 705/7 |
| 2011/0173095 A1* | 7/2011 | Kassaei et al. | 705/26.41 |
| 2012/0246684 A1* | 9/2012 | Yarvis et al. | 725/60 |

OTHER PUBLICATIONS

DoTogether.com Puts Shoppers' Collective Wisdom to Work. Business Wire. Sep. 7, 2010. Page: NA. [recovered from Dialog on Dec. 9, 2013].*

* cited by examiner

*Primary Examiner* — Jeffrey A Smith
*Assistant Examiner* — Kathleen G Palavecino
(74) *Attorney, Agent, or Firm* — Terrile, Cannatti, Chambers & Holland, LLP; Stephen A. Terrile

(57) ABSTRACT

A method and system are disclosed for providing syndicated commerce recommendations. A widget is configured to display a recommendation and is then embedded within a user interface (UI) window. Social data associated with a user is then processed to generate a recommendation object (e.g., a product, an offer, a deal, an advertisement, text, a video, an image, a URI, etc.), which is then displayed within the widget.

20 Claims, 38 Drawing Sheets

RECOMMENDATION WIDGETS FOR A SOCIAL MARKETPLACE

CROSS-REFERENCE TO RELATED APPLICATION

This application claims the benefit under 35 U.S.C. §119 (e) of U.S. Provisional Application No. 61/485,767, filed May 13, 2011, entitled "Social Marketplace." U.S. Provisional Application No. 61/485,767 includes exemplary systems and methods and is incorporated by reference in its entirety.

BACKGROUND OF THE INVENTION

1. Field of the Invention

Embodiments of the invention relate generally to information handling systems. More specifically, embodiments of the invention provide a method and system for providing syndicated commerce recommendations.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

These same information handling systems have played a key role in the rapid growth of electronic commerce on the Internet. One known aspect of electronic commerce is affiliate networks, which allow online merchants to reach a larger audience through participation in various affiliate programs. Typically, potential customers are referred to the merchant's website from an affiliate's web site, which receives a share of any resulting sale as compensation for the referral. Various affiliate network services and benefits generally include referral tracking, reporting tools, payment processing, and access to a large base of participants. Over time, affiliate networks have made progress in simplifying the process of registering affiliate participants fore or more merchant affiliate programs. However, affiliates still face integration challenges when attempting to provide their users a customized subset of the merchant's website.

In recent years, information handling systems have also been instrumental in the widespread adoption of social media into the mainstream of everyday life. Social media commonly refers to the use of web-based technologies for the creation and exchange of user-generated content for social interaction. As such, it currently accounts for approximately 22% of all time spent on the Internet. More recently, various aspects of social media have become an increasingly popular for enabling customer feedback, and by extension, have likewise evolved into a viable marketing channel for vendors. This new marketing channel, sometimes referred to as "social marketing," has proven to not only have a higher customer retention rate than traditional marketing channels, but to also provide higher demand generation "lift."

Another aspect of social marketing that is gaining popularity is syndicated commerce, where a scaled-down version of a merchant's online storefront is embedded in an affiliate's web page or social media site. Such syndicated commerce sites provide the opportunity to increase sales, a portion of which is typically provided to the affiliate. However, these embedded storefronts generally require custom development, which inhibit their implementation. Furthermore, the content (e.g., products, promotions, etc.) they contain are often static and are not presented in either the context of its adjacent content and related topics. Moreover, they generally fail to provide contextual recommendations to guide the viewer in selecting the ideal product for their needs. As a result, the likelihood of a sales conversion occurring is diminished.

SUMMARY OF THE INVENTION

A method and system are disclosed for providing syndicated commerce recommendations. In various embodiments, a widget is generated from a template comprising user-selectable options and then embedded within a web page. In these and other embodiments, social data associated with a user is received and then processed to generate a set of recommendation objects (e.g., a product, an offer, a deal, an advertisement, text, a video, an image, a Uniform Resource Indicator, etc.). The set of recommendation objects are then displayed within the widget.

In various embodiments, the social data is received dynamically from a social data source, such as a social network site. In one embodiment, the user provides identity data to access such a social network site. In this embodiment, the widget uses the identity data to request the social data from the social network site. In various embodiments, the social data may comprise identity data, a social score, or social graph data associated with the user. In certain embodiments, the social data may comprise a page keyword or a referral keyword. In one embodiment, the processing of the social data comprises semantic analysis to generate the set of recommendation objects.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

A method and system are disclosed for providing syndicated commerce recommendations. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
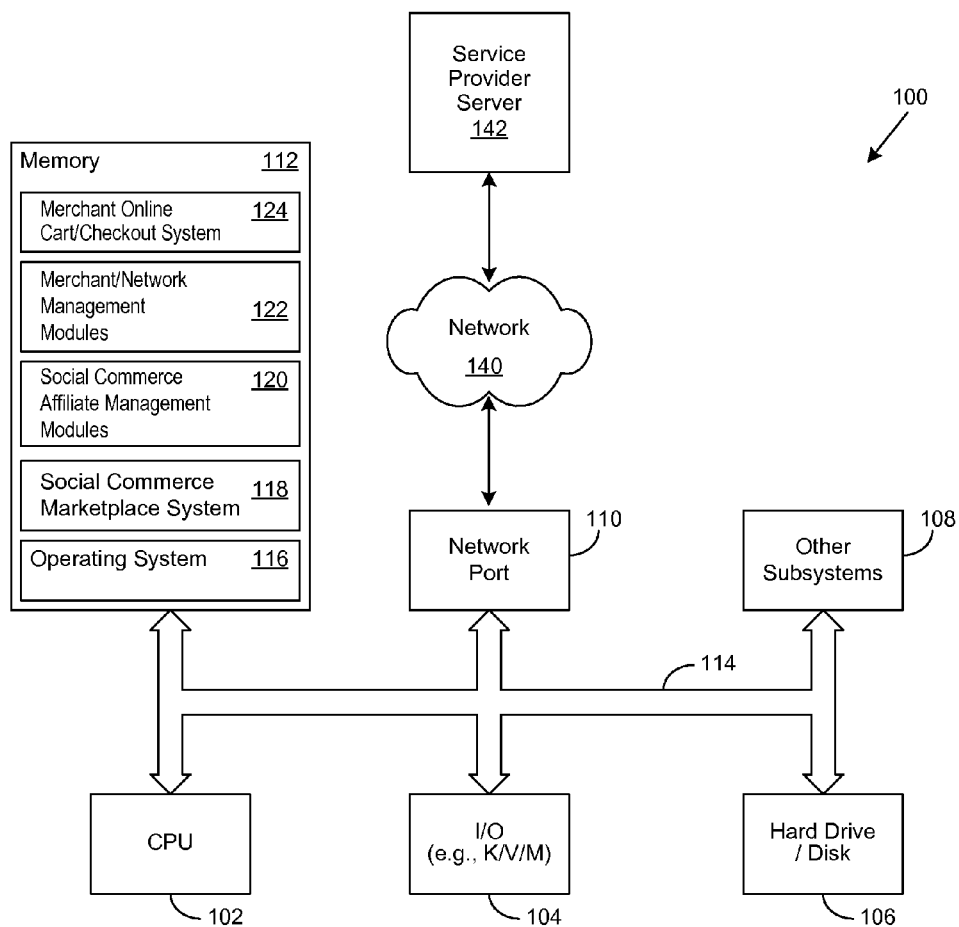
FIG. 1 is a generalized illustration of the components of an information handling system as implemented in the system and method of the present invention.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a social commerce marketplace system 118, a plurality of social commerce affiliate management modules 120, a plurality of merchant/network management modules 122, and a merchant online cart/checkout system 124. In one embodiment, the information handling system 100 is able to download the social commerce marketplace system 118, the plurality of social commerce affiliate management modules 120, the plurality of merchant/network management modules 122, and the merchant online cart/checkout system 124 from the service provider server 142. In another embodiment, the social commerce marketplace system 118, the plurality of social commerce affiliate management modules 120, the plurality of merchant/network management modules 122, and the merchant online cart/checkout system 124 is provided as a service from the service provider server 142.

Figure 2:
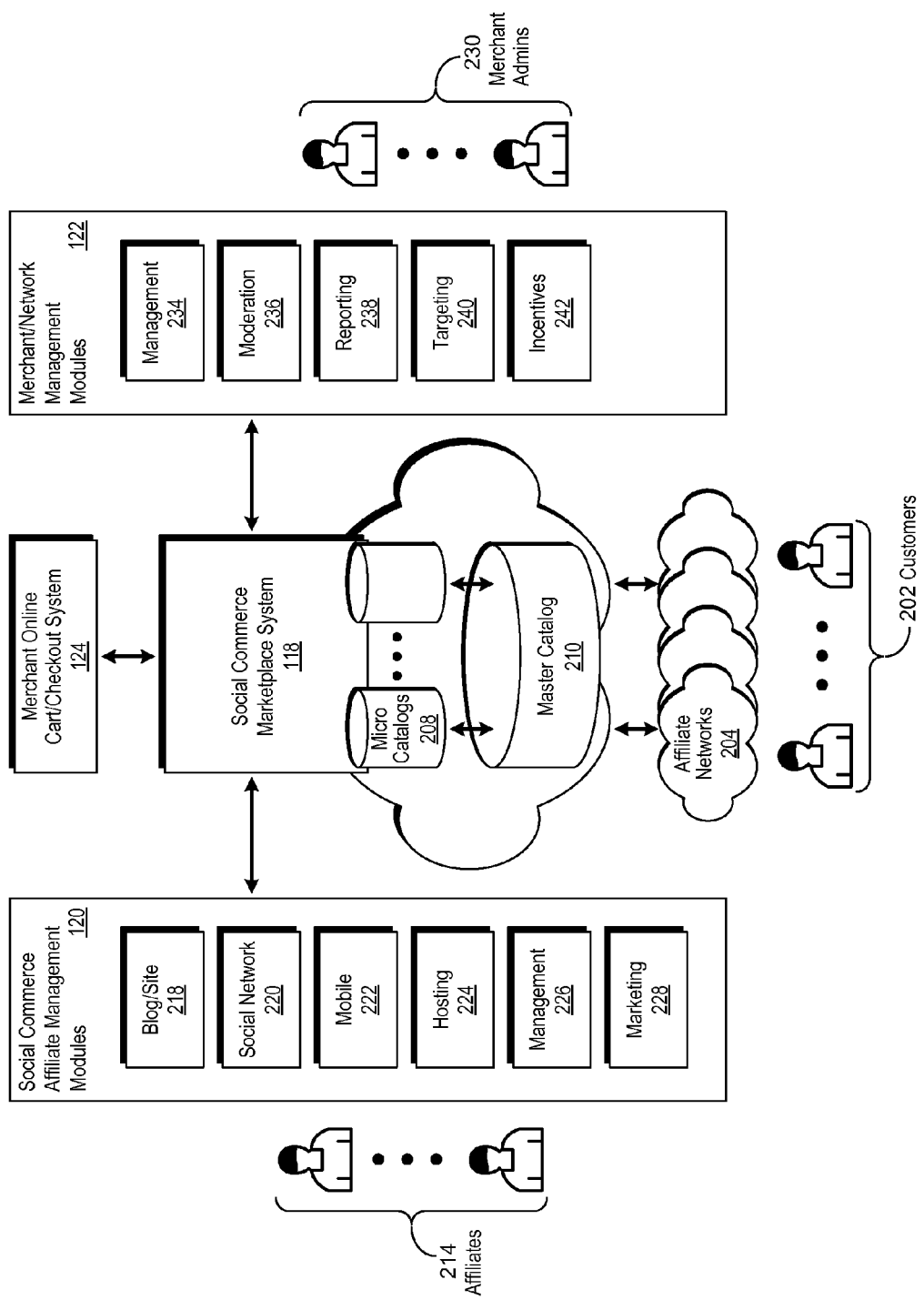
FIG. 2 is a simplified block diagram showing the implementation of a social commerce marketing system.

FIG. 2 is a simplified block diagram showing the implementation of a social commerce marketing system in accordance with an embodiment of the invention. In this embodiment, a social commerce marketplace system 118 is implemented with a plurality of social commerce affiliate management modules 120, a plurality of merchant/network management modules 122, a merchant online cart/checkout system 124. In these and other embodiments, the plurality of social commerce affiliate management modules 120 are accessed and used by a plurality of affiliates 214. Likewise, the plurality of social commerce affiliate management modules 120 comprises a blog/site management module 218, a social network management module 222, and a mobile delivery management module 222. The plurality of social commerce affiliate management modules 120 likewise comprises a hosting management module 224, a social commerce management module 226, and a marketing management module 228.

In one embodiment, the blog/site management module 214 is used by the plurality of affiliates 214 to manage the posting and linking of social commerce content from the affiliate's online blog or website to the social commerce marketplace system 118. In another embodiment, the social network management module 220 is used by the plurality of affiliates 214 to manage the linkages between one or more social media environments and the social commerce marketplace system 118. In yet another embodiment, the mobile delivery management module 222 is used by the plurality of affiliates 214 to manage the delivery of social commerce content to a mobile device. In still another embodiment, the hosting management module 224 is used by the plurality of affiliates 214 to manage the hosting environment(s) of a customized social commerce storefront associated with the affiliate and the merchant. In one embodiment, the social commerce management module 226 is used by the plurality of affiliates 214 to perform social commerce management operations as described in greater detail herein. In yet another embodiment, the marketing management module 228 is used by the plurality of affiliates 214 to perform social commerce marketing operations, as likewise described in greater detail herein.

In various embodiments, the plurality of merchant/network management modules 122 are accessed and used by a plurality of merchant administrators 230. In these and other embodiments, the plurality of merchant/network management modules 122 comprises a merchant/network management module 234, and a social commerce moderation module 236. Likewise, the plurality of merchant/network management modules 122 comprises a social commerce reporting module 238, a targeting module 240, and an incentives module 242.

In one embodiment, the merchant/network management module is used by is used by the plurality of merchant administrators 230 to manage a plurality of affiliate social commerce storefronts and a plurality of affiliate networks 204. In another embodiment, the moderation management module 236 is used by the plurality of merchant administrators 230 to monitor and moderate social commerce content and associated social media content related to the plurality of affiliates 214. In yet another embodiment, the social commerce reporting module 238 is used by the plurality of merchant administrators 230 to administer and deliver a plurality of social commerce reports as described in greater detail herein. In one embodiment, the targeting module 240 is used by the plurality of merchant administrators 230 to perform targeted advertising and promotion operations familiar to those of skill in the art and described in greater detail herein. In another embodiment, the incentives module 242 is used by the plurality of merchant administrators 230 to manage the accounting and payment of incentives to the plurality of affiliates 214 as compensation for referring customers to the merchant. As described in greater detail herein, the plurality of social commerce affiliate management modules 120 and the plurality of merchant/network management modules 122 may include additional modules and the foregoing is not intended to limit the spirit, scope or intent of the invention.

Referring now to FIG. 2, a plurality of users, such as customers 202, are referred by a plurality of affiliate networks 204 to the social commerce marketplace system 118 as described in greater detail. Once referred, the customers 202 are presented with a customized social commerce storefront that is associated with an individual affiliate of the plurality of affiliates 214 and the merchant. In various embodiments, each of the customized social commerce storefronts comprises a micro catalog 208 of purchasable products, which is a subset of a master catalog 210 comprising a set of available products. In these and other embodiments, and as likewise described in greater detail herein, the customized social commerce storefronts comprise social commerce content related to the purchasable products. In these various embodiments, the customers 202 review the social commerce content and select individual purchasable products for purchase. Once selected, an online purchase transaction familiar to skilled practitioners of the art is completed with the merchant online cart/checkout system 124.

Figure 3:
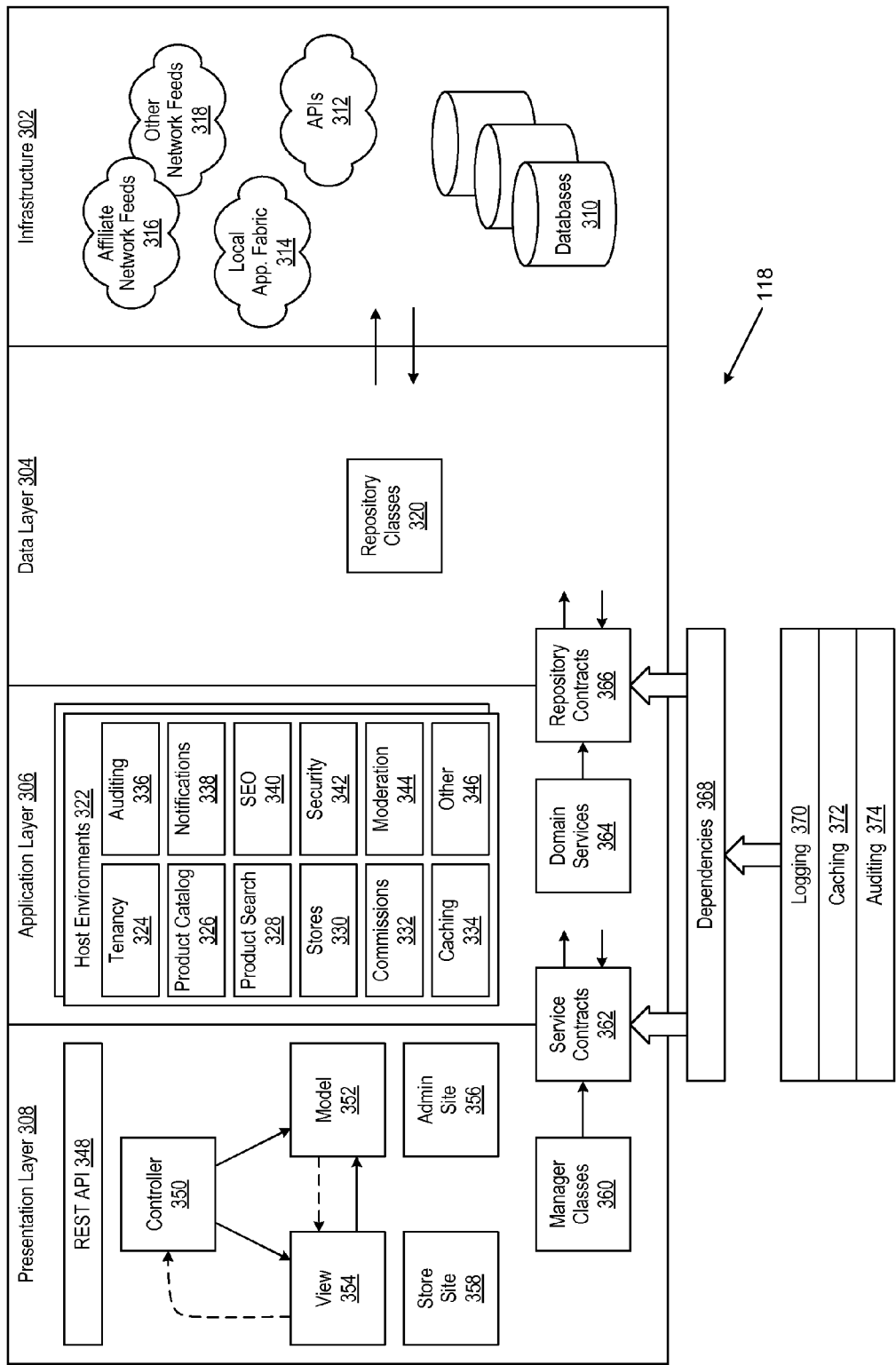
FIG. 3 is a simplified block diagram showing a high-level architecture of a social commerce marketplace system.

FIG. 3 is a simplified block diagram showing a high-level architecture of a social commerce marketplace system as implemented in accordance with an embodiment of the invention. In this embodiment, the architecture a social commerce marketplace system 118 comprises infrastructure 302, data 304, application 306 and presentation 308 layers. As shown in FIG. 3, the infrastructure 302 layer comprises feeds from affiliate networks 316, as described in greater detail herein, and other networks 318, such as advertising networks known to those of skill in the art. The infrastructure 302 layer likewise comprises a local application fabric 314, as likewise known to those of skill in the art, a plurality of application programming interfaces (APIs) 312, and a plurality of databases 310, as described in greater detail herein. The data 304 layer likewise comprises repository classes 320, which are used for the exchange of data between the data 304 and infrastructure 302 layers.

Likewise, the application 306 layer comprises host environments 322, which in turn comprise a tenancy management module 324, a product catalog management module 326, and a product search module 328. The host environments 322 likewise comprise a stores management module 330, a commission management module 332, and a caching module 334. Likewise, the host environments 322 comprise an auditing module 336, a notifications module 338, a search engine optimization (SEO) module 340, a security management module 342, a moderation management module 344, and other modules 346 as described in greater detail herein.

In one embodiment, the tenancy management module 324 is used by merchant administrators to manage a plurality of affiliate tenancies in a virtual environment. In another embodiment, the product catalog management module 326 is used to manage available products in a master catalog and purchasable products, which are subsets of the available products, in micro catalogs as described in greater detail herein. In yet another embodiment, the product search module 328 is used with various other modules in the initiation, provisioning, and management of affiliate storefronts. In still another embodiment, the commission management module 332 is used to track, account, and pay commissions to affiliates as compensation for referring customers to the merchant. In one embodiment, the caching module 334 is used to cache social commerce content and other data related to conducting social commerce operations.

In another embodiment, the auditing module 336 is used to audit social commerce transactions that are performed within the social commerce marketplace system. In yet another embodiment, the notifications module 338 is use to manage notifications to affiliates as well as users referred by the affiliates to the social commerce marketplace system. In still another embodiment, the SEO module 340 is used to perform SEO operations known to skilled practitioners of the art. In this embodiment, the SEO operations, as described in greater detail herein, are performed to optimize the identification of a purchasable product according to the search terms used by either an affiliate or a user of a social media environment. In one embodiment, the security module is used to maintain the security of the social commerce marketplace system. In another embodiment, the moderation module 344 is used to monitor and moderate social commerce content and associated social media content related to a plurality of affiliates. In yet another embodiment, the other modules 346 comprise additional modules, as described in greater detail herein, that operate within the host environments 322.

In various embodiments, the presentation 308 layer comprises a Representational State Transfer (REST) application program interface (API) 348 known to skilled practitioners of the art. In these and other embodiments, the presentation 308 layer likewise comprises a controller module 350 a presentation model 352, a presentation view 354, and a plurality of administration 356 and affiliate storefront 358 sites. In these various embodiments, the controller module 350 interacts with the presentation model 354 and presentation view 354, which likewise interact with each other, to present different aspects of the plurality of administration 356 and affiliate storefront 358 sites. Likewise, the presentation view 354 module provides feedback to the controller module 350.

Referring now to FIG. 3, the presentation 308 layer comprises manager classes 350 and the application 306 layer comprises domain services. The manager classes 360 provide presentation layer data to the service contracts module 362, which is then used for the management of the domain service 364. In turn, the domain services 364 provide application layer data to the repository contracts module 366, where it is used for the management of the repository classes 320. Likewise, the service contracts module 362 and the repository contracts module 366 are managed and bounded by a dependencies module 368. In turn, the dependencies module 368 is managed with the logging 370, caching 372, and auditing 374 management modules.

Figure 4A:
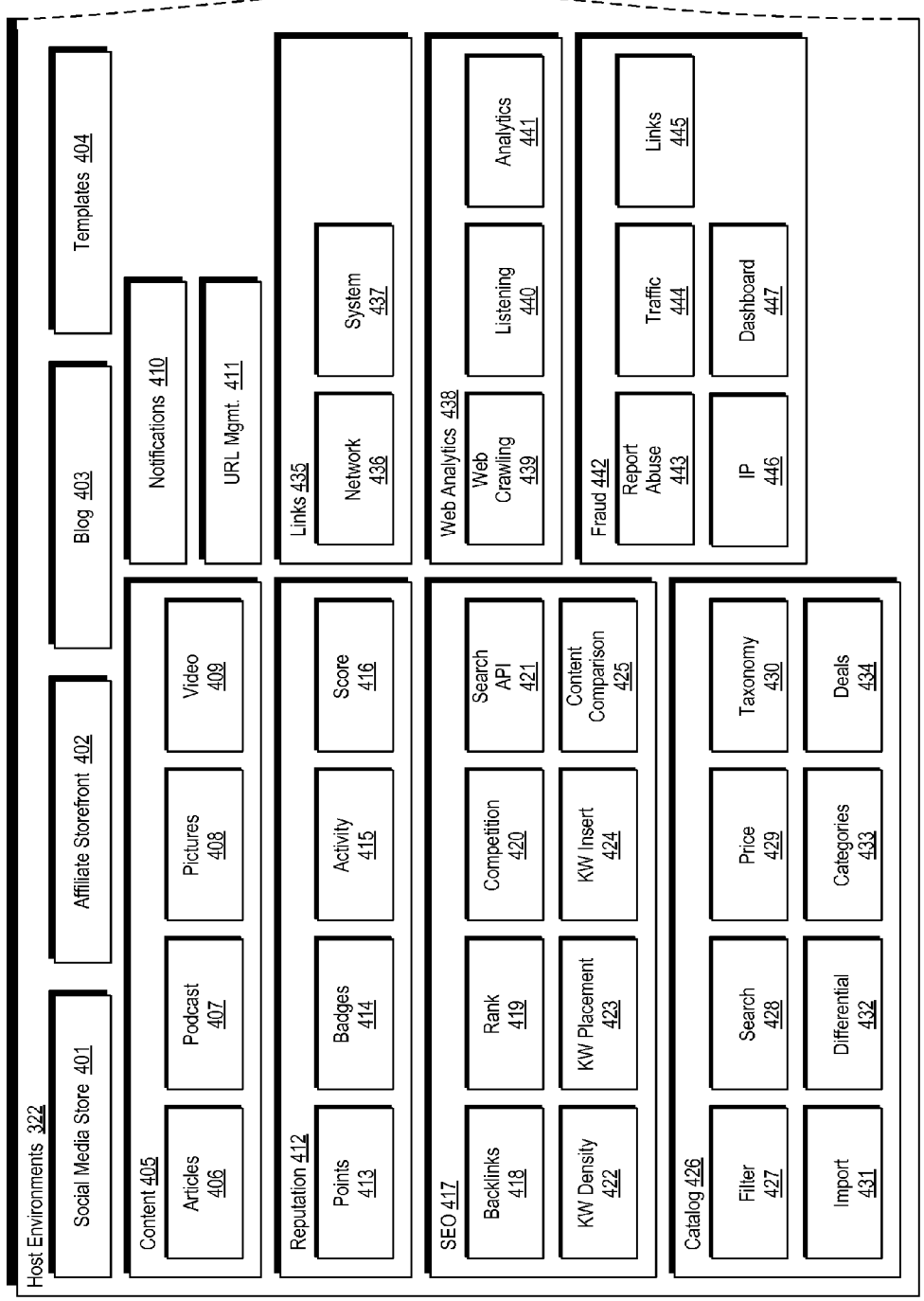
FIGS. 4a-b are a simplified block diagram showing a plurality of social commerce modules implemented within a plurality of host environments.
Figure 4B:
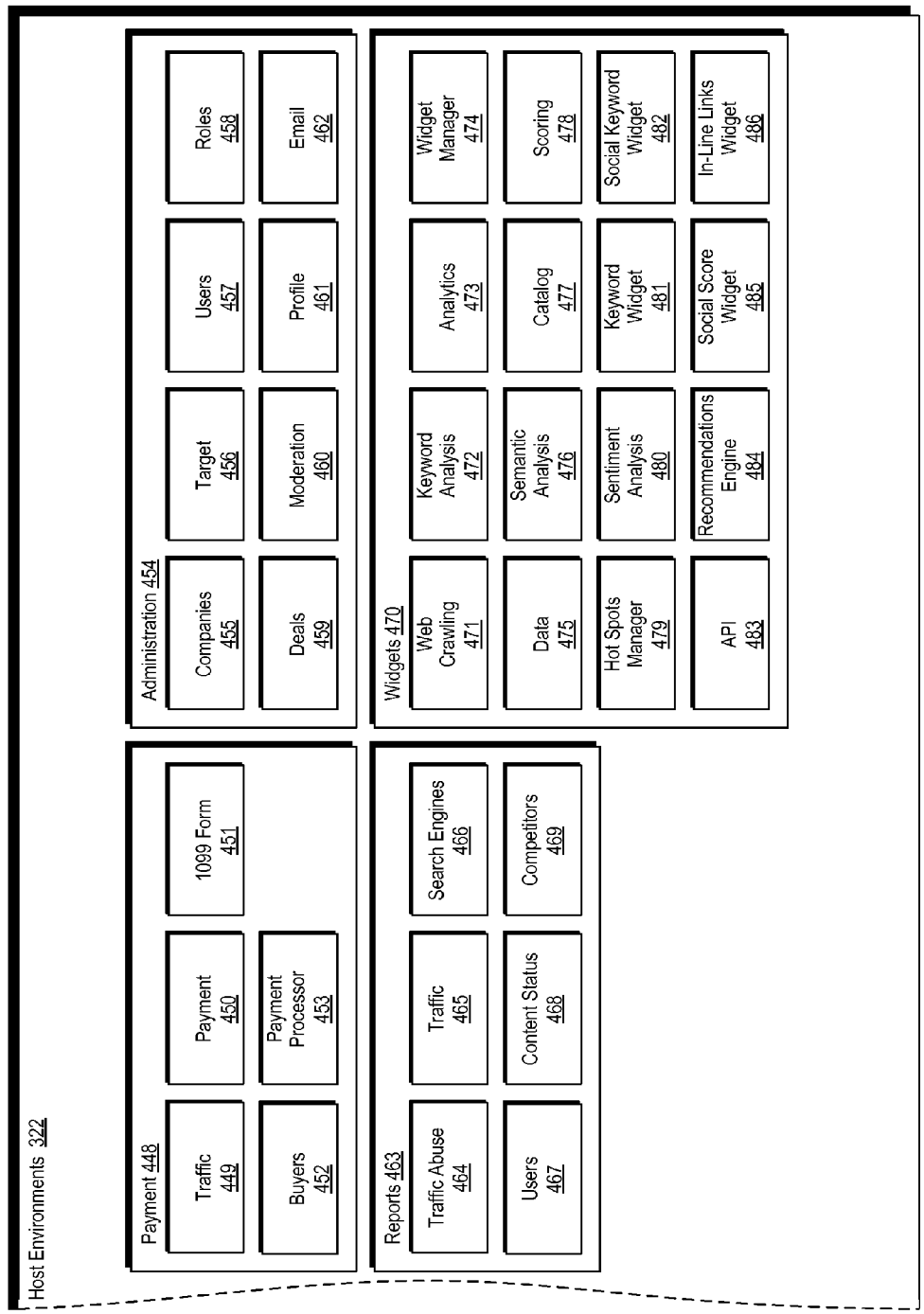

FIGS. 4a-b show a simplified block diagram of a plurality of social commerce modules implemented within a plurality of host environments in accordance with an embodiment of the invention. In this embodiment, the host environments 322 comprise social media store 401, affiliate storefront 402, blog 403, templates 404, content 406, notifications 410, uniform resource locator (URL) 411, reputation 412, and search engine optimization (SEO) 417 management modules. Likewise, the host environments 322 comprise catalog 426, links 435, web analytics 438, fraud 442, payment 448, administration 454, reports 463, and widget 470 management modules.

In one embodiment, the social media store 401 management module is used to manage a social commerce storefront that is associated with an affiliate's presence and activities within a social media environment. In another embodiment, the affiliate storefront 402 management module is used to manage a social commerce storefront that is associated with an affiliate's web site or online blog. In yet another embodiment, the blog 403 management module is used to manage an affiliates blog activities as it relates to social commerce activities, processes and operations as described in greater detail herein. In still another embodiment, as likewise described in greater detail herein, the templates 404 management module is used for the automated configuration of social commerce storefront pages. In one embodiment, the notifications 410 management module is used for the management of notifications to affiliates and users associated with affiliates, such as users of an affiliate's online social commerce presence. In various embodiments, the affiliate's online presence may comprise a blog, a website, or a community of interest or conversation thread in a social media environment. In another embodiment, the URL 411 management module is used to manage URL links between the host environments 322 and the affiliate's various online social commerce presences.

In yet another embodiment, the content 405 management module further comprises articles 406, podcast 407, pictures 408, and video 409 management sub-modules. In this and other embodiments, the articles 406, podcast 407, pictures 408, and video 409 management sub-modules are used by affiliates to manage their respective, associated content as it relates to social commerce operations. In still another embodiment, the reputation 412 management module comprises points 413, badges 414, activity 415, and score 416 management sub-modules. In this and other embodiments, the reputation 412 management module comprises points 413, badges 414, activity 415, and score 416 management sub-modules are used by the merchant to manage reputation data associated with affiliates. As used herein, reputation data refers to data associated with social commerce activities performed by an affiliate. As an example, an affiliate may receive points from a merchant for each item of social commerce content they product. Likewise, badges may be awarded upon achievement of various point tiers or frequency of activity. Likewise, each social commerce content item may receive a score that is associated with the achievement of the points and badges. It will be appreciated that many such examples are possible and the foregoing is not intended to limit the spirit, scope, or intent of the invention.

In one embodiment, the SEO management 417 module comprises backlinks 418, rank 419, competition 420, search application program interface (API) 421, keyword density 422, keyword placement 423, keyword insertion 424, and content comparison 425 management sub-modules. In this and other embodiments the various sub-modules of the SEO management 417 module are used by affiliates and the merchants to perform SEO operations familiar to those of skill in the art. As an example, the backlinks 418 management sub-module may be used to determine prior web site locations that a user has visited prior to being referred to an affiliate's social commerce storefront. Likewise, the rank 419 management sub-module may be used to determine the search engine rank assigned to the affiliate's social commerce storefront as well as the individual search engine ranking of the search terms that resulted in the referral. As another example, the competition 420 management sub-module may be used by the merchant to rank the search engine popularity of their competitors, or alternatively, the frequency that a competitor's web site is returned as a result of a search by a user of a social media environment. Likewise, the search API 421 management sub-module may be used by the merchant and affiliates alike to gain access to various search engines in order to receive search metadata. As yet another example, the keyword density 422, placement 423, and insertion 424 management sub-modules may likewise be used by the merchant and the affiliates to optimize searches through the use of predetermined keywords within related social commerce content. As still another example, the content comparison 425 sub-module may be used to compare various items of social commerce content to determine which items perform better than others during SEO operations.

In another embodiment, the catalog 426 management module comprises filter 427, search 428, price 429, taxonomy 430, import 431, differential 432, categories 433, and deals 434 management sub-modules. In this and other embodiments, the filter 427, search 428, price 429, taxonomy 430, import 431, differential 432, categories 433, and deals 434 management sub-modules are used by the affiliate for managing their social commerce storefronts. For example, the filter 427, search 428, price 429, differential 432, deals 434, and import 431 management sub-modules may be used individually, or in combination, to identify and populate a set of purchasable products within a micro catalog from a set of available products contained in a master catalog. Likewise, the taxonomy 430 and categories 433 management sub-modules may be used to understand the interrelationship of various purchasable products and how they are categorized within the affiliate's social commerce storefront. It will be appreciated that many such examples are possible and the foregoing is not intended to limit the spirit, scope, or intent of the invention.

In yet another embodiment, the links 435 management module comprises network 436 and system 437 management sub-modules, which are used to manage the linkages between the various systems, modules, and sub-modules of the social commerce marketplace system and various affiliate and advertising networks. In still another embodiment, the web analytics 438 module comprises web crawling 439, listening 440, and analytics 441 management sub-modules. In this and other embodiments the web crawling 439, listening 440, and analytics 441 management sub-modules are used by the merchant to perform web analytics operations familiar to skilled practitioners of the art. As an example, the merchant may use the web crawling 439 management sub-module to perform web crawling operations to discover conversation threads associated with its products. Once discovered, the listening 440 management sub-module may be used to monitor the conversations threads, which are then analyzed with the analytics 441 management sub-module to determine their relevance and possible effect on social commerce operations. Those of skill in the art will be knowledgeable of many such examples. Accordingly, the foregoing is not intended to limit the spirit, scope, or intent of the invention.

In one embodiment, the fraud 442 management module comprises an abuse reporting 443, traffic 444, links 445, Internet Protocol (IP) 446, and dashboard 447 management sub-modules. In this and other embodiments, the abuse reporting 443, traffic 444, links 445, Internet Protocol (IP) 446, and dashboard 447 management sub-modules are used by the merchant to identify, mitigate, and prevent fraudulent behavior within the social commerce market place system. As an example, the traffic 444, links 445, and IP 446 management sub-modules may be used to identify the source of fraudulent behavior. Once identified, it may be reported by the abuse reporting 443 management sub-module and then displayed for review within a user interface by the dashboard 447 sub-module.

In another embodiment, the payment 448 module comprises a traffic 449, payment 450, 1099 Form 451, buyers 452, and payment processor 453, management sub-modules. In this and other embodiments, the traffic 449, payment 450, 1099 451, buyers 452, and payment processor 453, management sub-modules are used by the merchant for the management of payment to affiliates. As an example, the buyers 452 and traffic 449 management sub-modules may be used to identify individual buyers and the traffic they generate at an affiliate's social commerce storefront. In turn, the payment 450 and payment processor 453 sub-modules may be used to track the payments made by the buyers, which are then processed by various payment processors. Likewise, the same sub-modules may be used to track commission payments made by the merchant to individual affiliates. The output of those sub-modules may then be processed by the 1099 Form 451 sub-module for managing reporting of the commission payments to the affiliate to the Internal Revenue Service (RIS).

In yet another embodiment, the administration 454 module comprises companies 455, target 456, users 457, roles 458, deals 459, moderation 460, profile 461, and email 462 management sub-modules. In this embodiment, the companies 455, target 456, users 457, roles 458, deals 459, moderation 460, profile 461, and email 462 management sub-modules are used by the merchant to administer the various users of the social commerce marketplace system. As an example, the target 456 management sub-module may be used, individually or in conjunction with, the target 456, users 457, profile 461, and roles 458 management sub-modules to identify specific users of a social media environment. Once identified, their social media interactions may be monitored by the moderation 460 management sub-module, and in turn the email 462 and deals 459 management sub-modules may be used individually, or in combination, to target predetermined users.

In still another embodiment, the reports module 463 comprises traffic abuse 463, traffic 465, search engines 466, users 467, content status 468, and competitors 469 reporting sub-modules. In this embodiment, the traffic abuse 463, traffic 465, search engines 466, users 467, content status 468, and competitors 469 reporting sub-modules are used by the merchant to generate various reports related to social commerce operations, which in turn may be provided to an affiliate. As an example, the content status 468 reporting sub-module may report on the status of various items of social commerce content and the search engines 466 reporting sub-module may report on the search results it generates. In turn, the traffic reporting 465 sub-module may be used to report on the social commerce traffic resulting from the search results and the users 467 reporting sub-module may provide reports related to the various users referred to the social commerce site. Likewise, the traffic abuse reporting sub-module 464 may be used to report on various traffic abuses related to the social commerce marketplace system, while the competitors 469 reporting sub-module may provide reports related to competitive activity from competitors.

In various embodiments, the widgets module 470 may comprise web crawling 471, keyword analysis 472, analytics 473, widget manager 474, data 475, semantic analysis 476, catalog management 477, scoring 478, hot spots manager 479, sentiment analysis 480, keyword widget 481, social keyword widget 482, API 483, recommendations engine 484, social score widget 485 and in-line links widget 486 sub-modules. In one embodiment, the web-crawling 471 sub-module is implemented to perform web crawling operations to discover keywords within web pages. In another embodiment, the keyword analysis 472 sub-module is implemented to determine related keywords, competition of keywords, search frequency of keywords, and locality of keywords. In yet another embodiment, the analytics 473 sub-module is implemented to provide the utilization of widgets by visitors. In still another embodiment, the widget manager 474 sub-module is implemented to provide a set of user interfaces to configure and publish a widget. In various embodiments, the widget manager 474 sub-module is implemented to provide templates that comprise user interface (UI) themes and interactions that determine the end-user experience. In these and other embodiments, the widget manager 474 sub-module comprises a wizard that provides a multi-step process to configure the widget. In one embodiment, the widget manager 474 sub-module comprises a dashboard providing a UI to access the wizard, embed associated programming code, and generate related reports.

In one embodiment, the data 475 sub-module is implemented to process social graph, user, and catalog data. In another embodiment, the semantic analysis 476 sub-module is implemented to semantically extract keywords, topics, people and places from strings of text. In another embodiment, the catalog 476 sub-module is implemented with a widget to process catalog data as described in greater detail herein. In yet another embodiment, the hot spots manager 477 sub-module comprises a set of user interfaces to configure and publish images and videos that contain hot spots. In still another embodiment, the sentiment analysis 478 sub-module is implemented to extract positive, neutral and negative tone from strings of text. In one embodiment, the page keyword widget 479 sub-module is implemented to provide a widget that automatically matches catalog products to the context of keywords extracted from a web page. In another embodiment, the social keyword widget 480 sub-module is implemented to provide a widget that automatically matches catalog products to a user's context by matching keywords and themes from their social graph. In yet another embodiment, the API 481 sub-module is implemented to provide an API between a widget and various operating environments. In still another embodiment, the recommendation engine 482 sub-module is implemented to automatically select or recommend objects that best match the user's context based on a set of algorithms. In one embodiment, the social score widget 783 sub-module is implemented to provide a widget that dynamically presents catalog products and discounts according to a user's social score. In yet another embodiment, the in-line links widget 784 sub-module is implemented to provide a widget that automatically creates in-line hyperlinks within text strings based on keywords that match objects from a catalog. It will be appreciated that many such embodiments are possible and the foregoing is not intended to limit the spirit, scope or intent of the invention.

Figure 5:
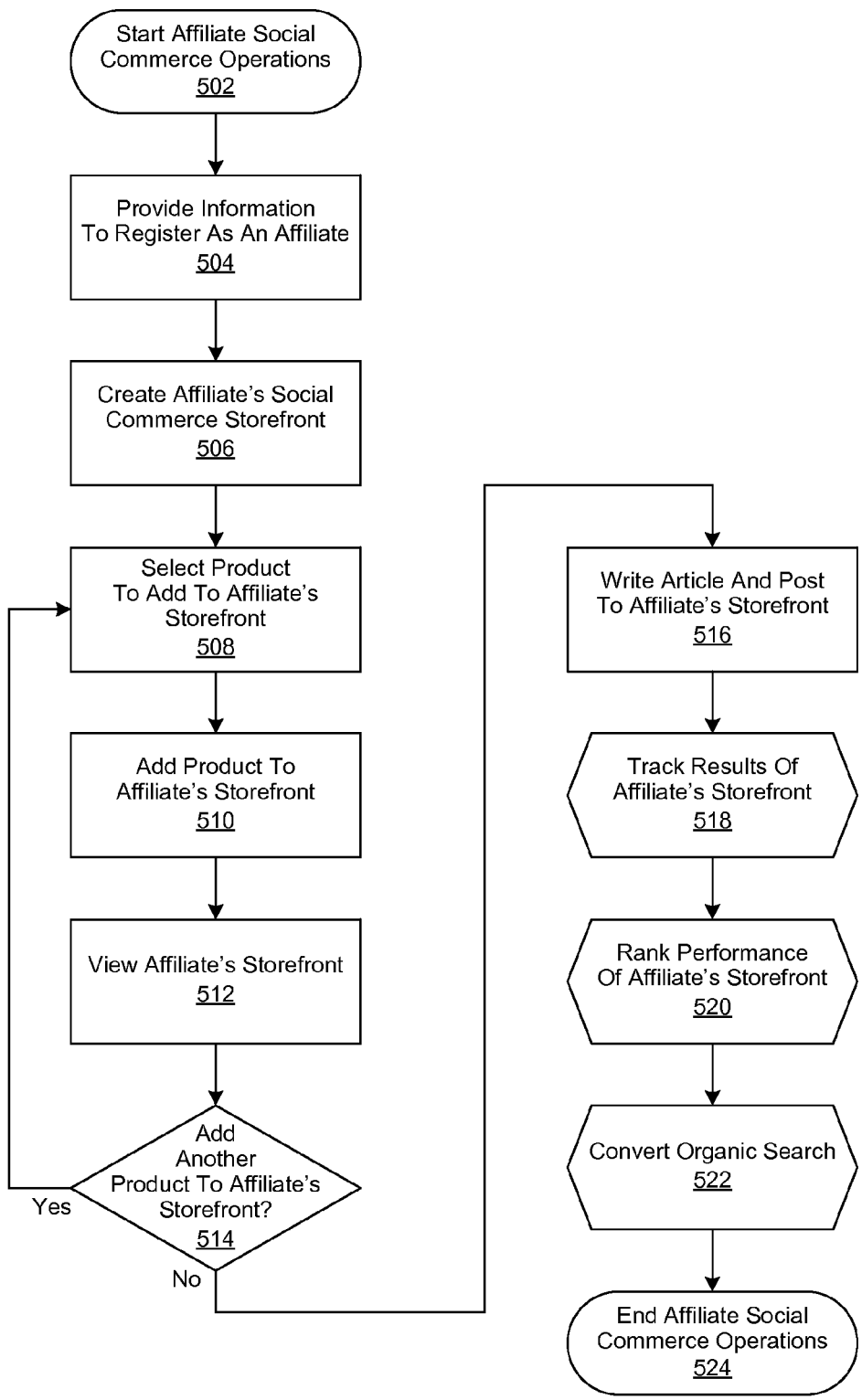
FIG. 5 is a generalized flow chart of social commerce initiation operations performed on behalf of an affiliate.

FIG. 5 is a generalized flow chart of social commerce initiation operations performed on behalf of an affiliate in accordance with an embodiment of the invention. In this embodiment, affiliate social commerce operations are begun in step 502, followed by a candidate affiliate providing information to a merchant in step 504 to register as an affiliate. The merchant then uses the provided information to create a social commerce storefront for the affiliate in step 506. The affiliate then proceeds to select a product to add to their social commerce storefront in step 508. In various embodiments, the product is selected from a plurality of available products contained in a master catalog. The selected product is then added to the affiliate's social commerce storefront in step 510. In various embodiments, a selected product becomes a purchasable product once it is added to the affiliate's social commerce storefront.

The affiliate then views their social commerce storefront in step 512, followed by a determination being made in step 514 whether to add an additional product. If so, then the process is continued, proceeding with step 508. Otherwise, an article related to one or more of the purchasable products is written in step 516 and then posted to the affiliate's social commerce storefront. The ongoing sales results of the affiliate's social commerce storefront is then tracked in step 518, as well as the ongoing ranking of its performance relative to other affiliate social commerce storefronts in step 520. Ongoing conversion of organic searches resulting in sale is likewise tracked in step 522, followed by affiliate social commerce initiation operations being ended in step 524.

Figure 6A:
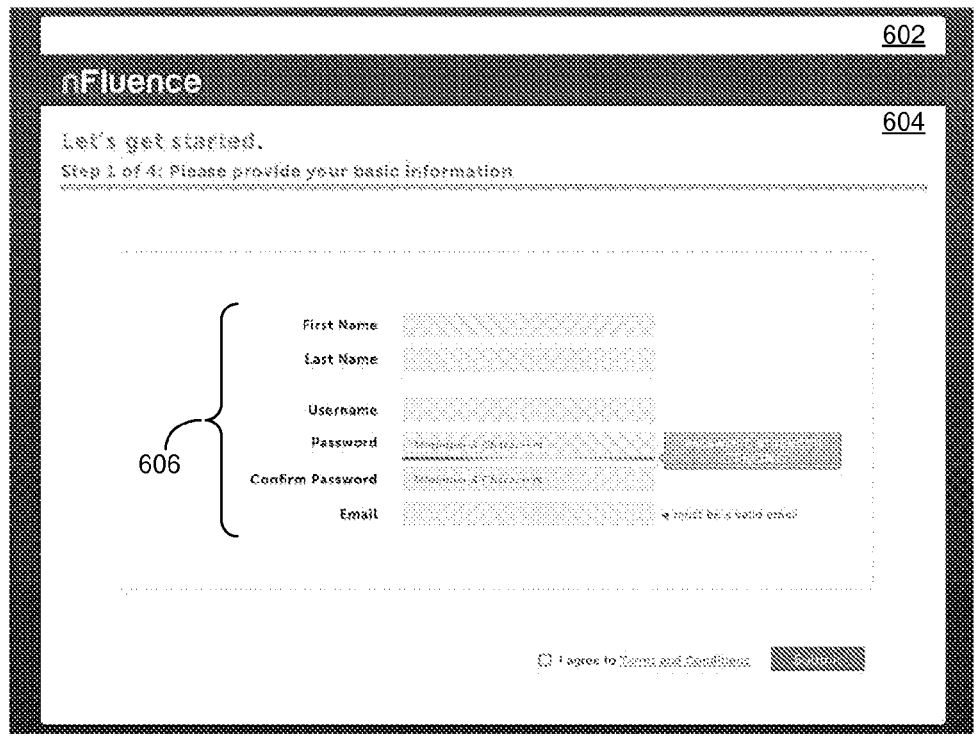
FIGS. 6a-d are generalized depictions of social commerce initiation operations performed on behalf of an affiliate within a plurality of user interface windows.
Figure 6B:
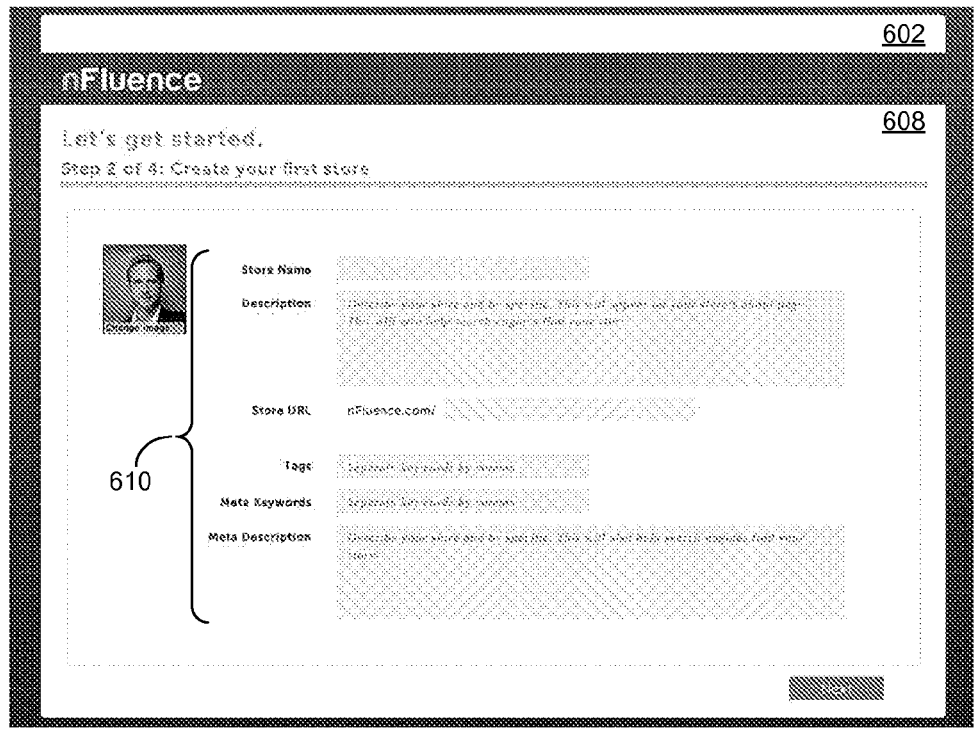
Figure 6C:
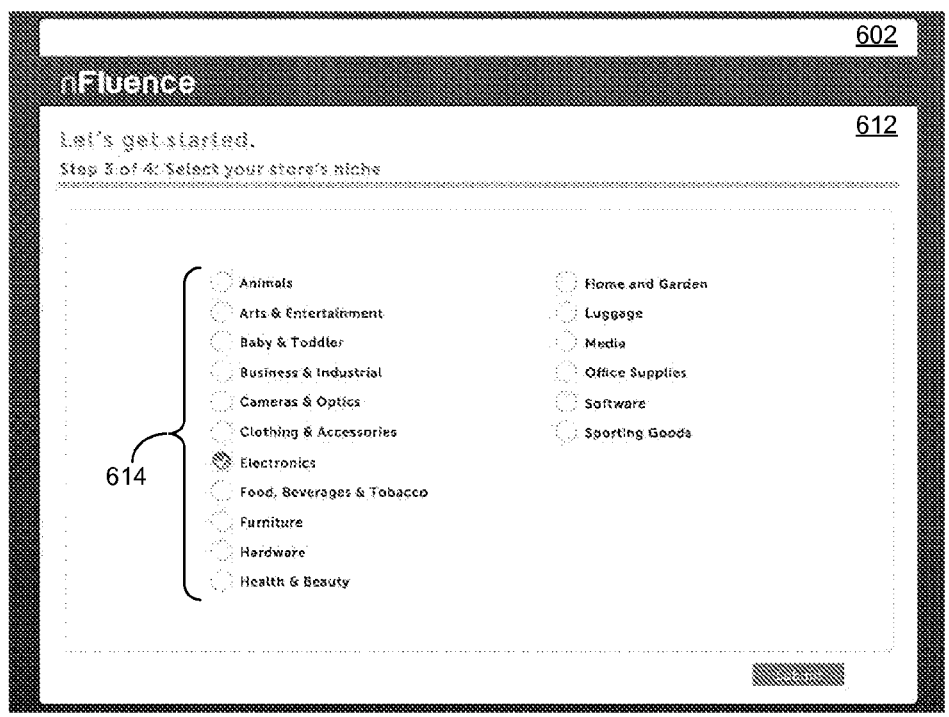
Figure 6D:

FIGS. 6a-d are generalized depictions of social commerce initiation operations performed on behalf of an affiliate within a plurality of user interface windows in accordance with an embodiment of the invention. In this embodiment, a social commerce storefront management module, as described in greater detail herein, is implemented within a window 604 of a user interface (UI) 602. As shown in FIG. 6a, the UI window 604 comprises data entry fields 606 for a candidate affiliate to provide information to initiate the creation of a social commerce storefront. Referring now to FIG. 6b, the affiliate then provides additional information 610 associated with their social commerce storefront. As shown in FIG. 6c, the affiliate selects the category 614 of their social commerce storefront, and as likewise shown in FIG. 6d, selects products 614 to be displayed for purchase within their social commerce storefront.

Figure 7:
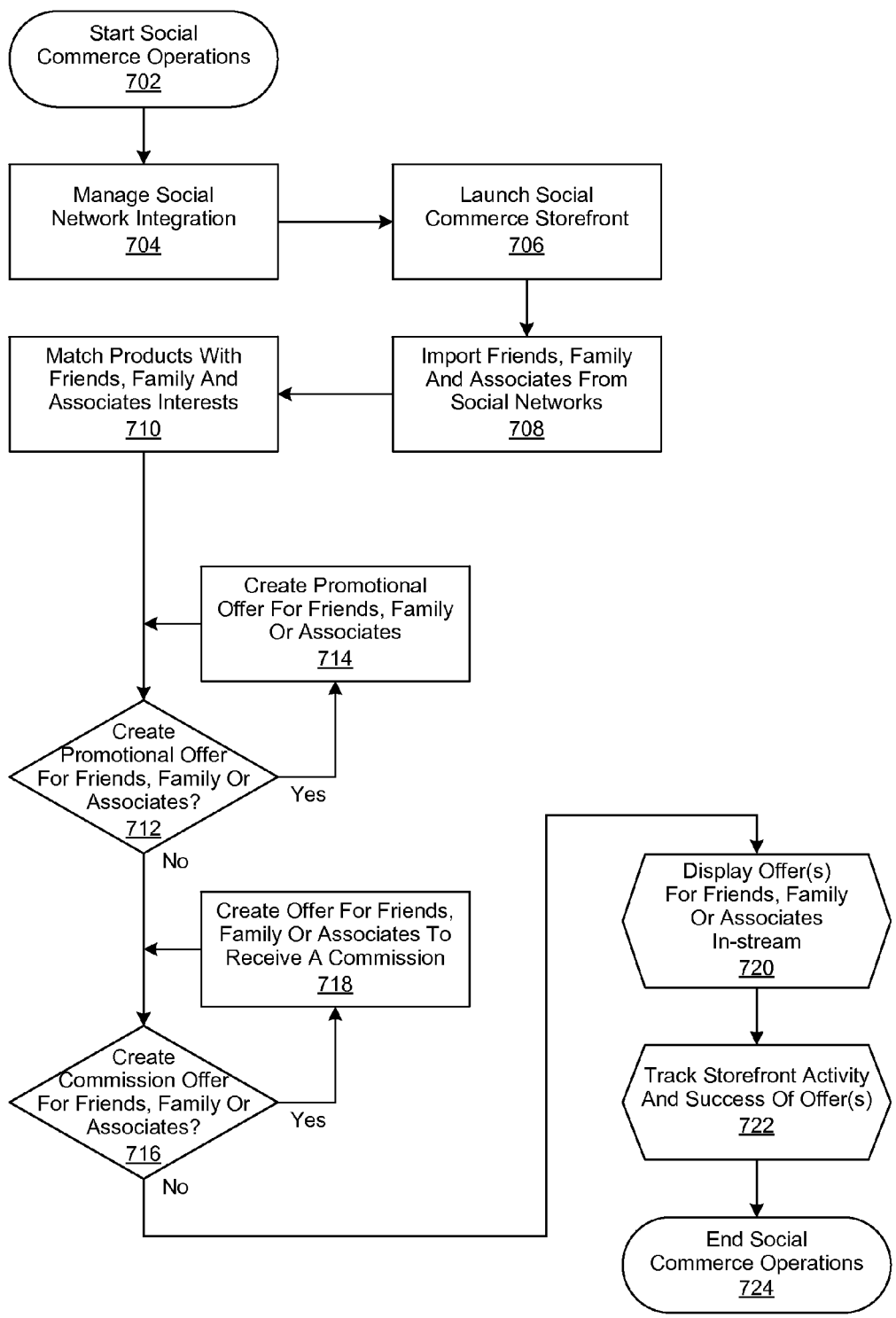
FIG. 7 is a generalized flow chart of the performance of social commerce operations.

FIG. 7 is a generalized flow chart of the performance of social commerce operations as implemented in accordance with an embodiment of the invention. In this embodiment, social commerce operations are begun in step 702, followed by the affiliate managing the integration of the social commerce storefront in step 704 with a social media environment, such as a social network. In various embodiments, the integration may be with an affiliate web site or blog. The affiliate then launches the social commerce storefront in step 706, followed by the importation of friends, family, and associates from one or more social media environments (e.g., a social network) in step 708. The friends, family and associates are then matched with products that are appropriate to their interests in step 710, followed by a determination in step 712 whether to create a promotional offer for them. If so, then a promotional offer is created in step 714 and the process is continued, proceeding with step 712. Otherwise, a determination is made in step 716 whether the affiliate will offer to provide an offer to pay a commission to the friends, family or associates in return for referrals. If so, then a commission offer is prepared in step 718 and the process is continued, proceeding with step 716. Otherwise the promotion offers(s), the commission offer(s), or both, are displayed to the friends, family and associates in-line within the social media environment in step 720. Ongoing activity at the affiliate's social commerce storefront, and the corresponding success of the offer(s), is tracked in step 722 and social commerce operations are then ended in step 724.

Figure 8:
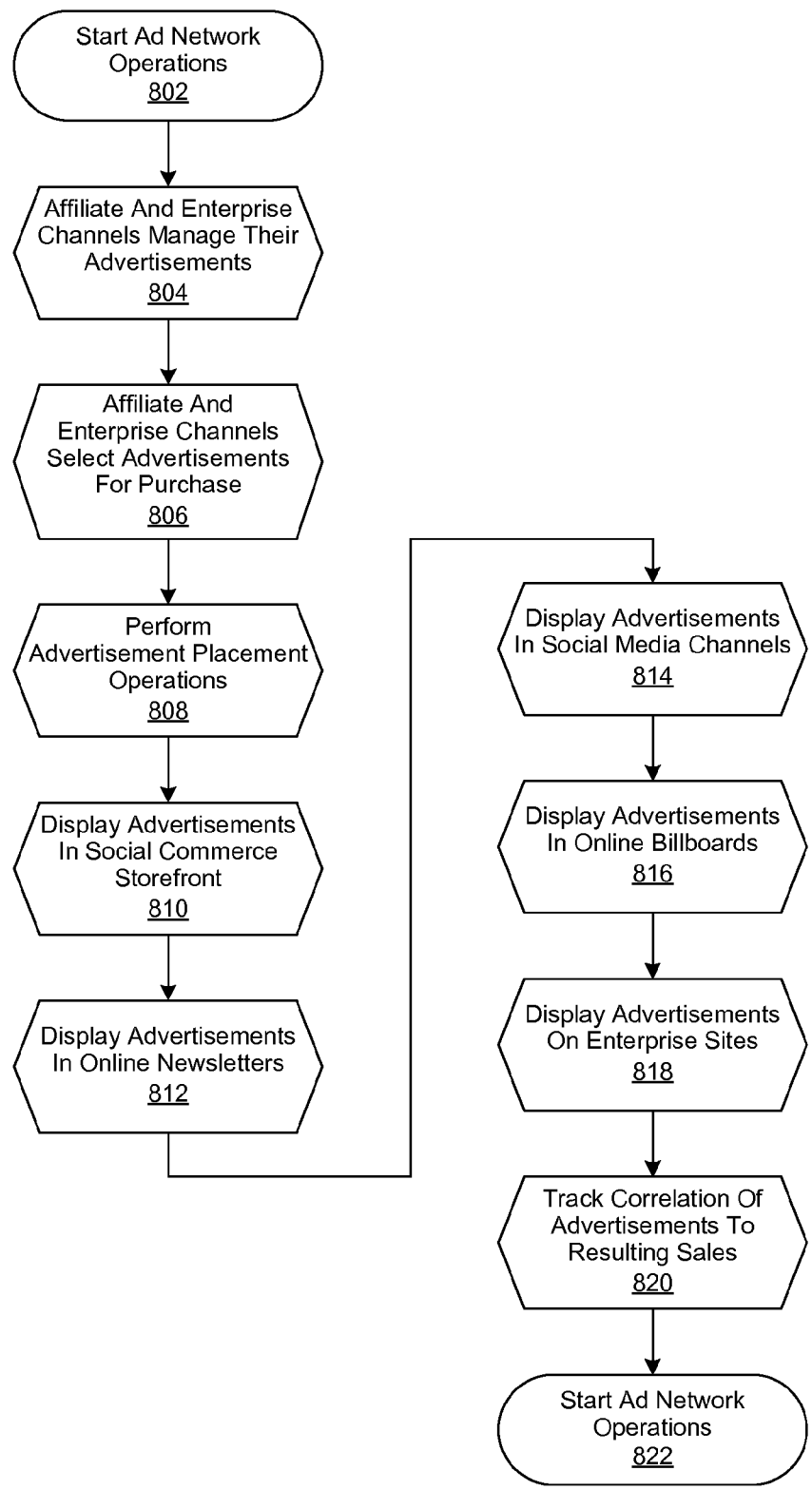
FIG. 8 is a generalized flow chart of the performance of social commerce advertising network management operations.

FIG. 8 is a generalized flow chart of the performance of social commerce advertising network management operations as implemented in accordance with an embodiment of the invention. In this embodiment, advertising network operations are begun in step 802, followed by ongoing operations in step 804 for affiliate and enterprise channels to manage their online advertisements. In step 806 the affiliate and enterprise channels perform ongoing operations to select online advertisements for purchase, followed by corresponding ongoing operations in step 808 to place the purchased online advertisements in predetermined online locations. In steps 810, 812, 814, 816, and 818, the affiliate and enterprise channels perform ongoing operations respectively display the online advertisements in social commerce storefronts, online newsletters, social media channels, online billboards, and enterprise sites. Ongoing operations are then performed in step 820 to correlate sales to the placement of the online advertisements, followed by advertising network operations being ended in step 822.

Figure 9A:
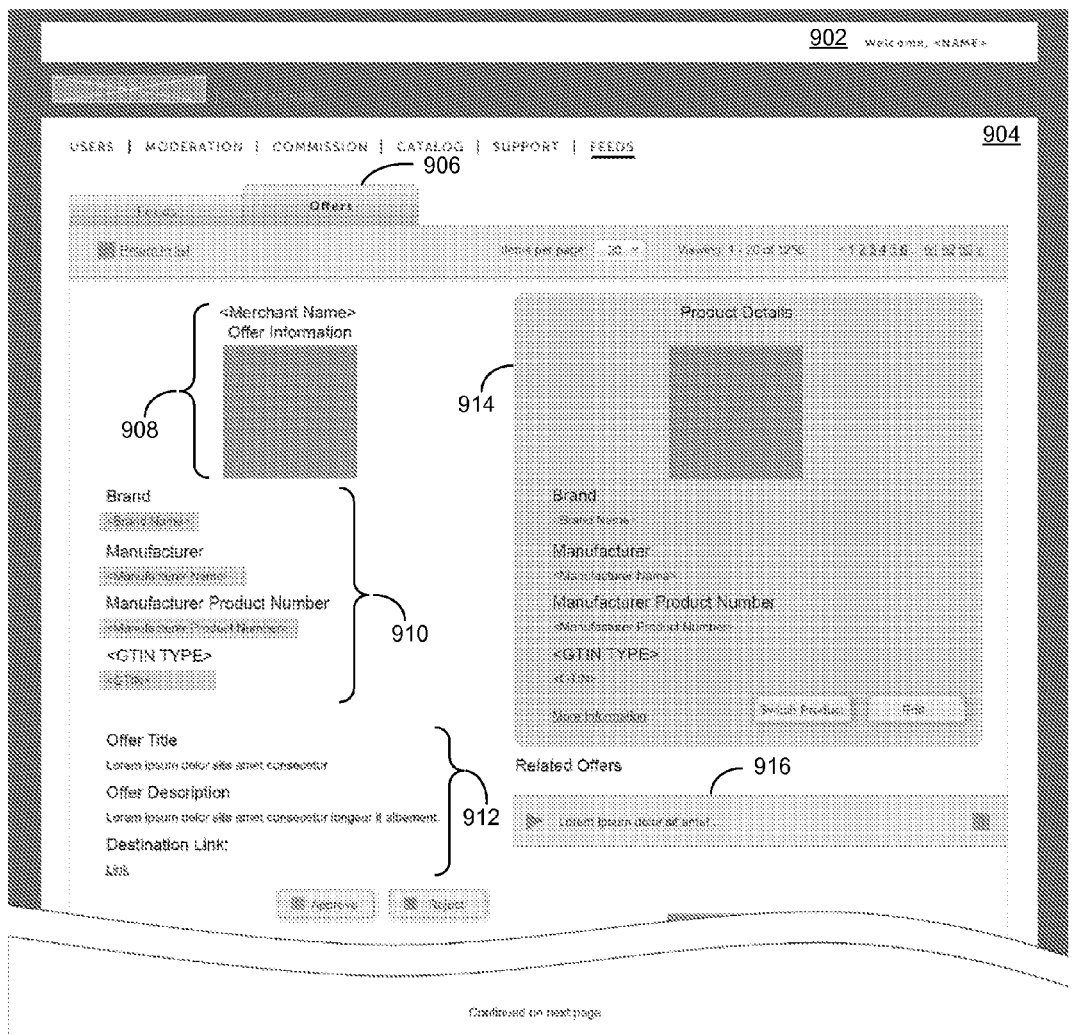
FIGS. 9a-b show the creation of an affiliate offer within a user interface window.
Figure 9B:
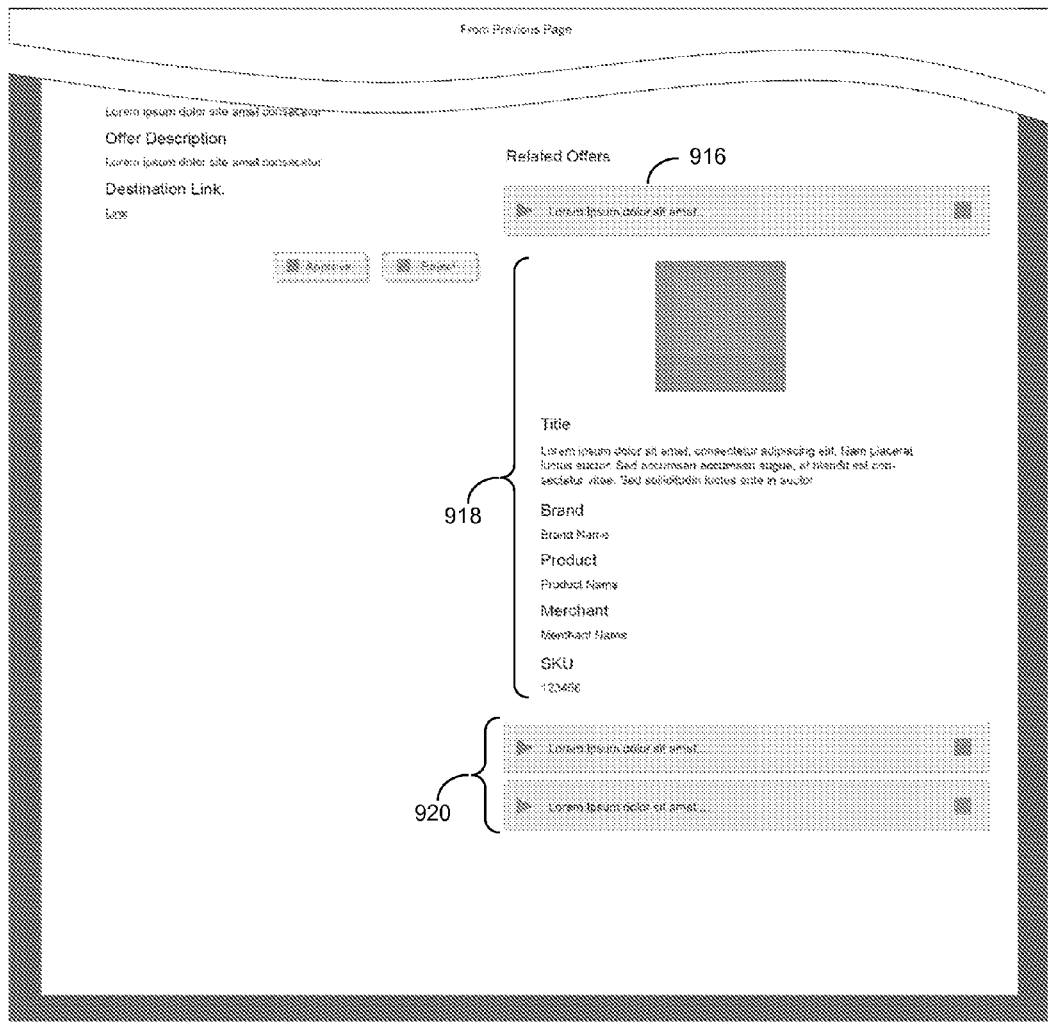

FIGS. 9a-b show the creation of an affiliate offer within a user interface window in accordance with an embodiment of the invention. In this embodiment, a social commerce storefront deals management module, as described in greater detail herein, is implemented within a window 904 of a user interface (UI) 902. As shown in FIG. 9a, the UI window 904 comprises an 'Offers' tab 906, a data entry field 908 for information related to the merchant and the affiliate making the offer, and associated data entry fields 910 corresponding to details of the purchasable product. Likewise, the UI window 904 comprises data entry fields 912 corresponding to details of the offer, as well as an offer display window 914 that provides a preview of the offer as it will appear when presented within a social media environment. As likewise shown in FIG. 9a, data display field 916 displays summary information corresponding to a related offer, and as shown in FIG. 9b, a corresponding offer display window 918 providing a preview of the related offer, as well as data display fields 920 displaying summary information corresponding to other offers.

Figure 10:
FIG. 10 shows the display of affiliate offers within a user interface window.

FIG. 10 shows the display of affiliate offers within a user interface window implemented in accordance with an embodiment of the invention. In this embodiment, a social commerce storefront deals management module, as described in greater detail herein, is implemented within a window 1004 of a user interface (UI) 1002. As shown in FIG. 10, the UI window 1004 comprises an 'Offers' tab 1006, as well a listing 1008 of a plurality of offers and related information 1010.

Figure 11:
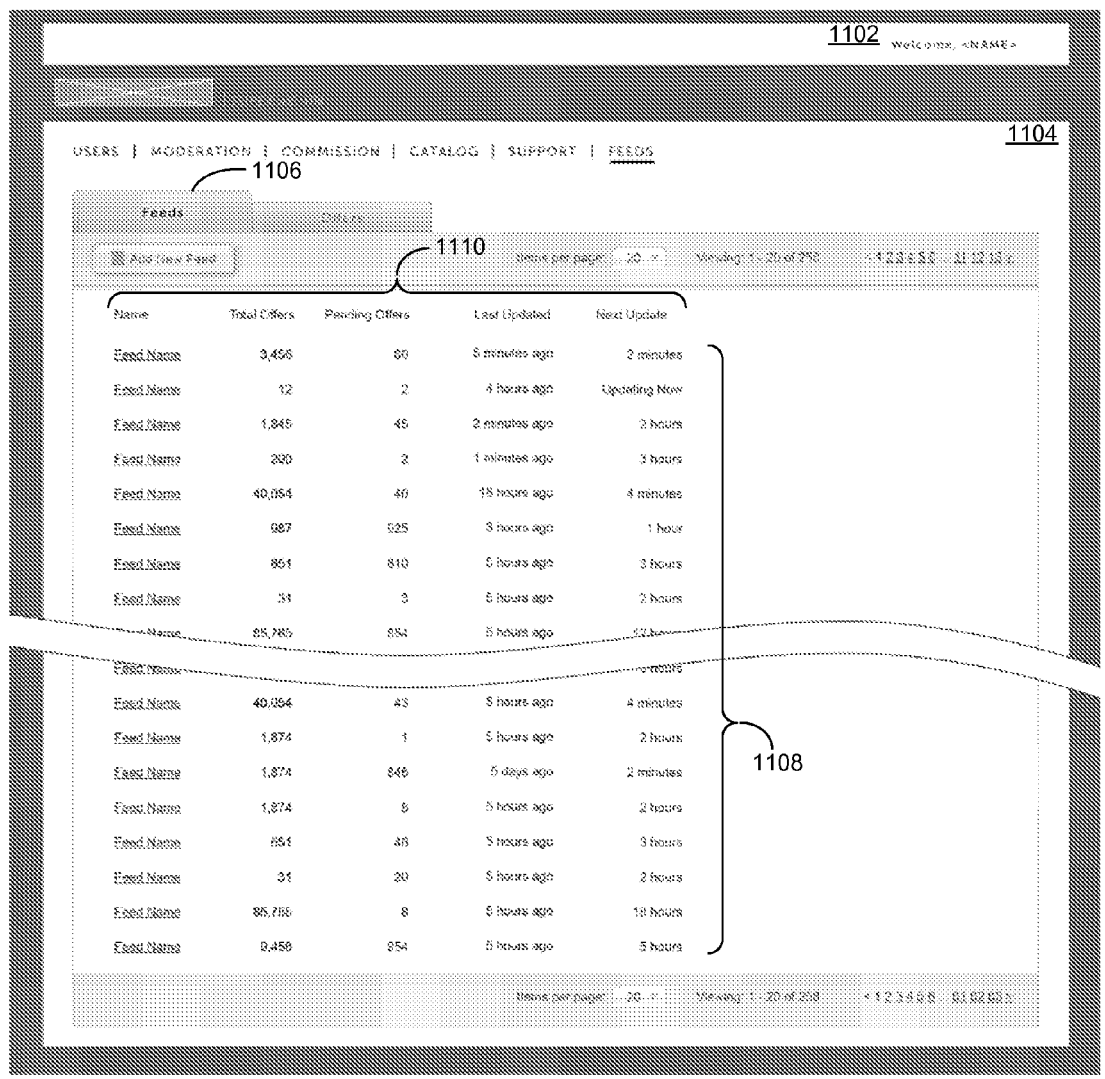
FIG. 11 shows the display of affiliate network feeds and associated offers within a user interface window.

FIG. 11 shows the display of affiliate network feeds and associated offers within a user interface window implemented in accordance with an embodiment of the invention. In this embodiment, a social commerce storefront deals management module, as described in greater detail herein, is implemented within a window 1104 of a user interface (UI) 1102. As shown in FIG. 11, the UI window 1104 comprises an 'Offers' tab 906, as well a listing 1108 of a plurality of advertising network feeds corresponding to referrals resulting from associated offers, and related information 1110.

Figure 12:
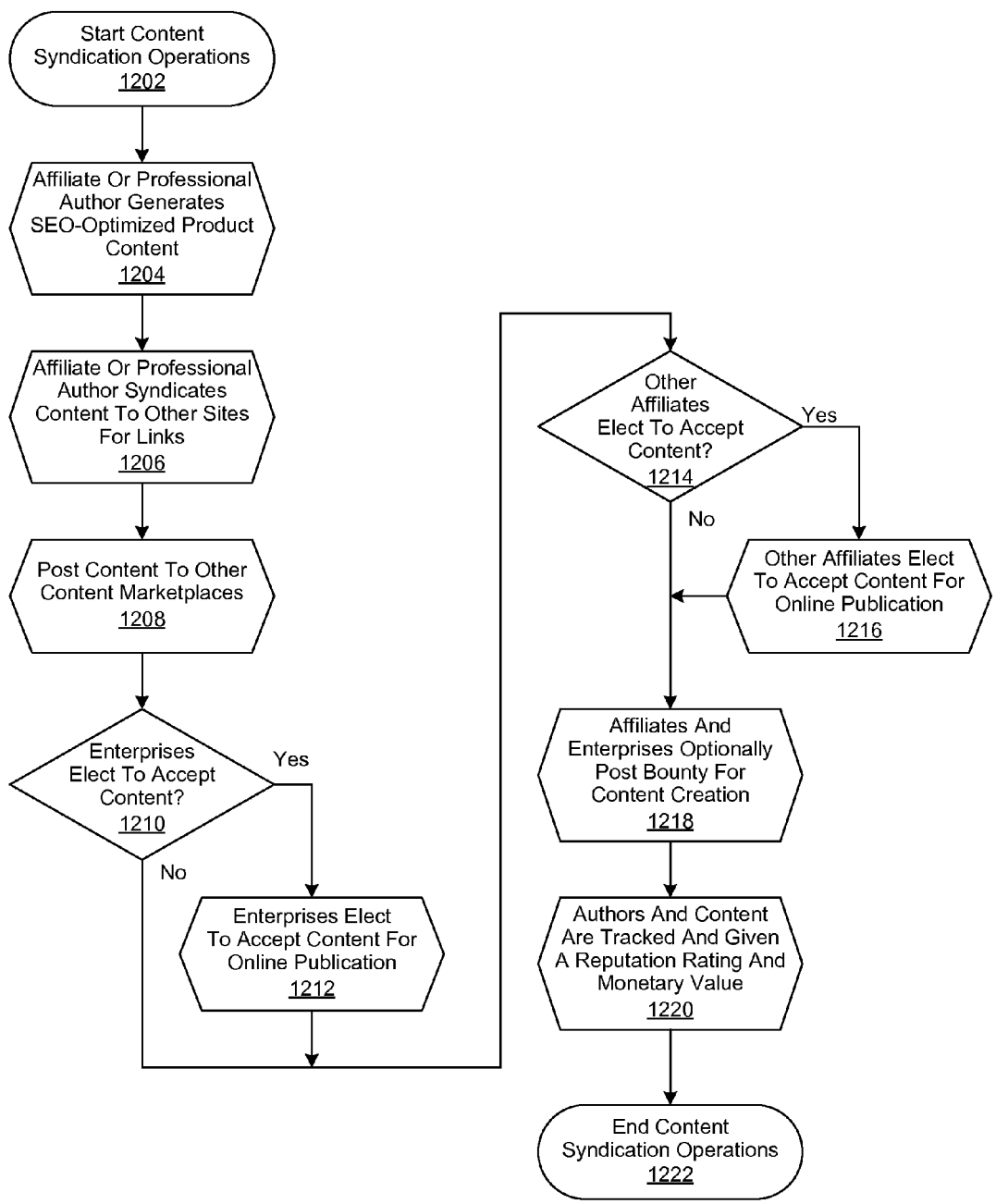
FIG. 12 is a generalized flow chart of the performance of content syndication operations.

FIG. 12 is a generalized flow chart of the performance of content syndication operations as implemented in accordance with an embodiment of the invention. In this embodiment, content syndication operations are begun in step 1202, followed by the ongoing generation of search engine optimization (SEO) content by an affiliate, a professional author, or both, in step 1204. Ongoing syndication operations are then performed in step 1206 to syndicate the SEO content to other sites and establish corresponding links. Then, in step 1208, ongoing operations are performed to post the SEO content to other content marketplaces known to skilled practitioners of the art. A determination is then made in step 1210 whether enterprises (e.g., corporations) elect to accept the SEO content. If so, then ongoing operations are performed by the enterprises in step 1212 to accept the SEO content for online publication. As an example, a corporation may elect to post predetermined SEO content on their internal web site for review by employees.

However, if it is determined in step 1210 that enterprises do not elect to accept the SEO content, or if they do so in step 1212, then a determination is made in step 1214 whether other affiliates elect to accept the SEO content for online publication. If so, then ongoing operations are performed by affiliates in step 1216 to accept the SEO content for publication in step 1217. For example, another affiliate may elect to publish SEO content that is complementary to content they generate themselves. However, if it is determined in step 1214 that other affiliates do not elect to accept the SEO content, or if they do so in step 1216, then ongoing operations are performed in step 1218 for enterprises, affiliates, or both, to post a "bounty" (i.e., an offer for compensation) for content creation. Thereafter, ongoing operation are performed in step 1220 to track authors, the content they generate, their corresponding reputation ratings, and the monetary value they receive as compensation for providing the content. Content syndication operations are then ended in step 1222.

Figure 13:
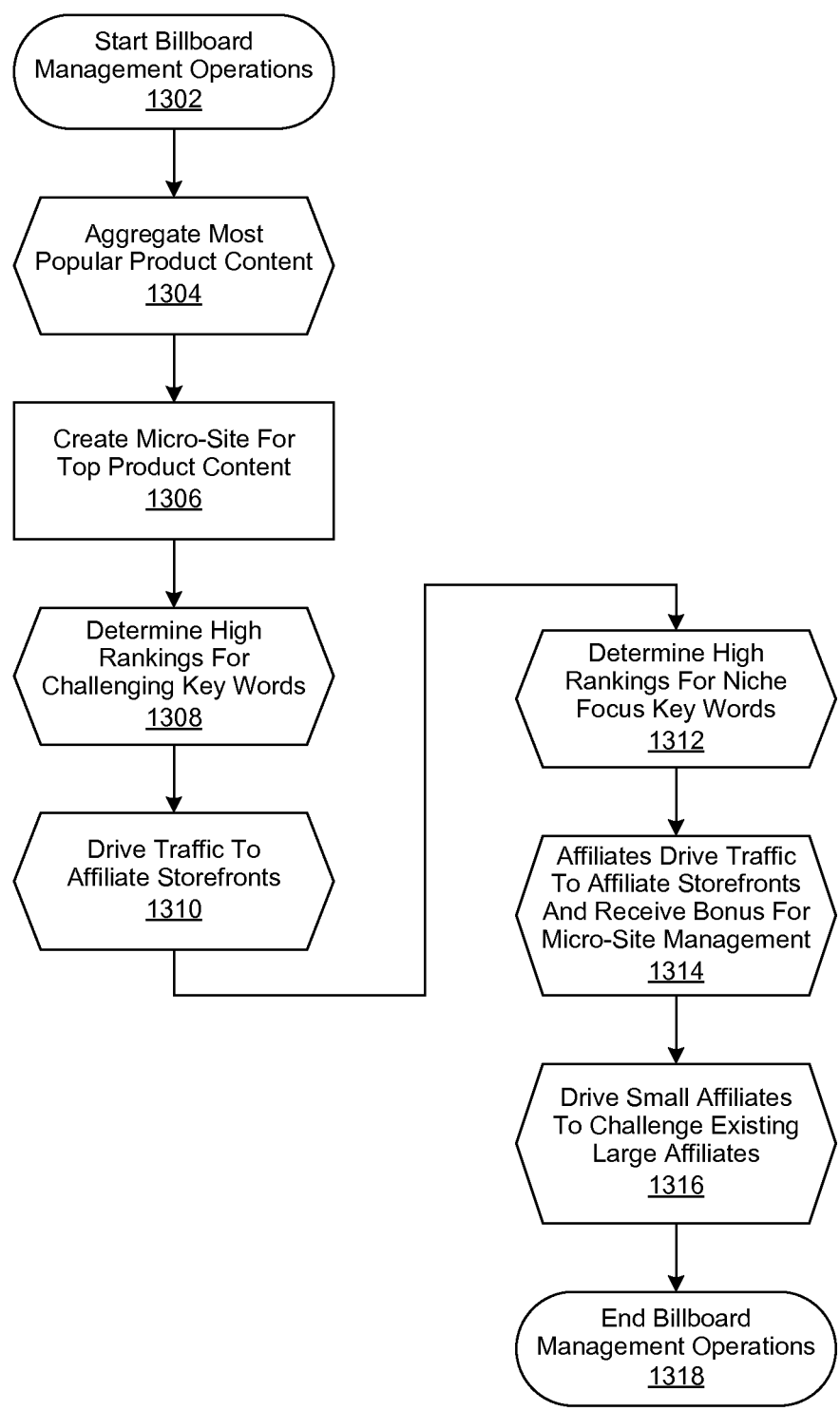
FIG. 13 is a generalized flow chart of the performance of billboard management operations.

FIG. 13 is a generalized flow chart of the performance of billboard management operations as implemented in accordance with an embodiment of the invention. In this embodiment, online billboard management operations familiar to those of skill in the art are begun in step 1320, followed by the ongoing aggregation of the most popular product content in step 1304. A micro site, such as a small, specialized web site, is then created in step 1306, followed by ongoing operations in step 1309 to determine high rankings for challenging key words used in searches for product information. Ongoing operations are then performed in step 1310 to drive traffic to affiliate social commerce storefronts, such as using the high ranking challenging key words in search engine optimization (SEO) operations known to skilled practitioners of the art. Thereafter, ongoing operations are performed in step 1312 to determine high ranking niche focus key words, followed by ongoing operations being performed by affiliates in step 1314 to drive traffic to their storefronts, and accordingly, receive compensation from a merchant for doing so. In step 1316, ongoing operations are performed by the merchant to challenge small affiliates to challenge the sales performance of larger affiliates. Online billboard management operations are then ended in step 1318.

Figure 14A:
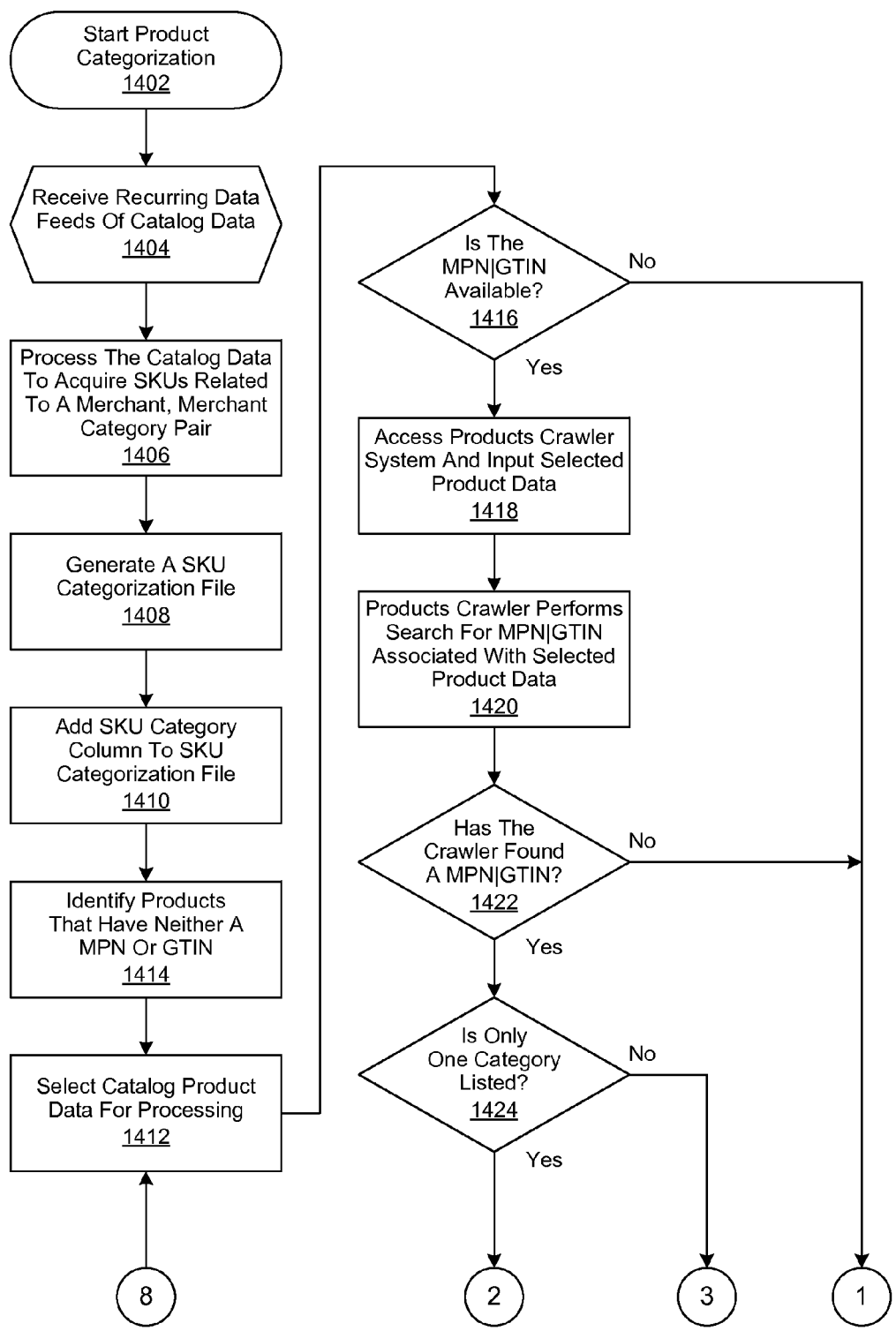
FIG. 14 is a generalized flow chart of the performance of product categorization operations.
Figure 14B:
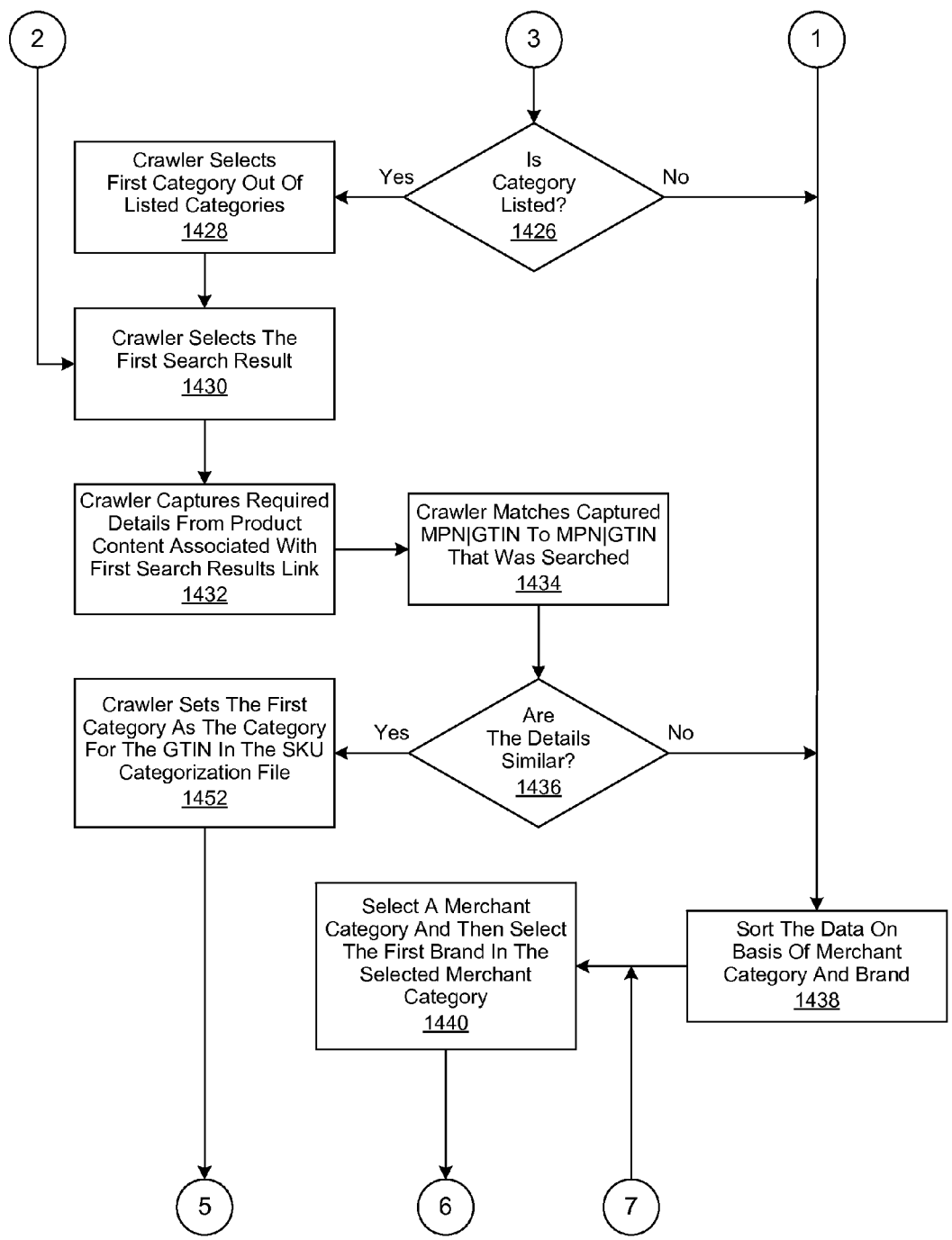
Figure 14C:
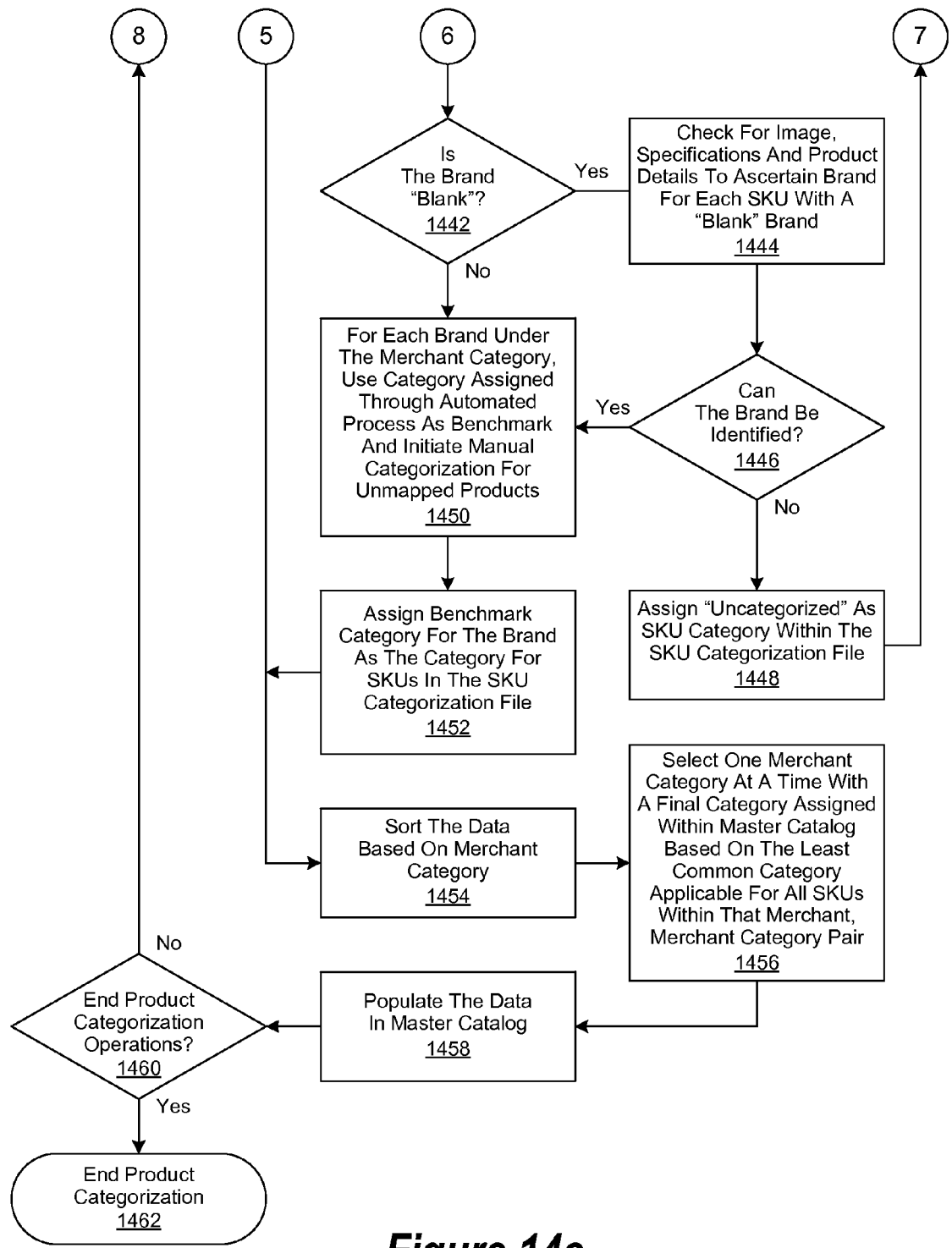
Figure 15A:
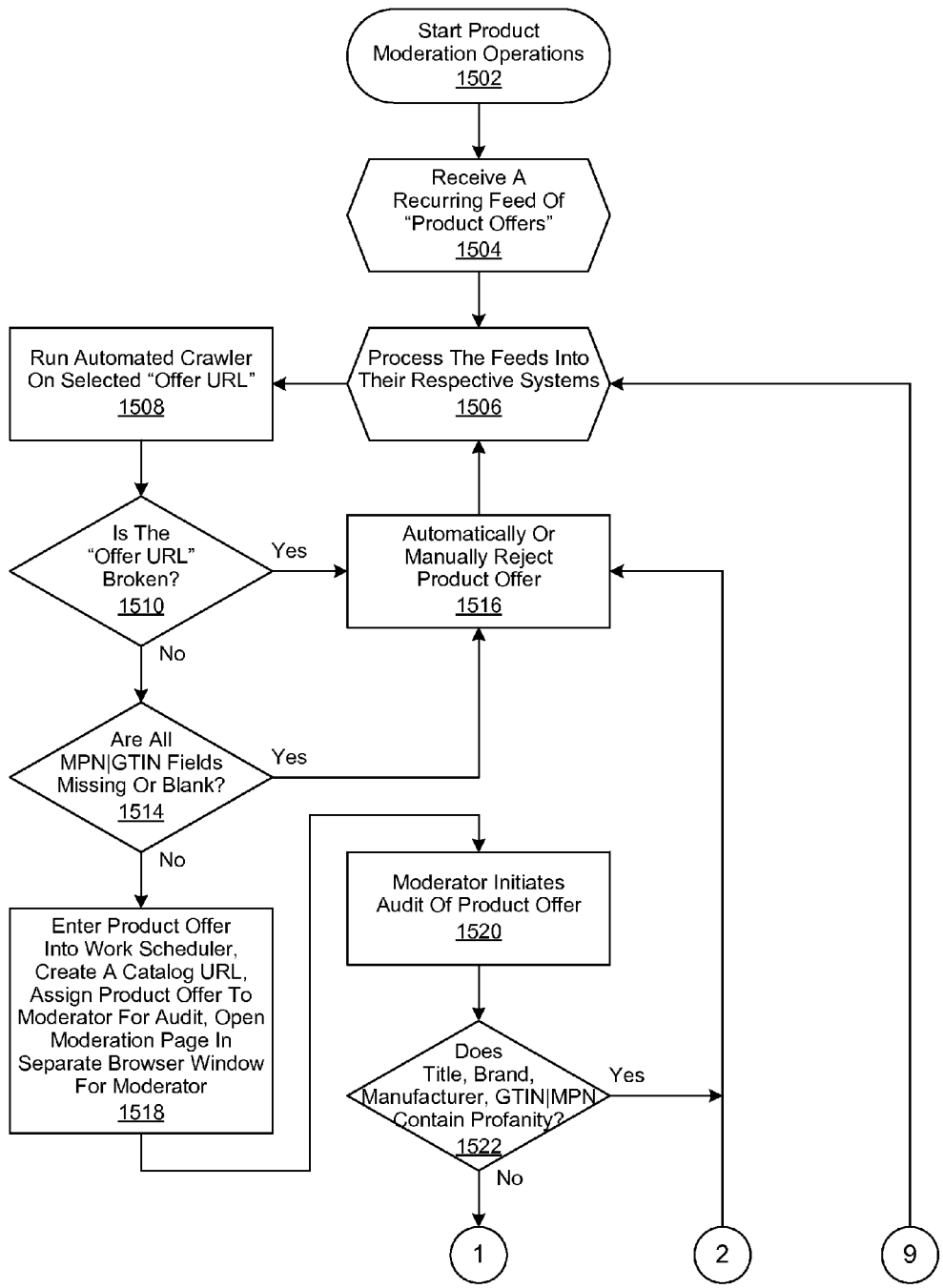
FIG. 15 is a generalized flow chart of the performance of product moderation operations.
Figure 15B:
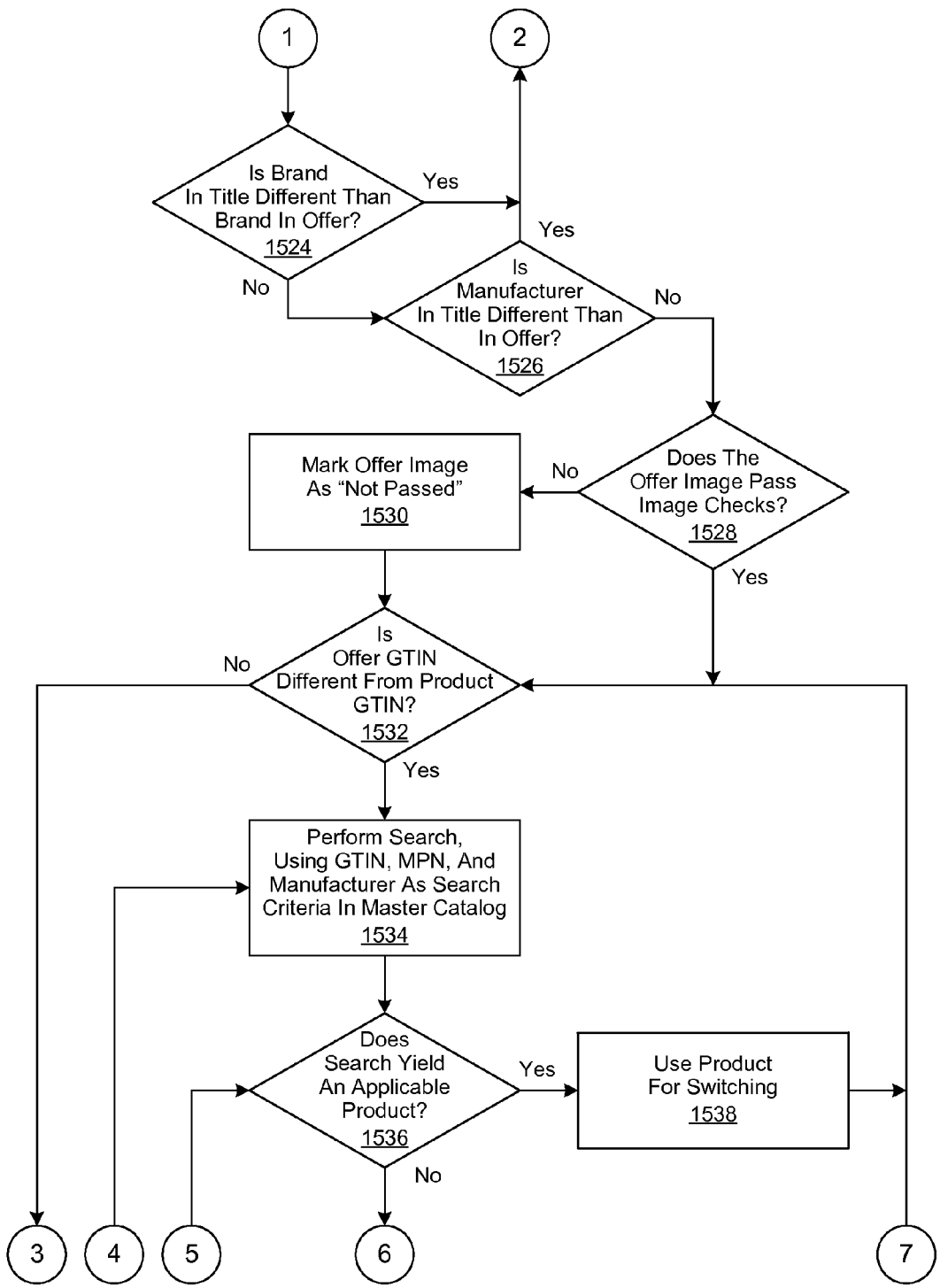
Figure 15C:
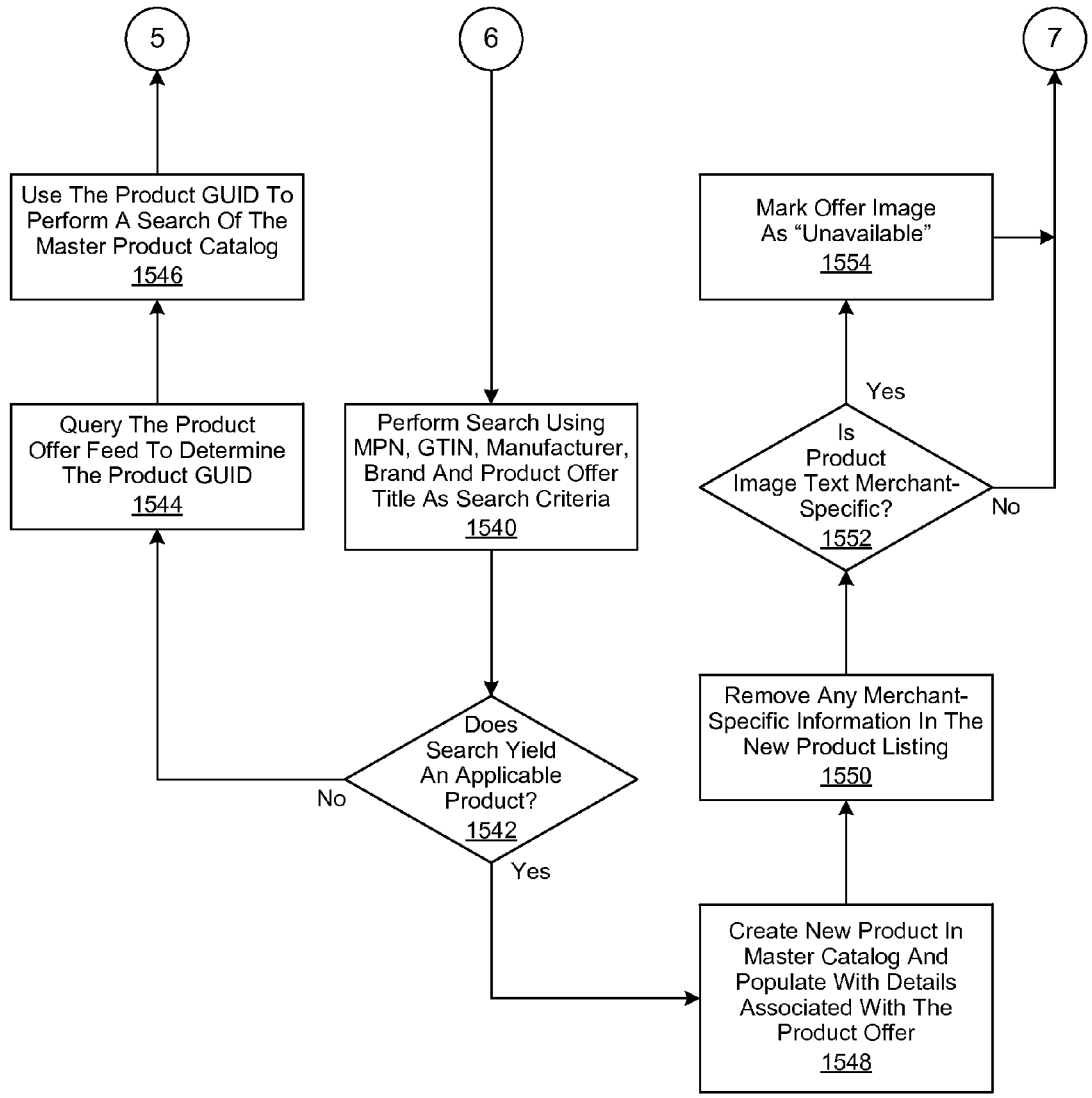
Figure 15D:
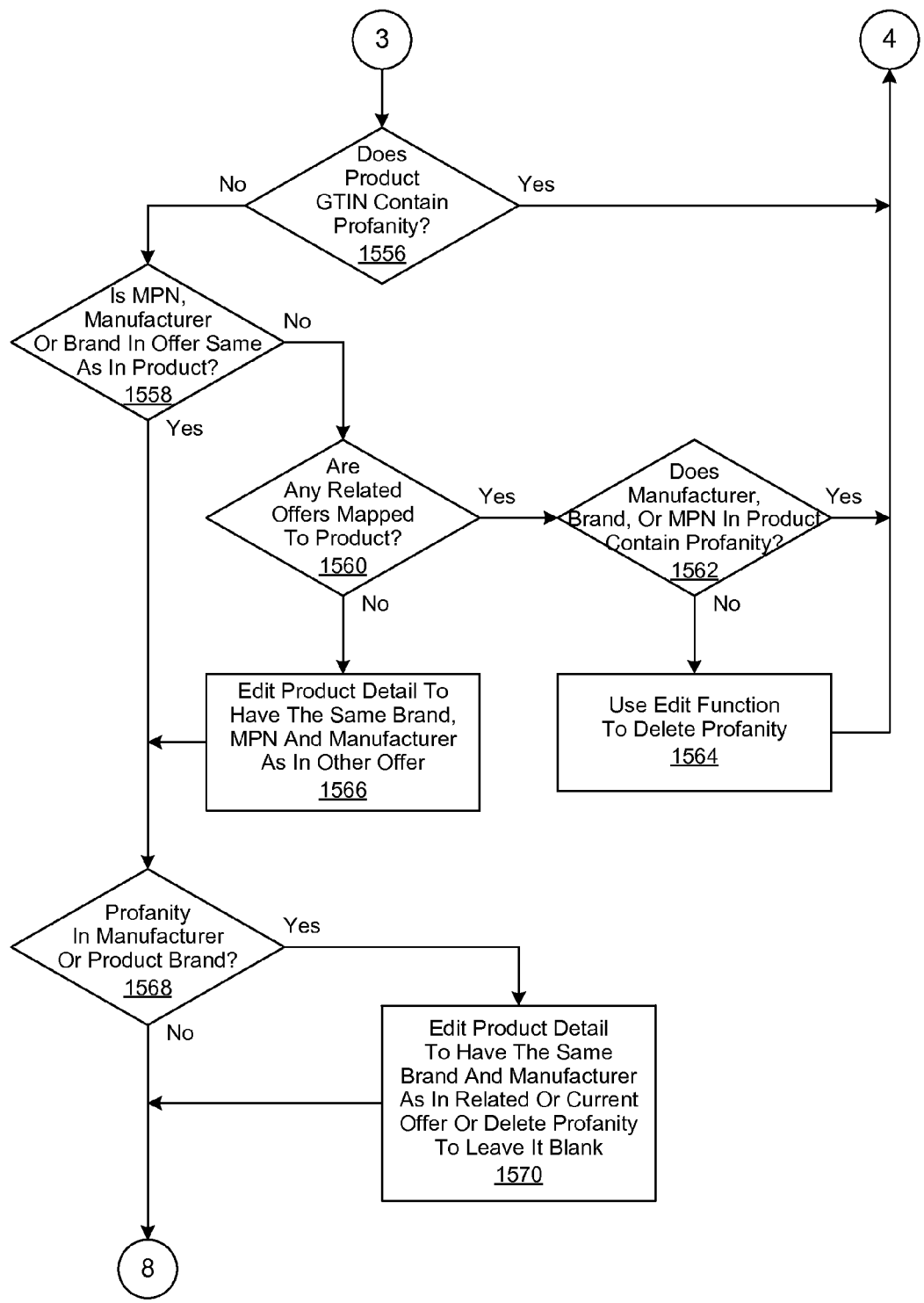
Figure 15E:
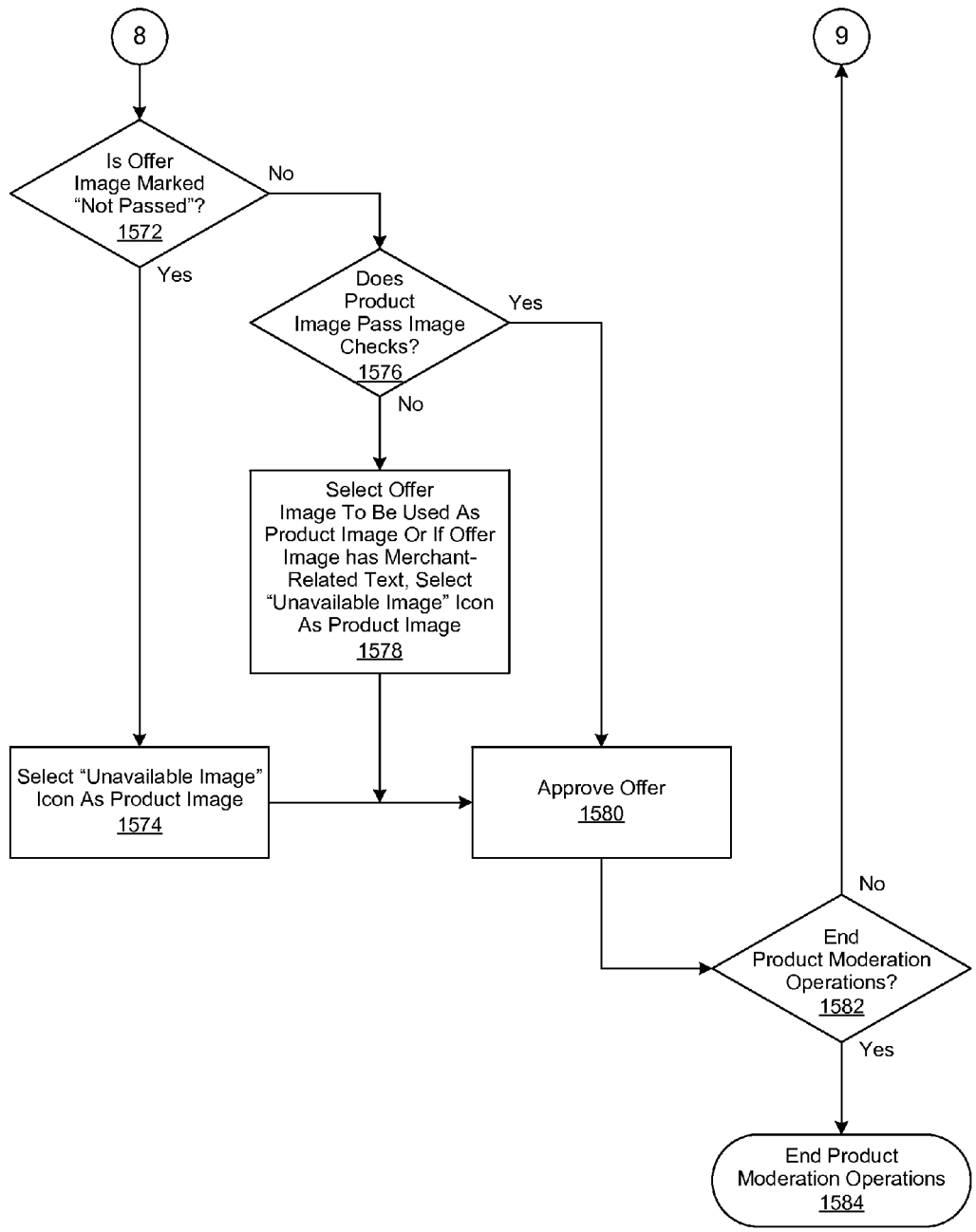

FIG. 14 is a generalized flow chart of the performance of product categorization operations as implemented in accordance with an embodiment of the invention. In this embodiment, product categorization operations are begun in step 1402, followed by the receipt of recurring data feeds of catalog data from a vendor, merchant or other product source in step 1404. The catalog data is then processed in step 1406 to acquire stock keeping units (SKUs) related to an individual vendor, merchant or other product source, their corresponding merchant category pairs, Global Trade Item Numbers (GTINs), and manufacturer part numbers (MPNs). As used herein, a merchant category pair refers to a pairing of an individual vendor, merchant or other product source and a predetermined product category.

A SKU categorization file is then generated in step 1408, followed by the addition of a SKU category column to the SKU categorization file in step 1410. Then, in step 1412, target product catalog data feeds are consolidated into batches for processing. The consolidated product catalog data is processed to identify products that have neither a MTN nor a GTIN (MPN|GTIN). Catalog product data is then selected for processing in step 1412, followed by a determination being made in step 1414 whether the selected catalog product data comprises MPN|GTIN data. If so, then a products crawler system, such as a web crawler system familiar to those of skill in the art, is accessed and the selected catalog product data is inputted in step 1418. The products crawler then performs a search in step 1420 for the MPN|GTIN associated with the selected product data. It will be appreciated by those of skill in the art that in various embodiments the product crawler may be implemented to crawl web pages, sites, and other data repositories residing on the Internet at-large, private and proprietary data repositories, or both.

A determination is then made in step 1422 whether the product crawler has identified additional product data corresponding to the MPN|GTIN associated with the selected product data. If so, then a determination is made in step 1424 whether only one product category is listed for the MPN|GTIN. If not, then a determination is made in step 1426 whether the product category is listed within the master product catalog. If so, then the product crawler selects the first product category out of a set of listed categories in step 1428. Thereafter, or if it was determined in step 1424 that only one product category was listed, the product crawler selects the first search result. Then, in step 1432, the product crawler captures all required details from product content associated with the link to the first search result. The product crawler then matches the captured MPN|GTIN to the MPN|GTIN returned in the product crawler search in step 1434, followed by making a determination in step 1436 whether the product details between the two MPN|GTIN are similar. If not, or if it was determined in step 1416 that the MPN|GTIN was not available, or in step 1422 that the product crawler did not find a MPN|GTIN, or in step 1426 that a product category was not listed, then the product data is sorted on the basis of merchant category and product brand. Then, in step 1440, a merchant category is selected, followed by selecting the first product brand in the selected merchant category.

A determination is then made in step 1442 whether the product brand in the selected merchant category is "blank," (e.g., "generic," not specified, etc.). If so, then a check is performed in step 1444 with the associated product image specifications and product details to ascertain a product brand for each SKU with a "blank" product brand. A determination is then made in step 1446 whether the product brand can be verified. If not, then the SKU category within the SKU categorization file is assigned a value of "uncategorized" and the process is continued, proceeding with step 1440. Otherwise, or if it was determined in step 1442 that the product brand was not "blank," then for each product brand under the merchant category, a category assigned by an automated process is used as a benchmark and to initialize manual categorization for unmapped products in step 1450. The benchmark category for the product brand is then assigned in step 1452 as the category for SKUs in the SKU categorization file.

However, if it was determined in step 1436 that the product details between the two MPN|GTIN are not similar, then the product crawler sets the first category as the category for the GTIN in the SKU categorization file. Thereafter, or after the benchmark category for the product brand has been assigned in step 1452, then the product data is sorted, based on merchant category, in step 1454. Then, in step 1456, one merchant category at a time is selected, with a final merchant category being assigned within the master catalog, based on the least common category applicable for all SKUs within that merchant and merchant category pair. The product data is then populated in the master catalog, followed by a determination in step 1460 whether to end product categorization operations. If not, then the process is continued, proceeding with step 1412. Otherwise, product categorization operations are ended in step 1462.

FIG. 15 is a generalized flow chart of the performance of product moderation operations in accordance with an embodiment of the invention. In this embodiment, product moderation operations are begun in step 1502, followed by the receipt of a recurring data feed of "product offers" in step 1504. As used herein, "product offers" refer to product data associated with a product being offered for sale, or resale, by a merchant, vendor, manufacturer or other product source. The product offer data feeds are then processed by various systems associated with the product moderation process in step 1506 and an automated product crawler system, such as a web crawler system familiar to those of skill in the art, is run on the URL of a selected product offer in step 1508.

A determination is then made in step 1510 whether the URL associated with the selected product offer is broken. If so, then the product offer is automatically or manually rejected in step 1516 and the process is continued, proceeding with step 1506. Otherwise, a determination is made in step 1514 whether all MPN|GTIN fields in the product offer are blank. If so, then the product offer is automatically or manually rejected in step 1516 and the process is continued, proceeding with step 1506. Otherwise, in step 1518, the product offer is entered into a work scheduler, a master catalog URL is created, the product offer is assigned to a moderator for auditing, and a moderation page is opened in a separate browser window for the assigned moderator.

The assigned moderator then initiates the audit of an assigned product offer in step 1520, followed by a determination being made in step 1522 whether the title, brand, manufacturer, or MPN|GTIN fields contain profanity. If so, then the product offer is automatically or manually rejected in step 1516 and the process is continued, proceeding with step 1506. Otherwise, a determination is made in step 1524 whether the brand in the product offer title is different than the brand referenced within the product offer itself. If so, then the product offer is automatically or manually rejected in step 1516 and the process is continued, proceeding with step 1506. Otherwise, a determination is made in step 1526 whether the manufacturer in the product offer title is different than the brand referenced within the product offer itself. If so, then the product offer is automatically or manually rejected in step 1516 and the process is continued, proceeding with step 1506.

Otherwise, a determination is made in step 1528 whether the product image associated with the product offer passes image checks. As an example, the product image may not pass the image check if it contains pornography, nudity or profanity. As another example, the product image may not pass the image check if shows a product that is different than a product described within the title of the product offer or within the product offer itself. If it is determined in step 1528 that the product offer image does not pass the image checks, then the product offer image is marked as "not passed" in step 1530. Thereafter, or if it was determined in step 1528 that the product offer image passed the image checks, then a determination is made in step 1532 whether the GTIN of the product offer is different than the GTIN of the product itself. If so, then a search is performed in step 1534, using GTIN, MPN, and manufacturer name as search criteria to perform the search in the master catalog.

A determination is then made in step 1536 whether the search yielded an applicable product. If so, then the product data associated with the applicable product is used in step 1538 to replace (i.e., "switch") the product data associated with the product offer. The process is then continued, proceeding with step 1532. However, if it was determined in step 1538 that the search did not yield an applicable product, then a search is performed in step 1540 using the MPN, GTIN, manufacturer name, and the title of the product offer as search criteria. A determination is then made in step 1542 whether the search yielded an applicable product. If not, the product offer data feed is queried in step 1544 to determine the Global Unique Identifier (GUID) associated with the product offer. The GUID is then used to perform a search of the master product catalog and the process is then continued, proceeding with step 1536.

However, if it is determined in step 1542 that the search yields an applicable product, then a new product is created in the master catalog in step 1548 and populated with the details associated with the product offer. Any information specific to the merchant, vendor or other source of the product offer is then removed from the new product listing in step 1550. A determination is then made in step 152 whether the product image associated with the new product listing is specific to the merchant, vendor or other source of the product offer. If so, then the product image associated with the product offer is marked as "unavailable" in step 1554. Thereafter, or if the product image associated with the new product listing is not specific to the merchant, vendor or other source of the product offer, the process is continued, proceeding with step 1532.

However, if it is determined in step 1532 that the GTIN of the product offer is not different from the GTIN of the product itself, then a determination is made in step 1556 whether the product GTIN contains profanity. If so, then the process is continued, proceeding with step 1534. Otherwise, a determination is made in step 1558 whether the MPN, manufacturer name, or product brand in the product offer is the same as the product itself. If not, then a determination is made in step 1560 whether any related product offers are mapped to the product itself. If so, then a determination is made in step 1562 whether the MPN, manufacturer name, or product brand in the product offer contains profanity. If so, then the process is continued, proceeding with step 1534. Otherwise, an edit function is implemented in step 1564 to manually or automatically delete the profanity from MPN, manufacturer name, or product brand in the product offer and the process is continued, proceeding with step 1534. However, if it is determined in step 1560 that no other product offers are mapped to the product itself, then the product detail is manually or automatically edited in step 1566 to have the same MPN, manufacturer name, or product brand as the other product offer.

Thereafter, or if it is determined in step 1558 that the MPN, manufacturer name, or product brand in the product offer is the same as the product itself, a determination is made in step 1568 whether the manufacturer name or product brand contains profanity. If so, then the product offer is either manually or automatically edited in step 1570 to have the same product brand and manufacturer name as in the related product offer or any identified profanity is deleted. Thereafter, or if is determined in step 1568 that there is no profanity in the manufacturer name or product brand, then a determination is made in step 1572 whether the product image associated with the product offer is marked "not passed." If so, then an "unavailable image" is selected in step 1574 as the product image. Otherwise, a determination is made in step 1576 whether the product image passes image checks. If not, then a product offer image is selected in step 1578 as the product image in the master catalog, or alternatively, an "unavailable image" is selected if the product offer image has merchant-related text. Otherwise, or once the product offer images have respectively selected in steps 1574 or 1578, the product offer is approved in step 1580. A determination is then made in step 1582 whether to end product moderation operations. If not, then the process is continued, proceeding with step 1506. Otherwise, product moderation operations are ended in step 1584.

Figure 16:
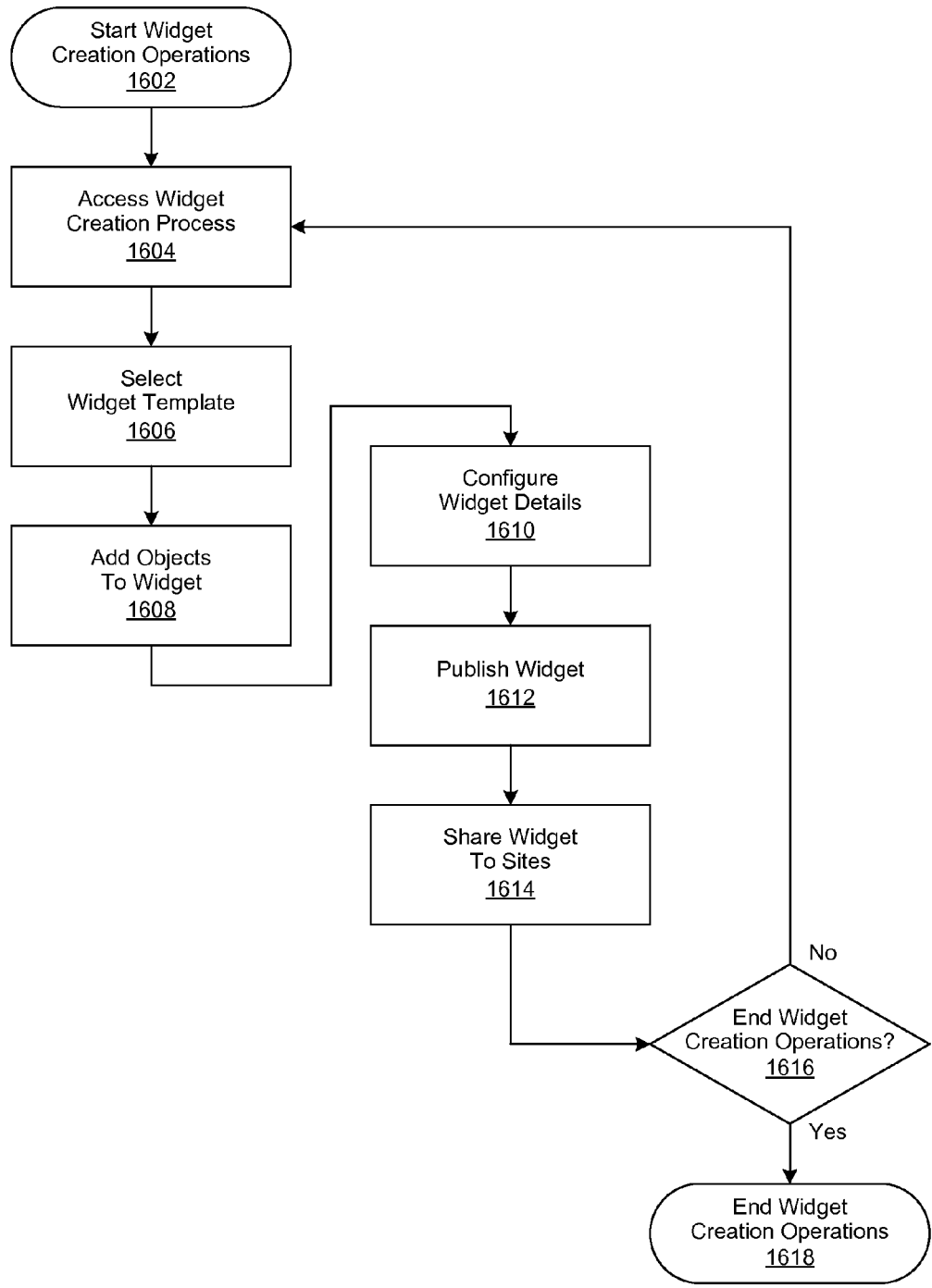
FIG. 16 is a generalized flow chart of the performance of widget creation operations.

FIG. 16 is a generalized flow chart of the performance of widget creation operations as implemented in accordance with an embodiment of the invention. In various embodiments, syndicatable widgets are created, published and managed to assist an organization in increasing visitor traffic to a target location (e.g., and online store, corporate website, social network account, mobile application, etc.). In certain of these embodiments, the syndicatable widgets are implemented to increase brand awareness, conversion rates on the target location, and average order value for commerce centric websites. This is accomplished by matching a visitor's intent to content that is most likely to meet their interests and needs.

In these and other embodiments, a widget template is first uploaded and registered to the social commerce marketplace system. A widget creation user interface is then used in conjunction with a predetermined widget template to create and configure the desired type of widget and the objects be included (e.g., products, deals, offers, ads, a Uniform Resource Indicator, etc.). The widget creation user interface is likewise used to determine the order in which the objects are presented, the details of what is presented for each object, the configuration of the theme (e.g., fonts, colors, etc.), and additional configurations that control the widget's behavior.

The aforementioned widget template defines the properties of the widget that will be produced from the template, including its user interface, user interaction model, and configuration properties. The configuration properties provides the ability to control aspects of the widget such as the types of objects that can be associated and displayed through the widget and whether or not users can change user interface theme configurations such as fonts, background colors, button styles, etc. The configuration properties likewise controls whether or not the widget template can be shared and used by other accounts, default end user behaviors if the widget cannot display any objects because they are expired, not available or no longer valid, as well the wizard steps available to users when they create or configure a widget from the template.

In various embodiments, organizations can share their produced and published templates with other organizations within the social commerce marketplace system. For example, a merchant may produce and then publish a "Product of the Day" widget and then set and configure a property that makes it available within the merchant's "Store Owners" list of available widgets. Likewise, the "Store Owner's" affiliates may also be granted access to the "Product of the Day" widget.

Referring now to FIG. 16, widget creation operations are begun in step 1602, followed by accessing a widget creation process in step 1604. In various embodiments, a user selects, and then adds, an object to a widget. In these and other embodiments, the objects may comprise products from either a merchant or store catalog, merchant or store offers or deals, blogs, one or more user interface elements, videos, images. Likewise, the widget may be created from within the social commerce marketplace system itself or from a public Application Program Interface (API).

Then, in step 1606, a widget template is selected from a library of widget templates that have been registered to the social commerce marketplace system and authorized for use by the user or their organization. In various embodiments, the user can preview the widget templates user interfaces and interaction models before selecting one to configure and publish. The properties defined within the widget template control the configurations the user can make to the widget, which includes:

whether the widget automatically selects the objects to display based on the visitor context or if the user defines a fixed set of objects to display
the number of objects that can be displayed
whether or not the user can configure and assign selection rules that dynamically select objects to display based on the visitors context
the type of objects that can be displayed in the widget
the order to display objects
rules to excludes specific objects from displaying
the theme of the user interface (colors, fonts, buttons, text, etc)
fallback strategies if the widget cannot display objects
display size of widget in host site
whether the widget can be shared by visitors
rules to determine discounts based on the user's social value (e.g., social scores, influence, reach, etc.)

Objects are then added to the selected widget in step 1608. In one embodiment, the user has the ability to navigate or search the social commerce marketplace system to locate specific objects (products, offers, deals, ads, videos, images, text, Uniform Resource Indicators, etc.) to be added. In another embodiment, if the widget comprises more than one object, the user has the option to configure the display order of each object and selection rules that determine the visitors context before the widget can displayed (e.g., the user's social score>=35).

In step 1610, various aspects of the widget are configured such as:
- status—active, suspended, inactive
- object display duration rules (how long to display each object in a carousel)
- default image, video, or text to display if objects cannot be displayed to the user
- theme details (e.g., background colors, which UI elements to display, fonts, font colors, etc.)
- cache setting (e.g., how often the widget will invalidate it cache and regenerate)
- sharing—which organizations and users can use the widget
- whether to automatically publish the widget to the store owner's storefront or blog
- fallback strategies—where predefined content is displayed (billboards, products, offers, Uniform Resource Indicators, etc.) if products cannot be dynamically displayed by the system Once the configuration of the widget has been completed in step 1610, it is then published within the social commerce marketplace system in step 1612. By doing so, a widget instance is created that is based on the previously described configurations. It will be appreciated by those of skill in the art that once the widget is published, it can be accessed to perform maintenance and to access analytics about its performance (e.g., click through rates, average order values, impressions, revenue, etc.). The widget can then be embedded or shared with various websites in step 1614. As an example, the user can directly publish the widget to social network sites, or they can embed the widget's code into a third party website. In various embodiments, after the widgets have been embedded in a host website, the social commerce marketplace system provides analytics about the widget, including:
- clickstream data (e.g., visits, geo-locations, click through rates, etc.)
- object interactions (e.g., views, click-through rates, etc.)
- domain embeds (e.g., domain, visits, etc.)
- e-commerce data (e.g., conversion rate, number of sales, average order value, etc.)

A determination is then made in step 1616 whether to continue widget creation operations. If not, then the process is continued, proceeding with step 1604. Otherwise, widget creation operations are ended in step 1618.

Figure 17:
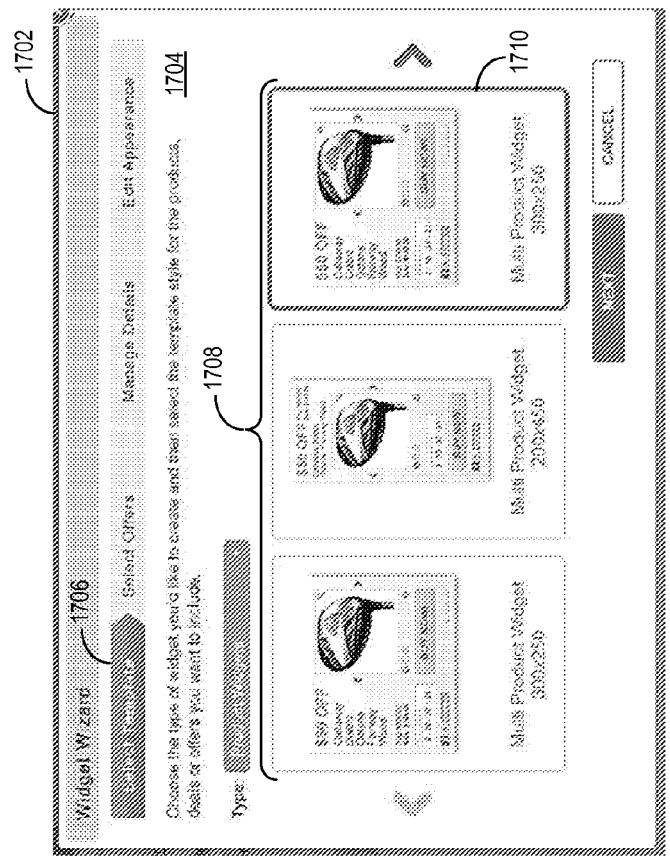
FIG. 17 shows the selection of a widget template within a user interface window.

FIG. 17 shows the selection of a widget template within a user interface window as implemented in accordance with an embodiment of the invention. In this embodiment, a user interface (UI) 1702, such as a web browser, is implemented to comprise a UI window 1704, which in turn comprises a widget wizard command bar 1706 and a plurality of widget templates 1708. As described in greater detail herein, a user selects a widget template, such as the "Multi Product Widget 300×250" 1710.

Figure 18:
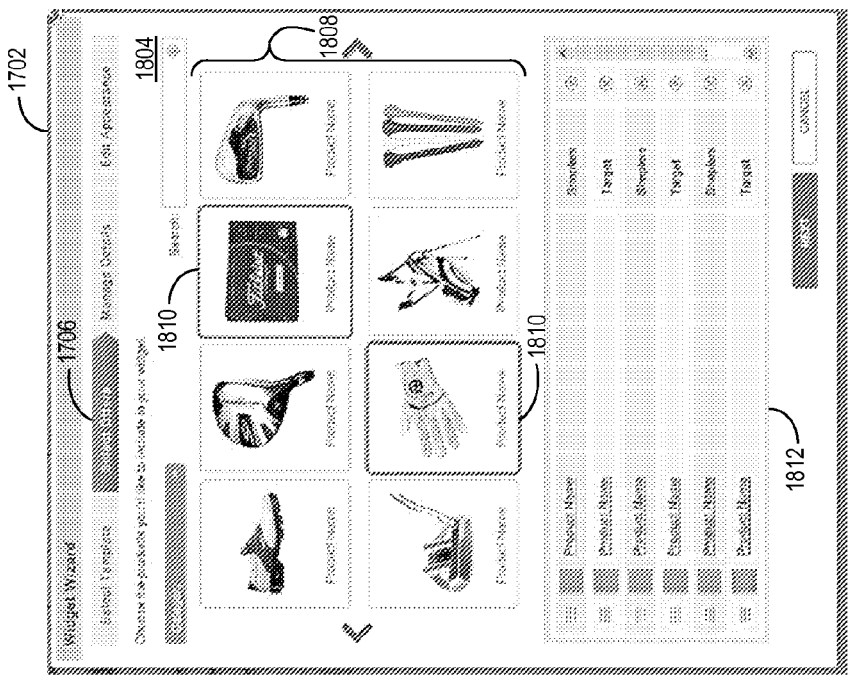
FIG. 18 shows the selection of products within a user interface window for the addition to a widget.

FIG. 18 shows the selection of products within a user interface window for the addition to a widget as implemented in accordance with an embodiment of the invention. In this embodiment, a user interface (UI) 1702, such as a web browser, is implemented to comprise a UI window 1804, which in turn comprises a widget wizard command bar 1706 and a plurality of recommendation objects (e.g., products, offers, deals, ads, videos, images, text, Uniform Resource Indicators, etc.). As described in greater detail herein, a user selects one or more objects 1810, which are then added to a list of recommendation objects 1812. In one embodiment, the user has the ability to configure display order of the objects (e.g., sequential display order, time interval to display each item, etc.).

Figure 19:
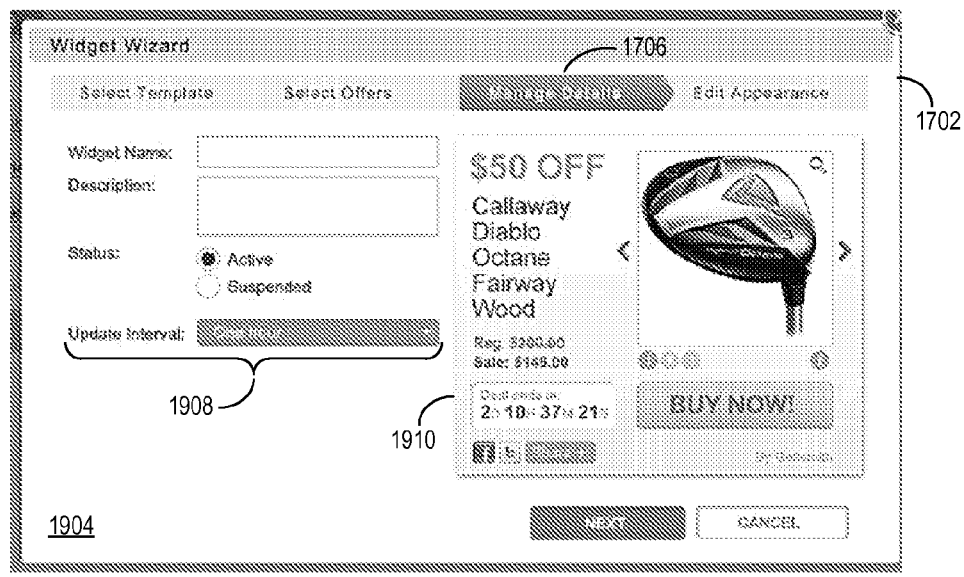
FIG. 19 shows the configuration of a widget's property details within a user interface window.

FIG. 19 shows the configuration of a widget's property details within a user interface window as implemented in accordance with an embodiment of the invention. In this embodiment, a user interface (UI) 1702, such as a web browser, is implemented to comprise a UI window 1904, which in turn comprises a widget wizard command bar 1706 and a plurality of widget configuration parameters 1908. As described in greater detail herein, a user configures one or more of the widget configuration parameters 1908, which are then displayed within a widget preview window 1910.

Figure 20:
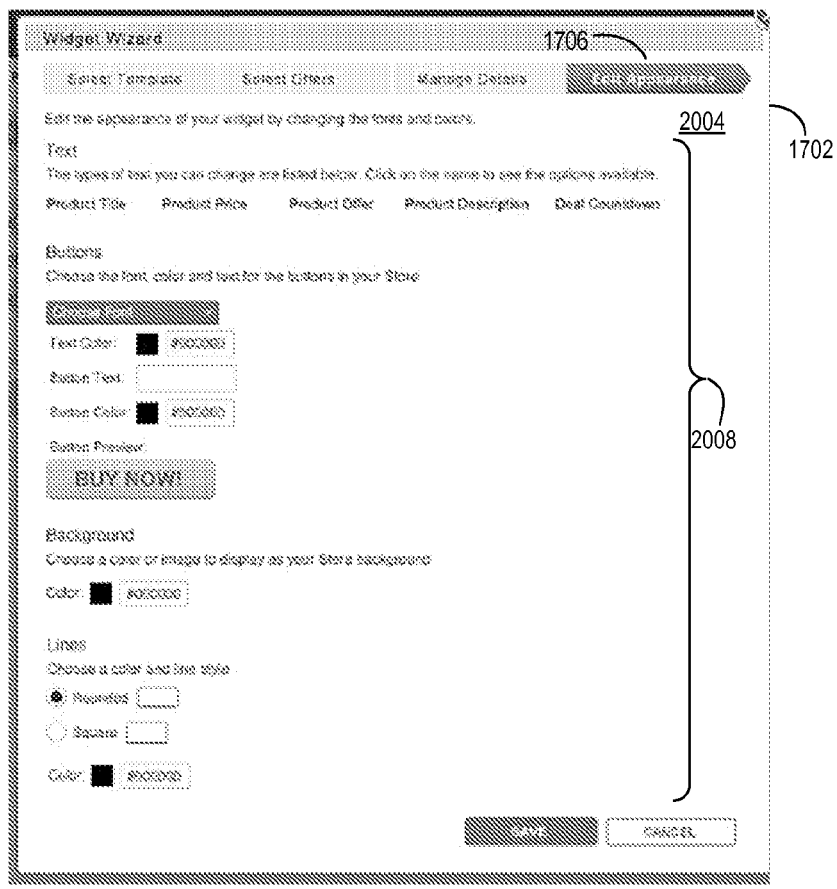
FIG. 20 shows the configuration of a widget theme within a user interface window.

FIG. 20 shows the configuration of a widget theme within a user interface window as implemented in accordance with an embodiment of the invention. In this embodiment, a user interface (UI) 1702, such as a web browser, is implemented to comprise a UI window 2004, which in turn comprises a widget wizard command bar 1706 and a plurality of widget theme configuration parameters 2008. As described in greater detail herein, a user configures one or more of the widget configuration theme parameters 2008 to control the theme of the widget.

Figures 21, 22:
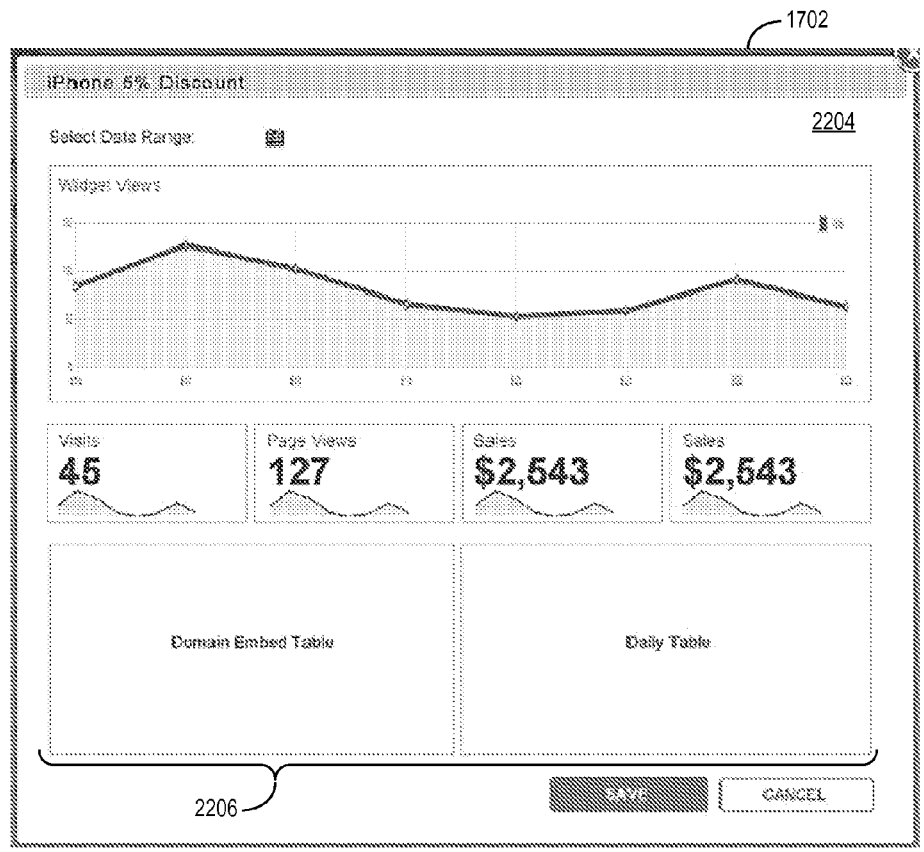
FIG. 21 shows published widgets displayed within a user interface window.
FIG. 22 shows widget analytics displayed within a user interface window.

FIG. 21 shows published widgets displayed within a user interface window as implemented in accordance with an embodiment of the invention. In this embodiment, a user interface (UI) 1702, such as a web browser, is implemented to comprise a UI window 2104, which in turn comprises a plurality of widget configuration parameters 2106. As described in greater detail herein, the widget configuration parameters 2106 control the appearance and behavior of the widget once it is created through a user gesture selecting the "Create Widget" command button 2108.

FIG. 22 shows widget analytics displayed within a user interface window as implemented in accordance with an embodiment of the invention. In this embodiment, a user interface (UI) 1702, such as a web browser, is implemented to comprise a UI window 2204, which in turn comprises a plurality of web site analytics 2206. As described in greater detail herein, the displayed web site analytics 2206 correspond to the implementation of a widget to provide syndicated commerce recommendations.

Figure 23:
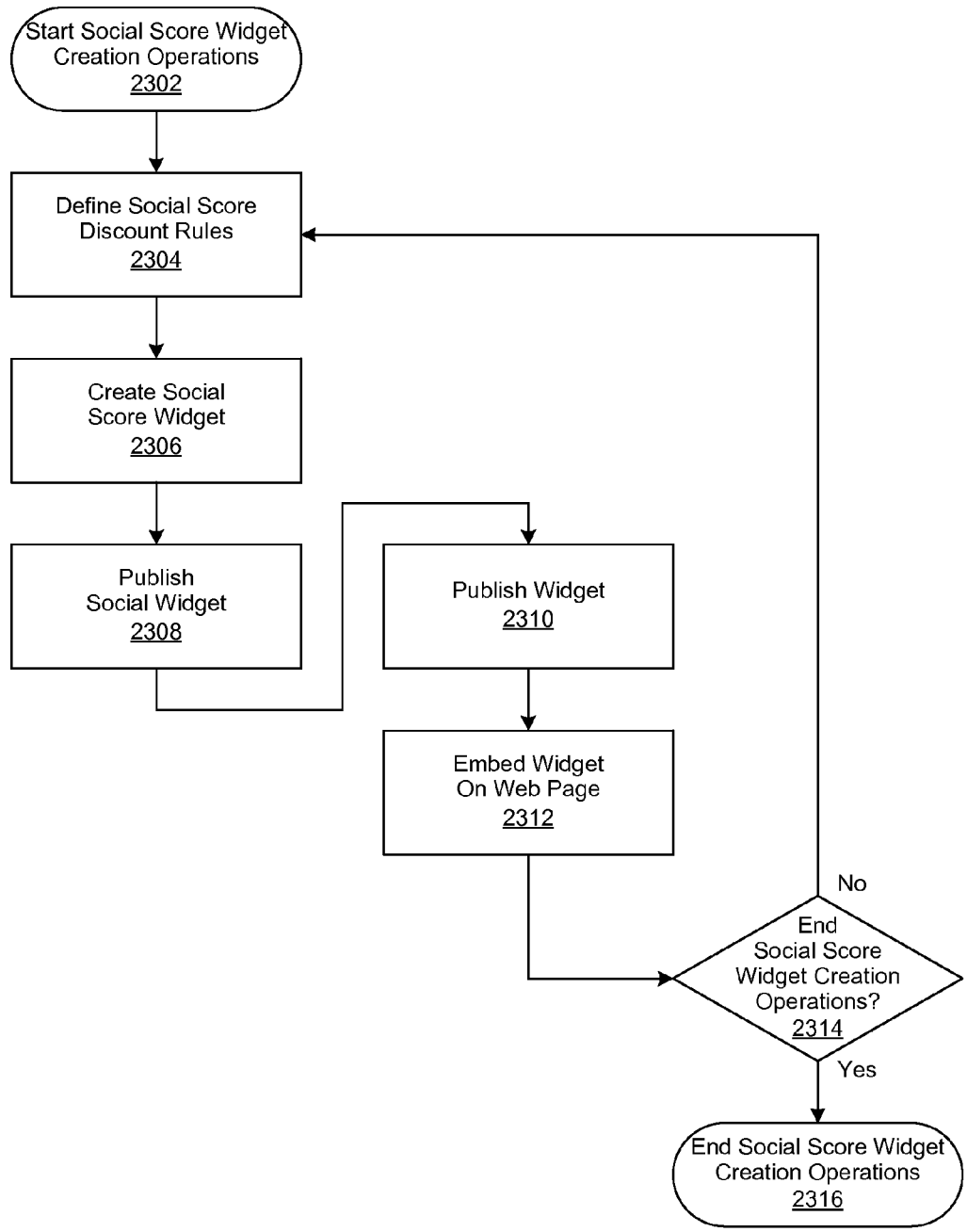
FIG. 23 is a generalized flow chart of the performance of social score widget creation operations.

FIG. 23 is a generalized flow chart of the performance of social score widget creation operations as implemented in accordance with an embodiment of the invention. In various embodiments, a social score recommendation widget is implemented to evaluate a visitor's social identity across multiple third party social sites. The resulting evaluation is then used to determine what to display (e.g., to recommend) to the user based on their social score. As used herein, a social score broadly refers to a numeric value, or set of values, that represents the user's relative value based on their influence, reach and engagement level within one or more social networks. In these various embodiments, the user's social score provides merchants and other types of organizations to dynamically present special offers. Such offers are typically presented in the context of recommendations for predetermined products, product offers or deals, and content (e.g., articles, videos, ratings, reviews, etc.). The recommendations are based on the user's perceived value, or importance, to the organization with the goal of inducing an interaction with the visitor. Likewise, social score recommendations can be combined with other types of recommendations and algorithms to further target offers to visitors based not only on their social score, but other factors that increase the likelihood of the visitor to take action and interact with the recommendation.

Referring now to FIG. 23, social score widget creation operations are begun in step 2302, followed by the definition of social score discount rules in step 2304. In various embodiments, the social score discount rules are defined by a user and then stored within the social marketplace system. The social score discount rules, as described in greater detail herein, are then used by a recommendation engine to evaluate a visitor when they interact with a social score recommendation or recommendation widget.

In one embodiment, the social score discount rules are defined through the use of a point-and-click user interface (UI) to create the rules, in combination with matching criteria associated with predetermined social scores, such as:
visitor's social score=35
visitor's social score<=45
visitor's social score>=35 and visitor has an average order value>=$52.00
visitor's social score is between 35 and 75
visitor's social score for a predetermined social network<=25
visitor's third party social score>20
In this and other embodiments, the rules and matching criteria are saved in a repository for late reuse. A social score widget is then created in step 2306. In various embodiments, a user accesses a widget creation module within the social commerce marketplace system and elects to create a social score widget. A subset of available assets is then selected by the user for display to a visitor within the widget. In one embodiment, the user associates the aforementioned social score rules to each selected asset to control:
whether to display the asset in the widget
the order to display asset in the widget
whether to offer a discounts
the amount of discount to apply to the asset
which images to display
To further the example, the following table illustrates how social scores can be used to dynamically control what is presented or recommended to visitors based on their social score:

| Asset | Rules assigned to Asset | Example |
|---|---|---|
| Product X | Display Rule = Only display if visitor's social score >=30 | Visitor visits site with a Social Score type widget and has a social score of 37. Product X would be displayed within the widget for the user |
| Discount to display | Do not offer discount if visitor's social score <20 10% discount if visitors social score is between 20 and 30 20% discount if visitors social score is between 30 and 40 50% discount if visitors social score >40 | Visitor would be displayed a 20% discount within the widget for Product X |
| Display order in widget | Display first if visitor's social score >=35 | The first product the visitor would see in the widget would be Product X |

In one embodiment, the visitor's social score is used by the recommendation engine to control whether or not to display a recommendation and to likewise determine the type of widget to display. It will be appreciated that many such controls are possible and the foregoing is not intended to limit the spirit, scope or intent of the invention.

Once the social score widget creation process is completed in step 2306, it is published in step 2308 to the social commerce marketplace system, which finalizes its configuration and activates it for use. The social score widget is then embedded within a target host site in step 2312. In one embodiment, the social score widget is published to a third party social network site using the target site's Application Program Interface (API). In another embodiment, the social score widget is embedded by copying the widget's code, and optional Java-Script tags, to a target website's Hypertext Mark-up Language (HTML) code. In another embodiment, the social score widget is automatically embedded into a social network store web page. In yet another embodiment, the social score widget is implemented to enhance a at target's HTML code through Representational State Transfer (REST) API calls to invoke the widget. Skilled practitioners of the art will recognize that other embodiments are possible and that the foregoing is not intended to limit the spirit, scope or intent of the invention. A determination is then made in step 2314 whether to end social score widget creation operations. If not, then the process is continued, proceeding with step 2302. Otherwise, social score widget creation operations are ended in step 2316.

Figure 24:
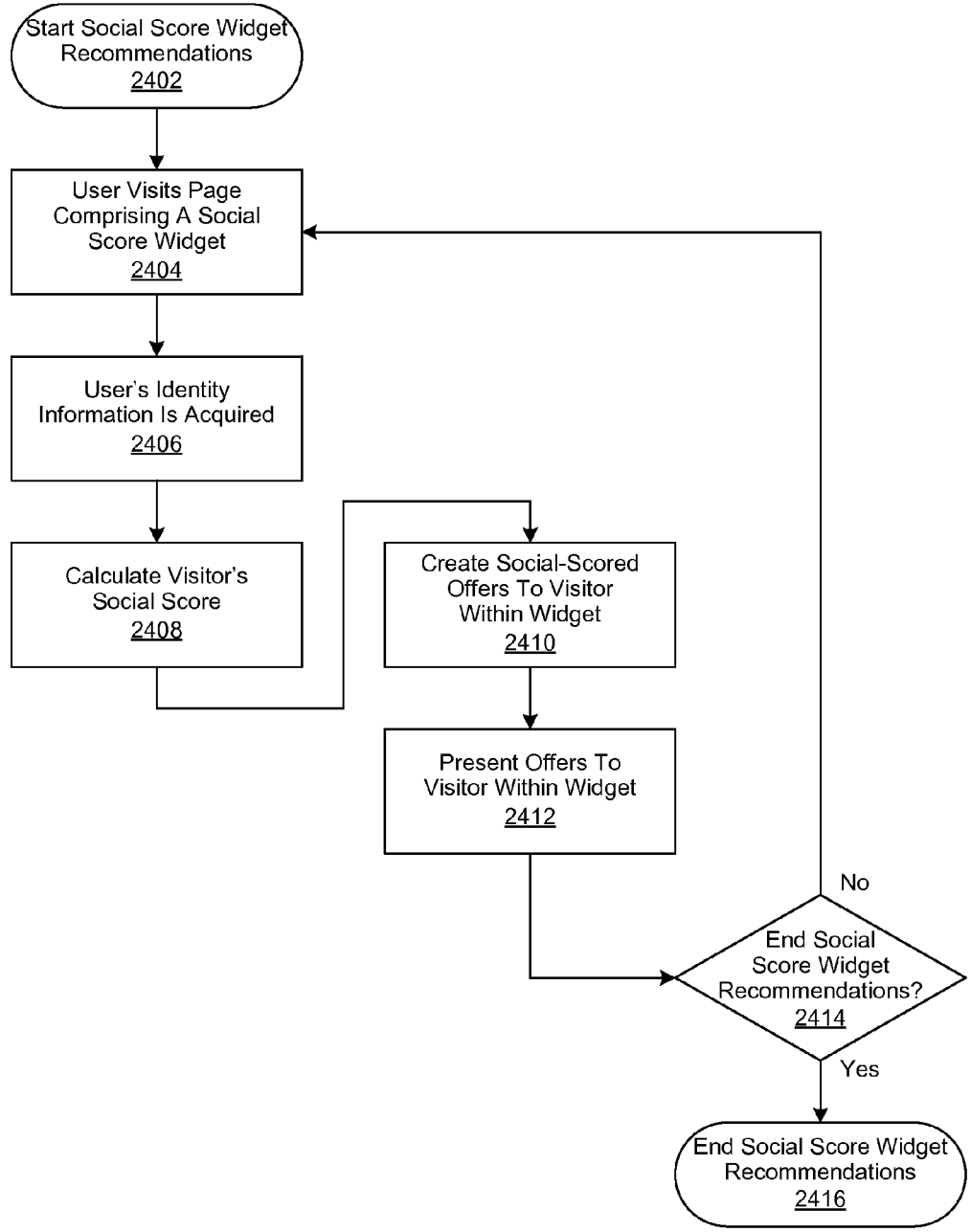
FIG. 24 is a generalized flow chart of the performance of social score widget recommendation operations.

FIG. 24 is a generalized flow chart of the performance of social score widget recommendation operations as implemented in accordance with an embodiment of the invention. In various embodiments, a social score recommendation widget is executed as a target web page loads that will dynamically present offers and discounts based on the user's social score. In this embodiment, social score widget recommendation operations are begun in step 2402, followed by a user visiting a web page in step 2404 within which a social score widget has been embedded. In one embodiments, the social score widget has been explicitly embedded within the web page as described in greater detail herein. In another embodiment, the UI for the social score widget is dynamically created and rendered by calling a REST API and manipulating a returned object of Extensible Mark-up Language (XML) code.

In step 2406, the social score recommendation widget retrieves the visitor's social identity, social graph information, and social site history from the social commerce marketplace system. As used herein, social graph information refers to information that describes the online relationship between a plurality of users. In one embodiment, the social commerce marketplace system authenticates to multiple third party social networking sites including, to retrieve the users social identity and history.

Then, in step 2408, the afore-mentioned social information associated with the visitor is analyzed and associated calculations are performed to generate a social score that represents the visitor's relative value to the organization. In one embodiment, the calculated social score is saved to the social commerce marketplace system so it can be reused by other modules when performing their associated operations. In another embodiment, as described in greater detail herein, the social commerce marketplace system uses information retrieved from various social network sites to calculate multiple social scores for the user. In various embodiments, different social scores may include:
a Holistic Social Score, based on the analysis of visitor data from all third party social sites
an Individual Social Score, based on the analysis of visitor data from a single target social site (e.g., Facebook®, Twitter®, Tumblr®, Google+®, etc.)
a Third Party Social Score, provided by a third party social scoring service
In various embodiments, the calculated social score is generated by using one or more social facets to create two types of social scores. As an example, a social score associated with an individual may be calculated according to analysis of the following attributes:
Influence
# of followers on social networks
& frequency of re-tweets/mentions by others about the user's content
Scores of followers/re-tweeters
Sentiment score of comments/posts/mentions by others
Sentiment score of the comments/posts by the user Engagement
- # & frequency of posts by user
- # of likes by others about the user and the user's content
- # of mentions by others
- # of comments posted by others on the user's posts
- # average time others spend on the user pages
- Average frequency others visit or revisit the user's site/pages Reach
- # of blogs
- # of followers on social networks
- # of visits to the user's social pages
- # of visitor to the user's blog sites
- # of backlinks
- blog site page rank To further the example, a social score associated with a product or its associated brand may likewise be calculated according to analysis of the following attributes:

Influence
- # of followers on social networks
- # & frequency tweets/mentions by others that contain the brand or product name
- Scores of followers/re-tweeters
- Sentiment score of comments/posts/mentions by others Engagement
- # & frequency of posts by Brand/Product
- # of likes by others about the Brand/Product and its social site/page content
- # of mentions by others
- # of comments posted by others on the Brand/Products posts
- # average time others spend on the Brand/Product pages
- Average frequency others visit or revisit the Brand/Product's site/pages Reach
- # of blogs
- # of followers on social networks
- # of visits to the Brand/Product's social pages
- # of visits for blog sites
- # of backlinks
- Blog site page rank Then, in step 2410, the social score recommendation widget executes the social scoring rules described in step 2406 to determine what type of widget will be displayed, the content (e.g., products, offers, deals, etc.) it will contain, and the order in which it will be displayed. Thereafter, the contents of the social score recommendation wizard are presented to the user in step 2412, followed by a determination in step 2414 whether to end social score recommendation widget recommendations. If not, then the process is continued, proceeding with step 2402. Otherwise, social score recommendation widget operations are ended in step 2416.

Figure 25:
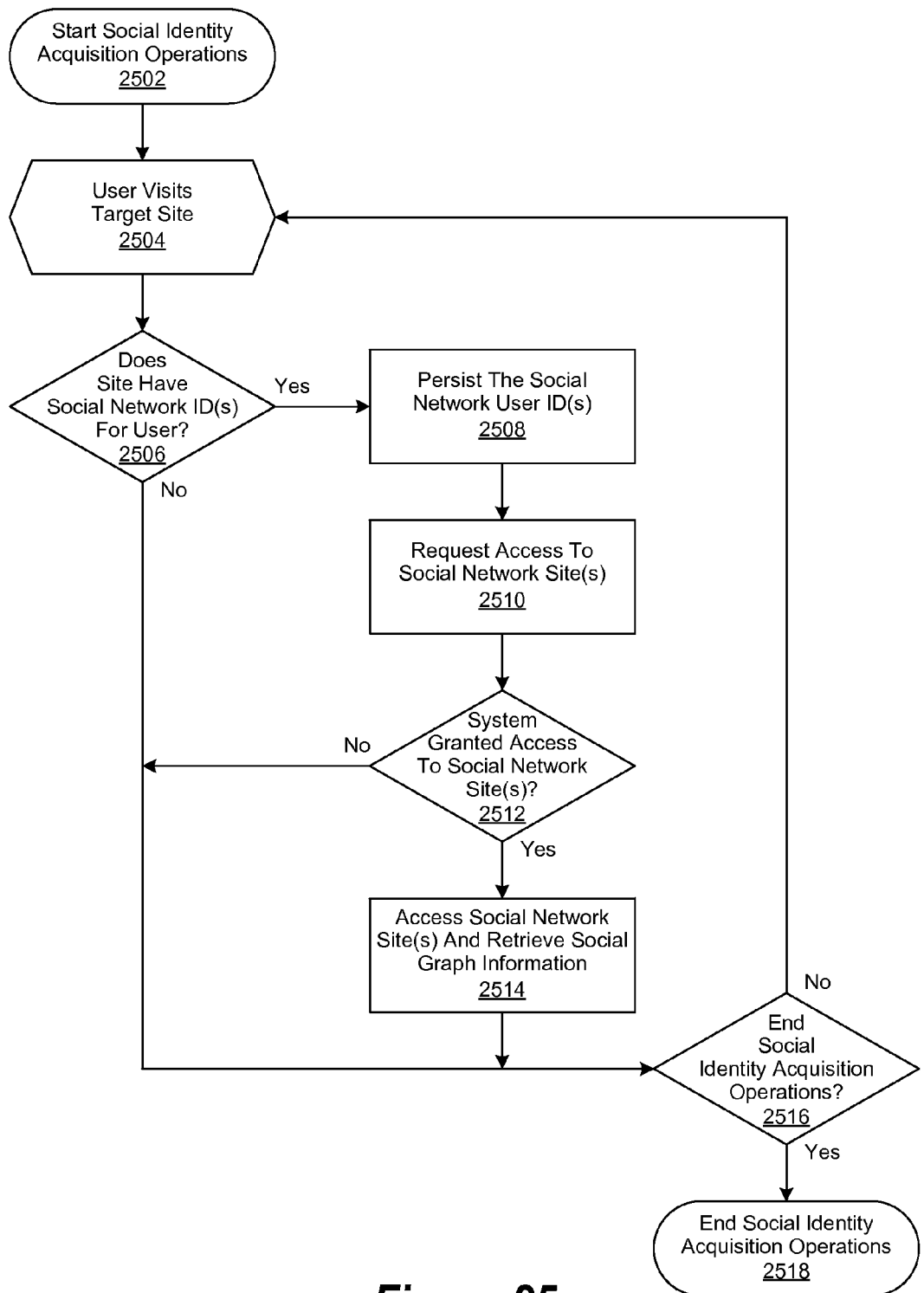
FIG. 25 is a generalized flow chart of the performance of social identity acquisition operations.

FIG. 25 is a generalized flow chart of the performance of social identity acquisition operations as implemented in accordance with an embodiment of the invention. In various embodiments, the social score recommendation widget described in the descriptive text of FIG. 24 attempts to retrieve the visitor's social identity, social graph information, and social site history from the social commerce marketplace system. If this information is not available from the system, or if it is incomplete, then the system authenticates to one or more third party social networking sites to retrieve this information. In this embodiment, beginning with step 2502, the social commerce marketplace system initiates operations associated with step 2406 of FIG. 24, followed by receiving a visitor at a target site such as a landing page.

A determination is then made in step 2506 whether the target site has one or more social network IDs for the visitor. If so, then the social network IDs are persisted in step 2508. In one embodiment, the visitor's clickstream data, session information, and collected cookie information is likewise persisted. This authentication and associated information is then used to request access to their corresponding social network sites in step 2510. In various embodiments, the social score recommendation widget uses JavaScript code and REST APIs that have been implemented at each respective host site to present the visitor's social site authentication information, such as:

```
"id": "220439",
"name": "Bret Taylor",
"first_name": "Bret",
"last_name": "Taylor",
"link": "http://www.facebook.com/btaylor",
"username": "btaylor",
"gender": "male",
"locale": "en_US"
```

In one embodiment, authentication information for access to a target social networking site is not available and the user is prompted by the social commerce marketplace system to provide the required information. In this embodiment, the system dynamically builds a user interface based on the authentication information required to access the target social network site. The user is then asked to login and provide required authentication information to the target social network site. The user is then asked to allow the social commerce marketplace system to thereafter access the required authentication information from the user's account. In another embodiment, the user elects to skip this process. In this embodiment, the social commerce marketplace system prompts the user to authorize it to access specific data. The user then has the option to either authorize limited access for each social network or to skip the process altogether.

A determination is then made in step 2512 whether the social commerce marketplace system is granted access to the one or more social network sites as a result of the provision of the aforementioned authentication information. If so, then each of the social network sites is accessed in step 2614 to retrieve the visitor's associated social graph and history.

Those of skill in the art will realize that each social network site will likely have a different set of information available for retrieval, such as:
- age of account
- relationships to other users, accounts and objects in the social network
- posts (text, links & images) they have made to their account
- posts (text, links & images) they have made to other accounts
- posts (text, links & images) others have made within their account
- likes
- backlinks to their account, pages and posts
- events they like or are following
- groups they like, joined or are following
- tweets
- re-tweets
- mentions
- applications they have associations to
- photos
- videos
- check-ins
- notes
- searches within the social network (date/time & keywords)

Thereafter, or if it was determined in step 2506 that the target site does not have a social network ID for the user, or in step 2512 that the system is not granted access to any of the social network sites, then a determination is made in step 2516 whether to end social identity acquisition operations. If not, then the process is continued, proceeding with step 2504. Otherwise, social identity acquisition operations are ended in step 2516.

Figure 26A:
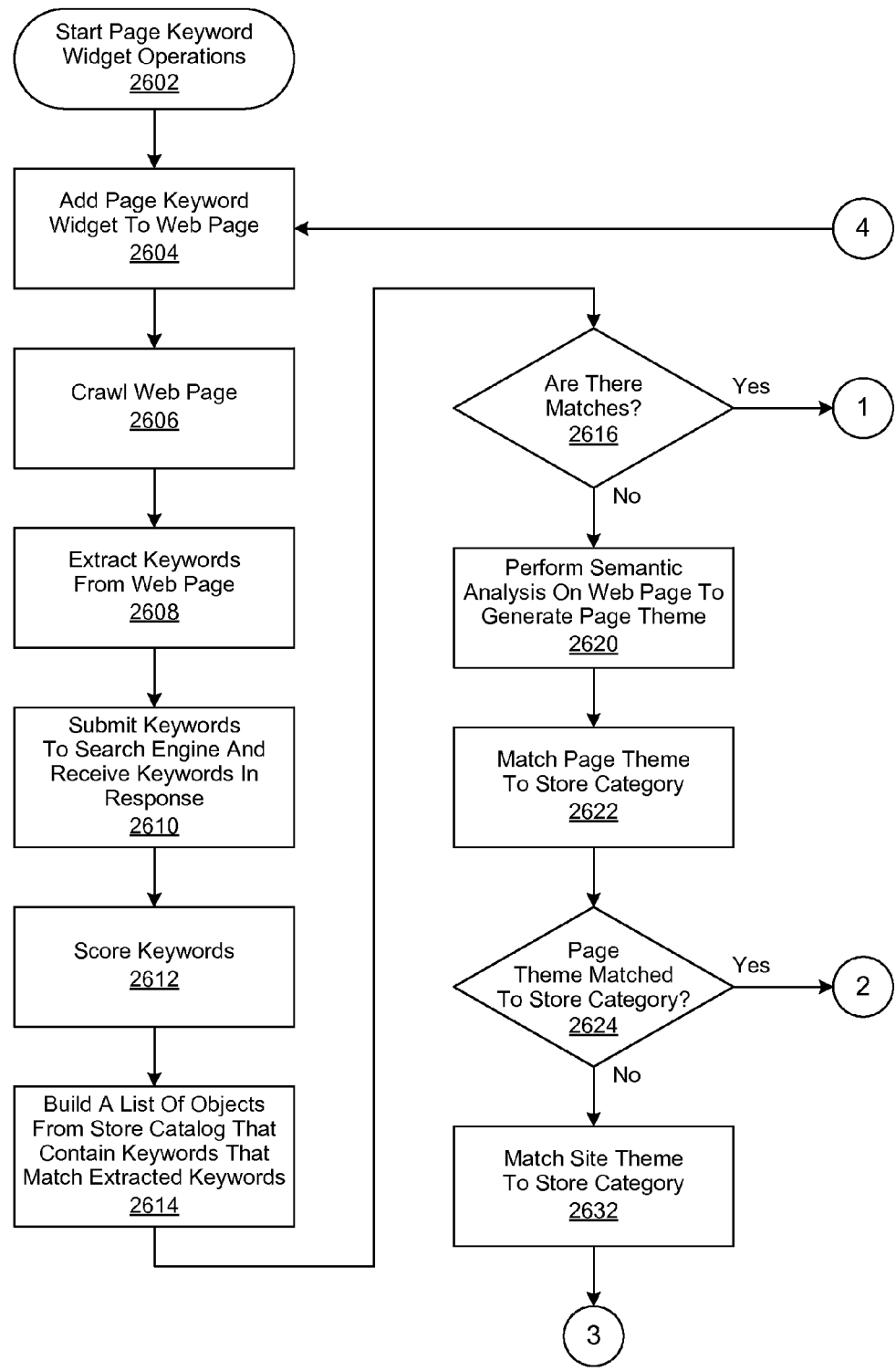
FIGS. 26a-b are a generalized flow chart of the performance of page keyword widget operations.
Figure 26B:
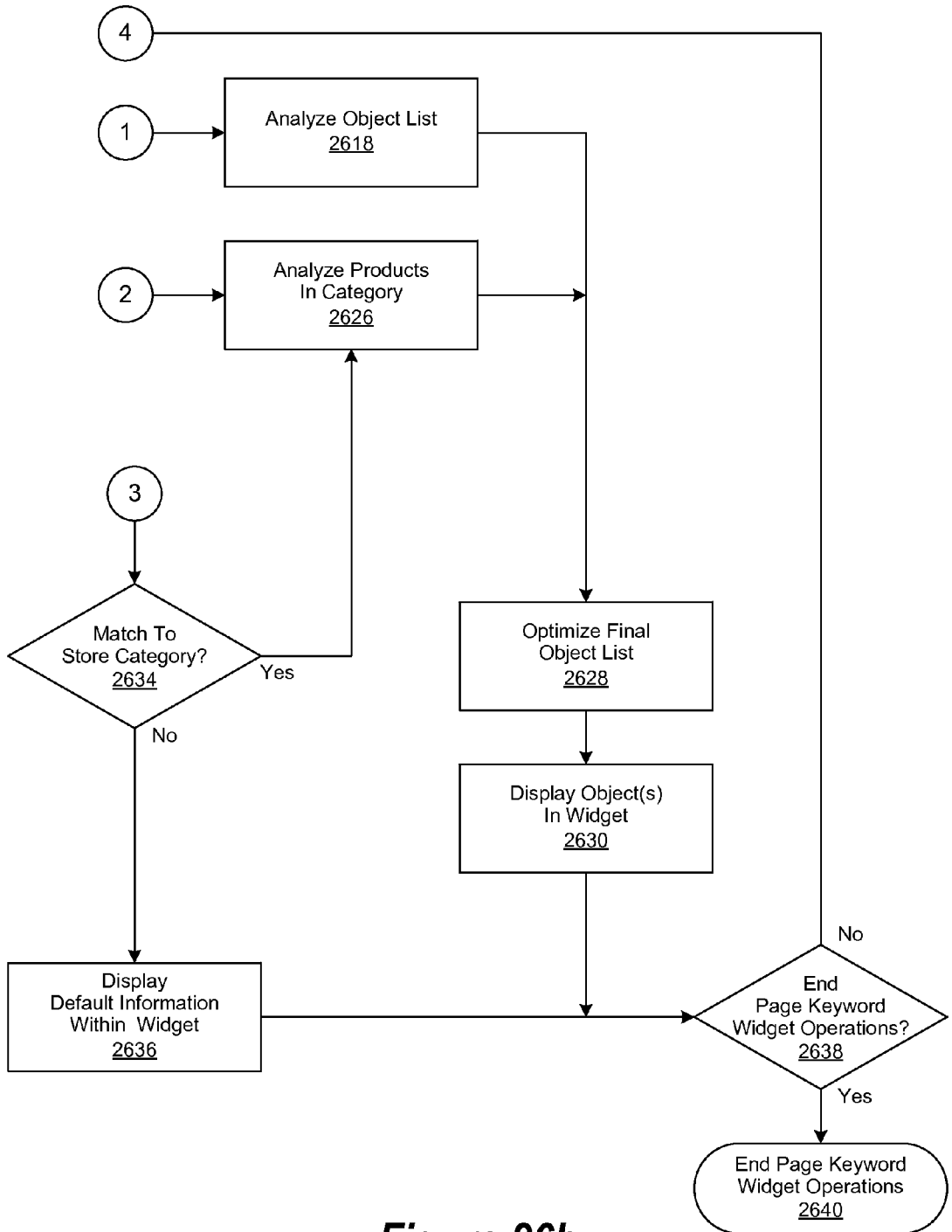

FIGS. 26a-b are a generalized flow chart of the performance of page keyword widget operations as implemented in accordance with an embodiment of the invention. In various embodiments, a page keyword recommendation widget is implemented to evaluate the content of a host page. In these and other embodiments, the page keyword recommendation widget extracts keywords that are then used by the widget to make dynamic real-time recommendations of objects (e.g., products, offers, deals, videos, images, marketing information, etc.) that contain keywords that match those extracted from the host page. Dynamically matching widget content based on the context of the page keywords helps to ensure the widget content matches the interests of the visitor.

In this embodiment, page keyword operations are begun in step 2602, followed by the addition of a page keyword widget to a target web page in step 2604. In one embodiment, a user logs into the social commerce marketplace system and navigates to a list of widgets to identify a desired page keyword widget. Once it is identified, the user accesses an appropriate host site, opens a target page's HTML code, and inserts the widget's embedded code. The web page is then saved and republished, making it active and available for rendering.

A crawler application familiar to those of skill in the art is then used in step 2606 to crawl the target web page. In one embodiment, the web page is crawled proactively. In this embodiment, when a page keyword widget is configured by a user in the system, they will have the option to define a list of known Uniform Resource Locators (URLs) where the widget will be embedded. When the widget is published, the system dispatches a crawler to the URL and indexes the page's full HTML. In another embodiment the target web page is crawled reactively. In this embodiment, if a page keyword widget is embedded into a page that was not configured with a predefined URL to crawl, then the social commerce marketplace system dispatches a crawler to the page's URL and indexes the page's full HTML the first time the widget is loaded and rendered within the system.

In various embodiments, the crawler application reads the page's full HTML and saves it to the social commerce marketplace platform for later processing. In these and other embodiments, the page's HTML may include:
  title meta tag contents
  description meta tag contents
  keywords meta tag contents
  author meta tag contents
  page body text
  H1 through H3 text
  links
  link title text
  Alt image tag text Each time the page keyword widget is loaded, it re-indexes the host page's HTML to determine whether the page content has changed since the last keyword analysis process was performed. If there has not been a change, the page keyword widget will use the keywords and matching analysis already saved in the social commerce marketplace system. If the page title, description meta tag content, keywords meta tag content, or page body text has changed, then the social commerce marketplace system will repeat step 2606, and subsequent steps as necessary, to ensure that the widget contents are always optimized for the host page.

Then, in step 2608, keywords are extracted from the web page HTML code that was acquired by the crawler in step 2606. In one embodiment, a semantic entity and keyword extraction process is performed on the HTML code to extract key topics, people, places and nouns from text objects. In another embodiment, sentiment analysis is performed on the HTML code to determine the tone and strength of tone from text objects. In this embodiment, analyzed text objects are assigned a tone indicator (e.g., positive, neutral, or negative) and a numeric score that represents the relative strength of the tone indicator.

Likewise, the social commerce marketplace system extracts keyword entities from HTML elements such as:
  title meta tag contents
  description meta tag contents
  keywords meta tag contents
  page Body text
  H1 through H3 text The extracted keyword entities are then associated with the URL of the web page and then stored in the social commerce marketplace system for later processing.

Keywords are then submitted to one or more search engines in step 2610 and associated keywords are received in return to create a larger pool of keywords. In one embodiment, a keyword referral analysis is performed by submitting the web page's URL to one or more search engines (e.g., Google®, Blekko®, etc.) to retrieve the top keyword referrals to the page over a predetermined time interval (e.g., the past 30 days). The social commerce marketplace system then associates these keywords to the web page's URL and stores them in the system. In another embodiment, extracted keyword analysis is performed by submitting the keywords extracted from the web page to one or more search engines to get the top-related keyword searches corresponding to those terms according to search frequency and competition. The social commerce marketplace system then associates these keywords to the web page's URL and stores them in the system.

The extracted keywords are then scored in step 2612 and assigns points based on the source of the keywords. In various embodiments, the relative score values by source may include:
  highest value extracted keywords
    page title
    description meta tag
    keywords meta tag
  next highest value keywords
    page body keywords
    search engine referral keywords
    search engine advertising keywords Then, in step 2614, the social commerce marketplace system builds a list of objects (e.g., products, offers, deals, etc.) from a store catalog that contain one or more keywords that match the keywords extracted from the web page. As used herein, a store catalog broadly refers to a subset of a master catalog of objects that are available for presentation on the web page. Accordingly, the resulting list of objects becomes the group of possible objects to display in the page keyword widget.

A determination is then made in step 2616 whether any of the objects from the store catalog match the extracted keywords. If so, then the social commerce marketplace system performs a series of analyses on the objects within the store catalog in step 2618 to optimize the selection of which products to display in the page keyword widget and in what order.

In one embodiment, exclusion rules are defined in the page keyword widget that exclude predetermined objects from being displayed. In this and other embodiments, the exclusion rules include:

Gender Target—the gender of the visitor does not match the target gender of the product Previously Purchased—the object has been previously purchased by the visitor Brand Sentiment—if the visitor has a known negative sentiment about the brand or product Margin—if the product does not meet or exceed specific margin targets Quantity—if the merchant does not currently have the item in stock Blacklisted Products—specific products or category of products the user does not want to present In another embodiment, behavioral analysis operations are performed to automate the ranking and prioritization of displayed products based on:

previous visitor click through rates previous visitor purchase rates segments that can be defined or tracked by a web analytics tool or that can be defined by the social commerce marketplace system for the user (e.g., geo-location, time of day, new vs. existing customers, repeat visitor, etc.)

Click Through Rate (CTR) for visitor's segment that can be defined or tracked by a web analytics tool or that can be defined by the social commerce marketplace system for the user (e.g., geo-location, time of day, new vs. existing customers, repeat visitor, etc.)

average order value for click through ratings and reviews of products number and value of previous brand impressions for the visitor CTR for visitor social score Third Party Analytics Clickstream & Segment Information In these various embodiments, the behavioral analysis can be based on different populations of users, such as:

visitors to a predetermined social commerce site visitors to a predetermined merchant site all social commerce sites visited by a predetermined visitor all social commerce sites However, if it is determined in step 2616 that there are no matching keywords, then the social commerce marketplace system performs semantic analysis operations on the contents and topics of the web page in step 2620 to generate a webpage theme. The resulting web page theme is then matched to the store catalog's categories in step 2622 to build a list of catalog categories that can then be used to display products in the page keyword widget.

A determination is then made in step 2624 whether the web page theme was successfully matched to the store catalog categories. If so, then the social commerce marketplace system performs a series of analysis operations on the objects within the store catalog category to optimize the selection of which objects (e.g., products) to display in the page keyword widget and in which order. In one embodiment, exclusion rules are defined in the page keyword widget that exclude predetermined objects from being displayed. In this and other embodiments, the exclusion rules include:

Gender Target—the gender of the visitor does not match the target gender of the product Previously Purchased—the object has been previously purchased by the visitor Brand Sentiment—if the visitor has a known negative sentiment about the brand or product Margin—if the product does not meet or exceed specific margin targets Quantity—if the merchant does not currently have the item in stock In another embodiment, behavioral analysis operations are performed to automate the ranking and prioritization of displayed products based on:

previous visitor click through rates previous visitor purchase rates segments that can be defined or tracked by a web analytics tool or that can be defined by the social commerce marketplace system for the user (e.g., geo-location, time of day, new vs. existing customers, repeat visitor, etc.)

CTR for visitor's segment that can be defined or tracked by a web analytics tool or that can be defined by the social commerce marketplace system for the user (e.g., geo-location, time of day, new vs. existing customers, repeat visitor, etc.)

average order value for click through ratings and reviews of products number and value of previous brand impressions for the visitor CTR for visitor social score 3rd Party Analytics Clickstream & Segment Information In these various embodiments, the behavioral analysis can be based on different populations of users, such as:

visitors to a predetermined social commerce site visitors to a predetermined merchant site all social commerce sites visited by a predetermined visitor all social commerce sites Once the analysis operations are completed in step 2618 or step 2626, a final list of objects (e.g., products) is optimized in step 2628. In various embodiments, the optimized list determines the order in which objects are presented, their respective discount, and UI theme to apply to each object to optimize the likelihood the visitor will take an action within the widget. As an example, the optimization may incent a user to click-through on a specific call to action (e.g., review a product, offer, or deal). The optimized list of objects is then displayed within the page keyword widget in step 2630, followed by a determination being made in step 2638 whether to end page keyword widget operations. If not, then the process is continued, proceeding with step 2604. Otherwise, page keyword widget operations are ended in step 2640.

However, if it is determined in step 2624 that the web page theme was not successfully matched to the store catalog categories, then the social commerce marketplace system submits the page's domain to a search engine and retrieves its assigned category. The retrieved category is then matched in step 2632 to the store catalog's categories to build a list of catalog categories that can then be used to display products in the page keyword widget. A determination is then made in step 2634 whether the web page theme was successfully matched to the list of store catalog categories. If so, then the process is continued, proceeding with step 2626. Otherwise, default information is displayed within the keyword page widget in step 2636, followed by a determination being made in step 2638 whether to end page keyword widget operations. If not, then the process is continued, proceeding with step 2604. Otherwise, page keyword widget operations are ended in step 2640.

Figure 27:
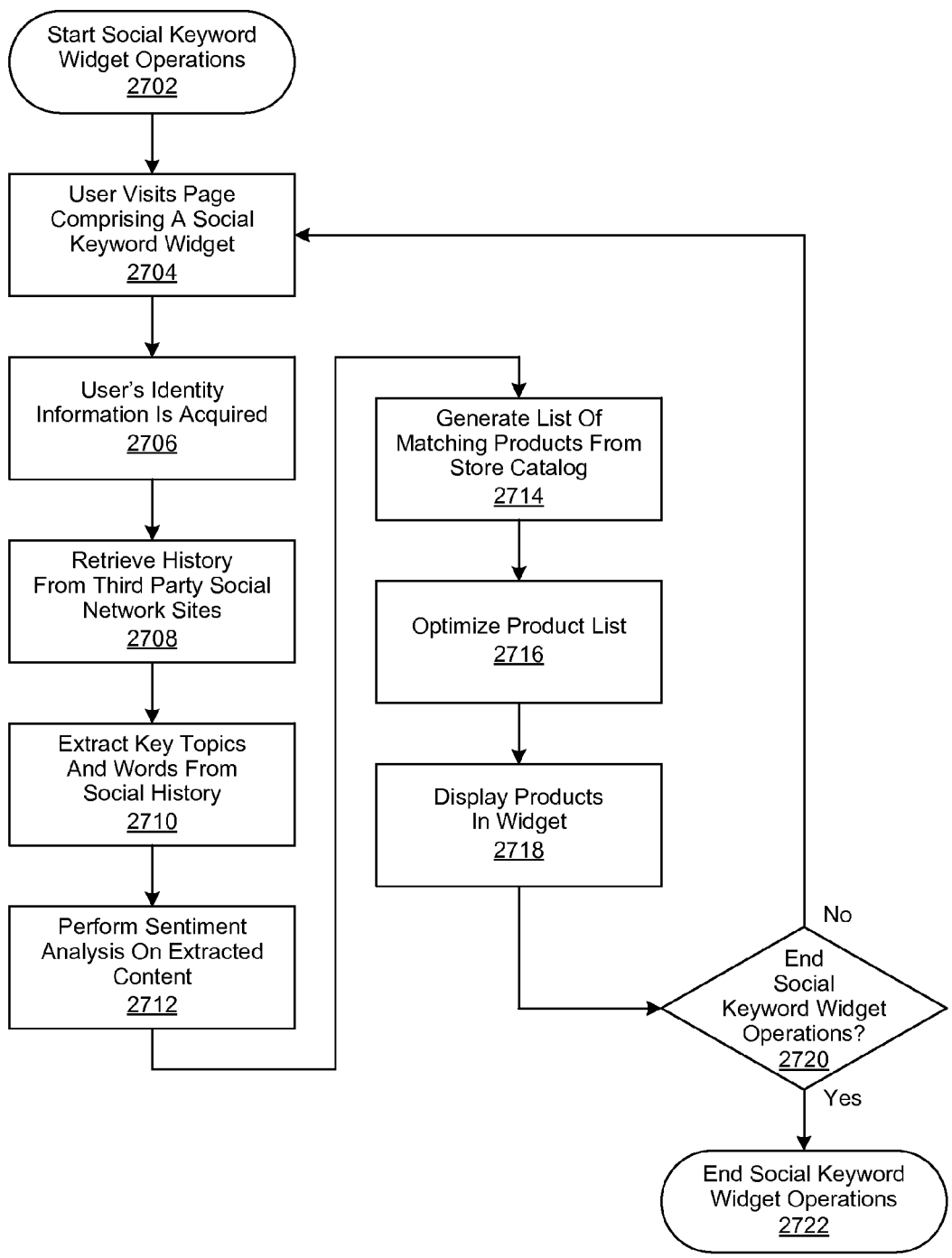
FIG. 27 is a generalized flow chart of the performance of social keyword matched recommendation operations.

FIG. 27 is a generalized flow chart of the performance of social keyword matched recommendation operations as implemented in accordance with an embodiment of the invention. In various embodiments, a social keyword widget is implemented to evaluate the content of a visitor's social networks. In these various embodiments, keywords and topics are extracted and then used by the widget to make dynamic, real-time recommendations of objects (e.g., products, offers, deals, videos, images, marketing information, etc.) that contain matching keywords. It will be appreciated that the ability to dynamically match widget content based on the context of the user's relationships and social conversations assists in optimizing the content provided by the widget to the interests of the visitor.

In this embodiment, social keyword recommendation widget operations are begun in step 2702, followed by a user visits a web page comprising a social keyword widget in step 2704. Then, in step 2706, the user's identity information is acquired as described in greater detail herein, followed by retrieving the user's social network interaction history in step 2708.

In one embodiment, the social commerce marketplace system already has some of the visitor's social history and incrementally retrieves updated information. In another embodiment, the social commerce marketplace system has no social history information exists. In this embodiment, the social commerce marketplace system retrieves all available social history information from various social network sites. Examples of the of social history information includes:

- posts (e.g., text, links and images) they have made to their account
- posts (e.g., text, links and images) they have made to others' accounts
- posts (e.g., text, links and images) others have made within their account
- events the visitor has "liked" or is following
- content from social groups the user has "liked", joined or is following
- Tweets from a Twitter® account
- Re-tweets the visitor has created from a Twitter® account
- Re-tweets others have made using the visitors tweets
- searches within the social network (e.g., date, time, keywords, etc.)

Then, in step 2810, content that was captured from the visitor's social networks is subjected to Semantic Entity and Keyword Extraction Processes, as described in greater detail herein, to extract key topics, people, places and nouns from objects (e.g., text). The resulting social network content objects are then subjected to Sentiment Analysis, as likewise described in greater detail herein, to determine the tone and strength of tone of the objects. In various embodiments, the analyzed objects are assigned a tone indicator (e.g., positive, neutral, or negative) and a numeric score that represents the relative strength of the tone indicator.

A list of objects (e.g., products, offers and deals) in the store catalog that contain at least one keyword matching the socially-extracted keywords is then generated in step 2714. The resulting list is then automatically optimized in step 2716 using the following criteria to determine which objects will be displayed within the social keyword widget and the order in which they will be displayed:

- highest-rated positive tone to the lowest-rated neutral tone score (keywords with the highest sentiment score will be displayed first)
- keywords extracted from posts made directly by the visitor
- keywords extracted from Events The optimized list of objects (e.g., products) is then displayed to the user within the social keyword widget in step 2718, followed by a determination being made in step 2720 whether to end social keyword widget operations. If not, then the process is continued, proceeding with step 2704. Otherwise, social keyword widget operations are ended in step 2722.

Figure 28:
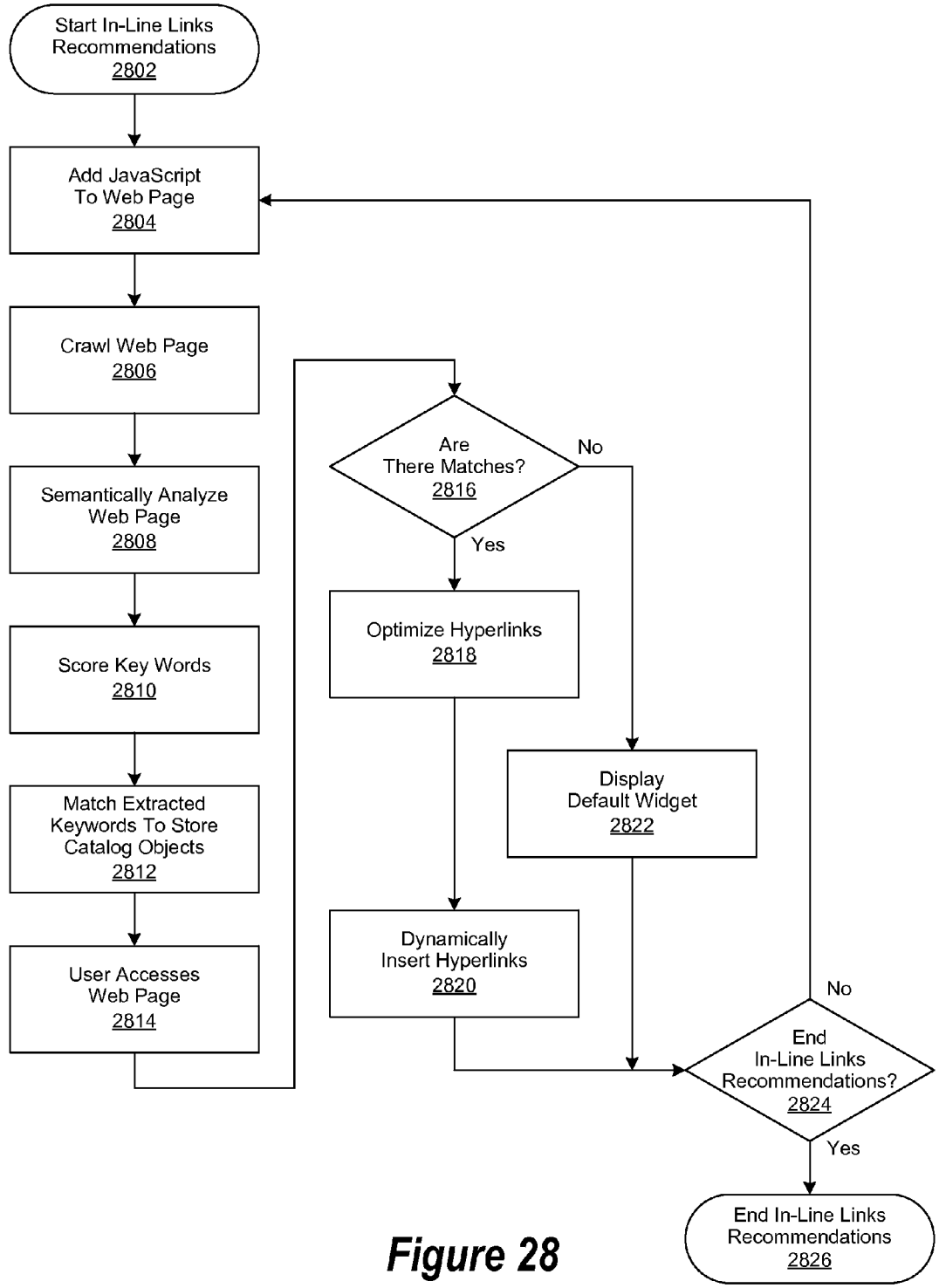
FIG. 28 is a generalized flow chart of the performance of in-line links recommendation operations.

FIG. 28 is a generalized flow chart of the performance of in-line links recommendation operations as implemented in accordance with an embodiment of the invention. In various embodiments, an in-line link recommendation is performed to semantically analyze the text or the characteristics of an image within the body of a web page to recommended content (e.g., products, offers, deal, text, links, images, videos, etc.) located at various hyperlinks and hot spots.

In this embodiment, in-line link recommendation operations are begun in step 2802, followed by the addition of in-line link recommendation JavaScript to a target web page in step 2804. The web page is then crawled in step 2806, as described in greater detail herein, to collect text and image characteristics. Then, as likewise described in greater detail herein, the collected text and image characteristics are then semantically analyzed in step 2808, keywords are scored in step 2810, and extracted keywords are matched to store catalog objects (e.g., products, offers, deals, etc.) in step 2812.

A user then accesses the web page in step 2814, followed by making a determination in step 2816 whether there are any matches between the extracted keywords and store catalog objects. If so, then hyperlinks are optimized in step 2818 and dynamically inserted into the web page in step 2820. Otherwise, default hyperlinks are displayed within the web page in step 2822. Thereafter, or after the optimized hyperlinks are dynamically displayed in step 2820, a determination is made in step 2824 whether to end in-line link recommendation operations. If not, then the process is continued, proceeding with step 2804. Otherwise, in-line link recommendation operations are ended in step 2826.

Figure 29:
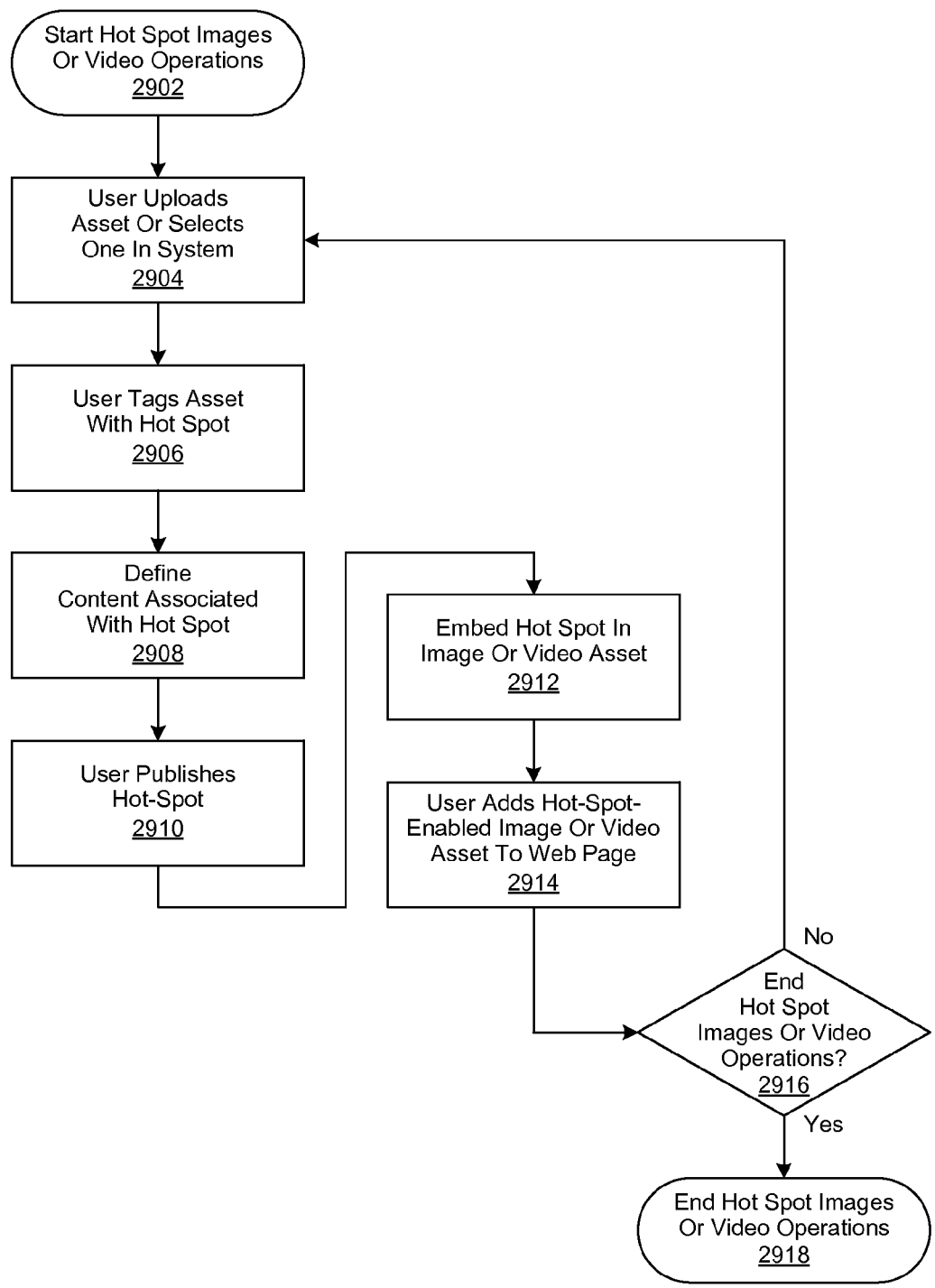
FIG. 29 is a generalized flow chart of the performance of hot spot images or video operations.

FIG. 29 is a generalized flow chart of the performance of hot spot images or video operations as implemented in accordance with an embodiment of the invention. In various embodiments, hot spot recommendation areas are added to a predetermined area of an image or video that, will dynamically pop-up additional content when moused-over or played by the user. In this embodiment hot spot images or video operations are begun in step 2902, followed by a user either selecting an existing image or video asset that is already stored in the social commerce marketplace system or uploading a new one from outside the system in step 2904.

Then, in step 2906, the user respectively tags the asset with a hot spot. In one embodiment, the asset is an image asset. In this embodiment, the user first opens the image asset and then selects an area of the image where they wish to add a hot spot. As an example, the image may be of a person holding a laptop computer. An area of the image is selected to add a hot spot, based on the X and Y coordinates within the image. The user then uniquely names each hot spot or accepts a system-generated name for the designated hot spot. In another embodiment, the asset is a video asset. In this embodiment, the user first opens the video asset and determines where within the video asset's timeline the hotspot is to occur. Once determined, the user tags the video asset from point X to point Y in the video's timeline. In another embodiment, the user can create multiple hot spots in a video. In this and other embodiments, the user can create multiple hot spots, including:

- Entire Video Area Mouse Over—ability to mouse over any area within the video to expose a hot spot as a pop up.
- Specific Video Area Mouse Over—the ability to select a specific object within the video (example: a car). The system will then anchor the hot spot to the object regardless of its X & Y coordinates as it changes positions in the video relative to the timeline (motion).
- External Pop Up—the ability render a pop up anywhere on the web page.

Smart Widget—the ability to dynamically render a widget on the web page.

The user then uniquely names each hot spot or accepts names for the hot spots automatically generated by the social commerce marketplace system. Then, in step 2908, content is defined that will be displayed when the hot spot is activated. The following sources for such content are implemented in various embodiments:

URL link—loads content from any URL internal or external to the system.

image—loads a static image within the hot spot store catalog product or offer—loads a product or offer within the hot spot store seal—loads a deal within the hot spot video—loads a video store widget—loads a widget within the hot spot custom application—loads a custom web application within the hot spot Once the process of tagging an asset with a hot spot and associating the content to display within the hot spot, the hot spot is saved and published in step 2910 such that it can be used by a visitor to the web page. Once the hot spot has been published within the system, it is embedded within the target image or video asset in step 2912. In various embodiments, the hot spot is embedded as follows:

REST API—dynamically calling a hot-spot-enabled image or video asset and associated hot spot content when the web page loads URL—that loads the hot-spot-enabled image or video asset and associated hot spot content download package—that downloads the hot-spot-enabled asset and associated JavaScript/HTML code required to make the hot spot function such that the asset can be locally managed The hot-spot-enabled image or video asset is then added to the web page in step 2914, followed by a determination being made in step 2916 whether to end hot spot image or video operations. If not, then the process is continued, proceeding with step 2904. Otherwise, hot spot image and video operations are ended in step 2918.

Figure 30:
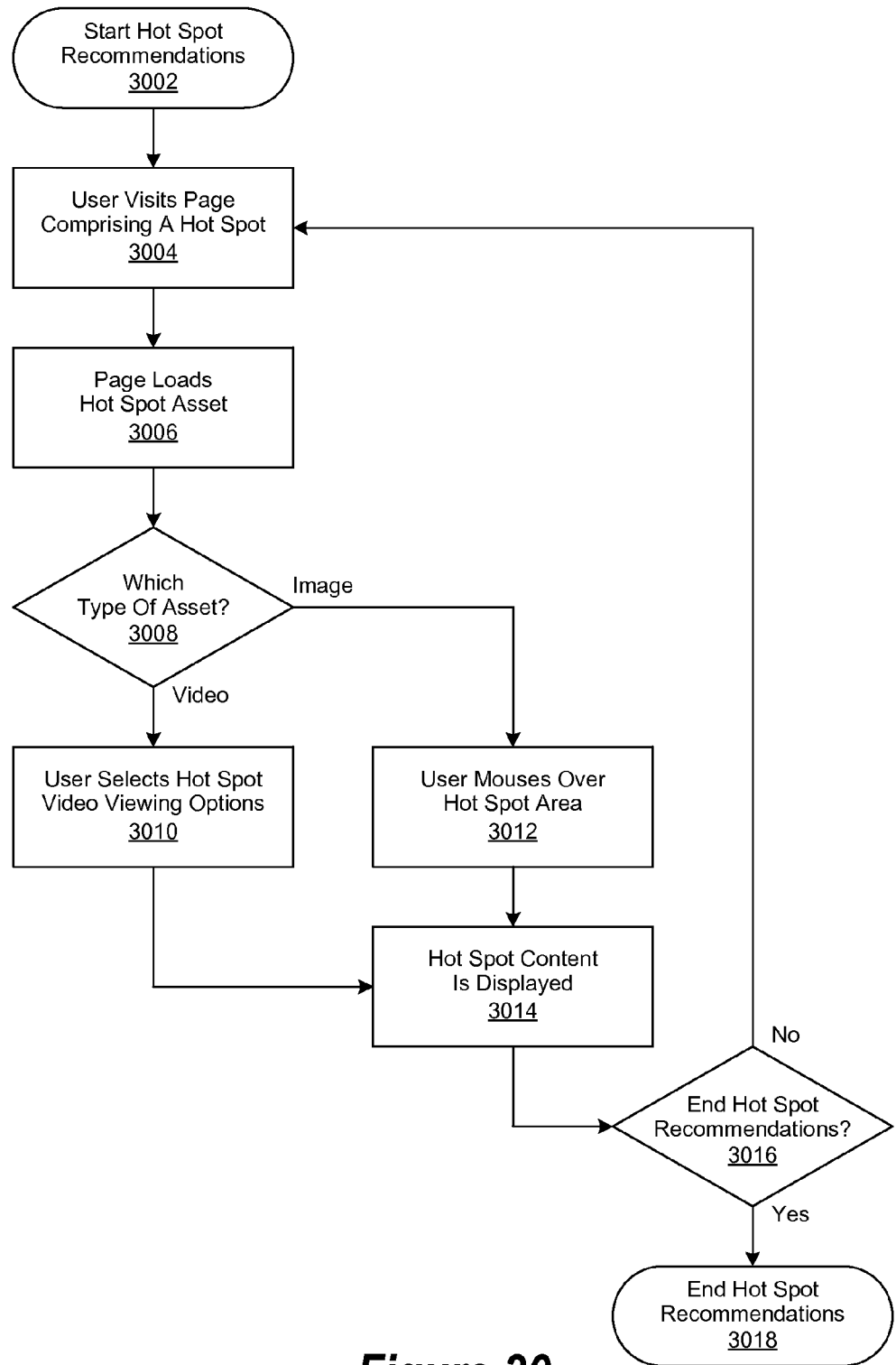
FIG. 30 is a generalized flow chart of the performance of hot spot recommendation operations.

FIG. 30 is a generalized flow chart of the performance of hot spot recommendation operations as implemented in accordance with an embodiment of the invention. In this embodiment, hot spot recommendation operations are begun in step 3002, followed by a user visits a web page comprising a hot-spot-enabled image or video asset in step 3004. When the visitor's browser loads the web page, hot spot code described in greater detail herein is executed in step 3006, which retrieves and displays a hot-spot-enabled image or video asset.

As likewise described in greater detail herein, associated hot spot content is displayed when the user mouses-over a predetermined area of the hot-spot-enabled image or video asset. Depending upon the characteristics of the associated hot spot content, the user may be presented with various interaction options. For example, a user may perform a click-through interaction with a product offer to purchase the item. In one embodiment, the hot spots are only displayed according to the visitor's social scores.

A determination is then made in step 3008 whether the hot-spot-enabled asset is a video asset or an image asset. If it is determined in step 3008 that the hot-spot-enabled asset is a video asset, then the user selects a hot spot viewing option in step 3010. In various embodiments, the user may be presented with the following hot spot viewing options:

mousing-over any area within the video to pop up additional hot spot content mousing-over a specific area within the video to pop up additional hot spot content viewing and interacting with a pop up or overlay that appears somewhere within the web page viewing and interacting with a widget that appears somewhere within the web page However, if it is determined in step 3008 that the hot-spot-enabled asset is an image asset, then the user mouses-over a predetermined hot spot area of the image asset in step 3012. Thereafter, or once hot spot viewing options are selected in step 3010, the associated hot spot content is displayed in step 3014. A determination is then made in step 3016 whether to end hot spot recommendation operations. If not, then the process is continued, proceeding with step 3004. Otherwise, hot spot recommendation operations are ended in step 3018.

Figure 31:
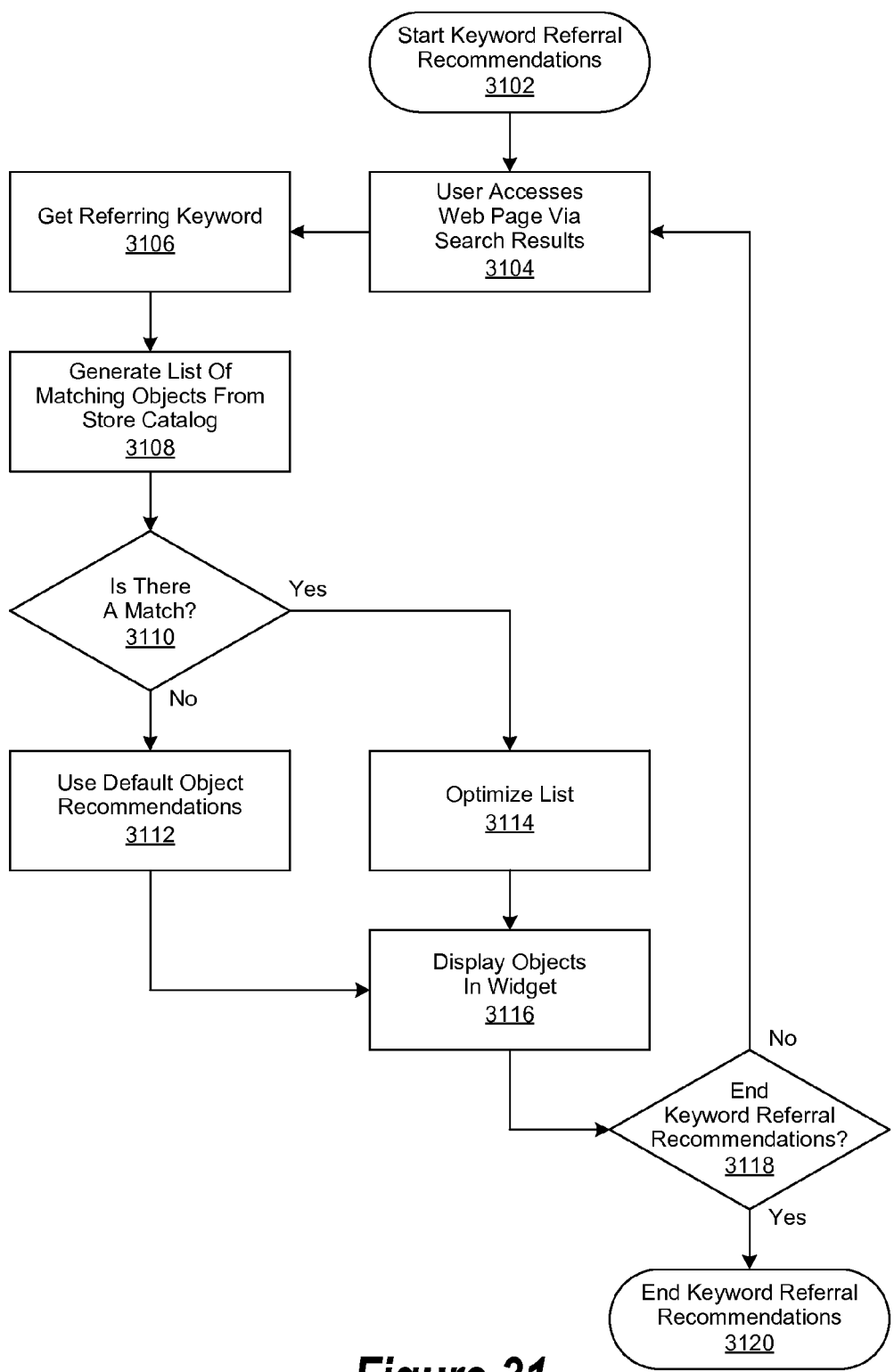
FIG. 31 is a generalized flow chart of the performance of keyword referral recommendation operations.

FIG. 31 is a generalized flow chart of the performance of keyword referral recommendation operations as implemented in accordance with an embodiment of the invention. In various embodiments, a search keyword referral widget is implemented to make dynamic real-time recommendations of objects (e.g., products, offers, deals, videos, images, marketing information, etc.) that contain keywords matching the visitor's referring keyword. In these and other embodiments, the dynamic matching of content based on the referring keywords assists in ensuring that the content presented within the search keyword referral widget matches the interests of the visitor.

In this embodiment, keyword referral recommendation operations are begun in step 3102, followed by a user accessing a web page via search engine results in step 3104. For example, a user may have performed a keyword search, either using a search engine or a site search feature within a website. The search engine returns a list of URLs (e.g., sites or pages) that have the most relevant content for the keyword phrase used for the search. The user then clicks on a URL referencing a site or page that contains a keyword referral widget.

As the keyword referral widget loads, it requests the referring keywords from the host website in step 3108. The system builds a list of objects (e.g., products, offers and deals) from the store catalog in step 3108 that contain a keyword that matches a term in the referring keywords. The resulting list becomes the group of possible objects to display within the keyword referral widget. A determination is then made in step 3108 whether there is a match. If not, then default object recommendations are selected in step 3110. Otherwise, as described in greater detail herein, the social commerce marketplace system performs a series of analyses in step 3112 on the objects within the store catalog category to optimize the selection of which objects (e.g., products) to display within the keyword referral widget and in what order.

Thereafter, or if default object recommendations were selected in step 3210, the keyword referral widget displays the selected objects to the visitor in step 3114. A determination is then made in step 3116 whether to end keyword referral recommendation operation. If not, then the process is continued, proceeding with step 3104. Otherwise, keyword referral recommendation operations are ended in step 3118.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Consequently, the invention is intended to be limited only by the spirit and scope of the appended claims, giving full cognizance to equivalents in all respects.

What is claimed is:

1. A computer-implementable method for providing syndicated commerce recommendations, comprising:
   generating a widget configured to provide a recommendation, the generating the widget being performed on a computer system;
   transmitting widget data to a target site via an Application Program Interface (API) of the target site;
   embedding the widget within a web page of the target site;
   receiving social data associated with a user, the social data comprising a social score, the social score comprising a numeric value, the numeric value representing a relative value of the user based on influence, reach and engagement level of the user within at least one social network;
   generating a set of recommendation objects via the widget using the social data; and
   providing the recommendation objects within the widget.

2. The computer-implementable method of claim 1, wherein the widget is generated from a template.

3. The computer-implementable method of claim 2, wherein:
   the at least one social data source comprises a social network site;
   the user provides identity data used to access the social network site; and
   the widget uses the identity data to request the social data from the social network site.

4. The computer-implementable method of claim 1, wherein the social data is received dynamically from at least one social data source.

5. The computer-implementable method of claim 1, wherein the social data further comprises at least one of the set of:
   identity data associated with the user;
   social graph data associated with the user;
   a page keyword; and
   a referral keyword.

6. The computer-implementable method of claim 1, wherein the set of recommendation objects comprises at least one of the set of:
   a product;
   an offer;
   a deal;
   an advertisement;
   text;
   a video;
   an image; and
   a Uniform Resource Indicator (URI).

7. A system comprising:
   a processor;
   a data bus coupled to the processor; and
   a computer-usable medium embodying computer program code, the computer-usable medium being coupled to the data bus, the computer program code interacting with a plurality of computer operations and comprising instructions executable by the processor and configured for:
      generating a widget configured to provide a recommendation;
      transmitting widget data to a target site via an Application Program Interface (API) of the target site;
      embedding the widget within a web page of the target site;
      receiving social data associated with a user, the social data comprising a social score, the social score comprising a numeric value, the numeric value representing a relative value of the user based on influence, reach and engagement level of the user within at least one social network;
      generating a set of recommendation objects via the widget using the social data; and
      providing the recommendation objects within the widget.

8. The system of claim 7, wherein the widget is generated from a template.

9. The system of claim 8, wherein:
   the at least one social data source comprises a social network site;
   the user provides identity data used to access the social network site; and
   the widget uses the identity data to request the social data from the social network site.

10. The system of claim 7, wherein the social data is received dynamically from at least one social data source.

11. The system of claim 7, wherein the social data further comprises at least one of the set of:
   identity data associated with the user;
   social graph data associated with the user;
   a page keyword; and
   a referral keyword.

12. The system of claim 7, wherein the recommendation object comprises at least one of the set of:
   a product;
   an offer;
   a deal;
   an advertisement;
   text;
   a video;
   an image; and
   a Uniform Resource Indicator (URI).

13. A non-transitory computer-usable medium embodying computer program code, the computer program code comprising computer executable instructions configured for:
- generating a widget configured to provide a recommendation;
- transmitting widget data to a target site via an Application Program Interface (API) of the target site;
- embedding the widget within a web page of the target site;
- receiving social data associated with a user, the social data comprising a social score, the social score comprising a numeric value, the numeric value representing a relative value of the user based on influence, reach and engagement level of the user within at least one social network;
- generating a set of recommendation objects via the widget using the social data; and
- providing the recommendation objects within the widget.

14. The non-transitory computer usable medium of claim 13, wherein the widget is generated from a template.

15. The non-transitory computer usable medium of claim 14, wherein:
- the at least one social data source comprises a social network site;
- the user provides identity data used to access the social network site; and
- the widget uses the identity data to request the social data from the social network site.

16. The non-transitory computer usable medium of claim 13, wherein the social data is received dynamically from at least one social data source.

17. The non-transitory computer usable medium of claim 13, wherein the social data further comprises at least one of the set of:
- identity data associated with the user;
- social graph data associated with the user;
- a page keyword; and
- a referral keyword.

18. The non-transitory computer usable medium of claim 13, wherein the recommendation object comprises at least one of the set of:
- a product;
- an offer;
- a deal;
- an advertisement;
- text;
- a video;
- an image; and
- a Uniform Resource Indicator (URI).

19. The non-transitory computer usable medium of claim 13, wherein the computer executable instructions are deployable to a client computer from a server at a remote location.

20. The non-transitory computer usable medium of claim 13, wherein the computer executable instructions are provided by a service provider to a customer on an on-demand basis.

* * * * *